United States Patent
Mori et al.

US 7,057,667 B1
Jun. 6, 2006

(54) IMAGE DISPLAY CONTROL SYSTEM AND METHOD ALLOWING CONNECTION OF VARIOUS KINDS OF IMAGE DISPLAYS TO ONE SUPPLY SOURCE

(75) Inventors: Makiko Mori, Atsugi (JP); Naoto Abe, Yokohama (JP); Tatsuro Yamazaki, Machida (JP); Muneki Ando, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,105

(22) Filed: Feb. 24, 2000

(30) Foreign Application Priority Data

Feb. 26, 1999 (JP) .......................................... 11-096742
Feb. 26, 1999 (JP) .......................................... 11-096744

(51) Int. Cl.
H04N 3/27 (2006.01)

(52) U.S. Cl. ...................... 348/554; 348/558; 348/556; 348/441

(58) Field of Classification Search .................. 348/556, 348/558, 554, 445, 441, 581, 559; 725/133, 725/141, 153; 345/581, 603, 660, 667–671, 345/690, 701, 723, 698, 699
See application file for complete search history.

(56) References Cited

U.S. PATENT DOCUMENTS 5,029,112 A  7/1991  Sakamoto et al. .......... 364/521
5,532,848 A  7/1996  Beretta ........................ 345/504

(Continued)

FOREIGN PATENT DOCUMENTS

EP    0 778 516      6/1997
EP    0 807 880      11/1997
JP    06-062346     3/1994
JP    06-213726     8/1994
JP    10-262198     9/1998
JP    10-326091     12/1998
WO    WO 97/48056   12/1997

OTHER PUBLICATIONS

Proposed SMPTE Standard for Television—24-Bit Digital Audio Formal for HDTV Bit-Serial Interface, SMPTE Journal (Aug. 1996; pp. 1 to 15). (XP-000627185).
VESA Plug and Display Standard, Pin Definitions, P&D-D Microribbon (pp. 92 to 109; 1997).
Plug and Display Standard, Video Electronics Standards Association (VESA) (pp. 1 to 91; Jun. 11, 1997, (XP-002123075).

(Continued)

Primary Examiner—Victor R. Kostak
(74) Attorney, Agent, or Firm—Fitzpatrick, Cella, Harper & Scinto

(57) ABSTRACT

This invention discloses an arrangement allowing connection of various kinds of image displays to one supply source in an image display control system having a supply source for transmitting a signal including at least a video signal, and an image display for receiving the signal and displaying a corresponding image. The supply source acquires characteristic data of the image display when it is powered on, determines a signal communication specification with the image display based on the acquired characteristic data, and communicates a signal including the video signal with the determined communication specification. The image display transmits characteristic data for specifying the characteristics of the image display to the supply source, and communicates the signal including the video signal in accordance with the determined communication specification. This invention also discloses an arrangement permitting changing the specifications and version of the control program of the image display.

11 Claims, 49 Drawing Sheets

U.S. PATENT DOCUMENTS

| | | | | |
|---|---|---|---|---|
| 5,548,346 A | | 8/1996 | Mimura et al. | 348/738 |
| 5,652,845 A | | 7/1997 | Arai et al. | 395/286 |
| 5,678,173 A | * | 10/1997 | Mihara | 725/131 |
| 5,850,265 A | * | 12/1998 | Suh | 725/110 |
| 5,966,185 A | | 10/1999 | Nohara et al. | 348/553 |
| 5,982,449 A | | 11/1999 | Nagai et al. | 348/553 |
| 6,049,359 A | | 4/2000 | Vogel et al. | 348/553 |
| 6,049,821 A | * | 4/2000 | Theriault et al. | 709/203 |
| 6,147,713 A | * | 11/2000 | Robbins et al. | 348/555 |
| 6,160,491 A | | 12/2000 | Kitao et al. | 348/734 |
| 6,172,719 B1 | | 1/2001 | Kim | 348/655 |
| 6,188,439 B1 | | 2/2001 | Kim | 348/553 |
| 6,208,326 B1 | | 3/2001 | Frederick et al. | 345/132 |
| 6,275,267 B1 | * | 8/2001 | Kobayashi | 348/555 |
| 6,321,383 B1 | | 11/2001 | Funahashi et al. | 725/92 |
| 6,345,388 B1 | * | 2/2002 | Nishio et al. | 725/93 |
| 6,377,251 B1 | | 4/2002 | Takasu et al. | 345/204 |
| 6,388,713 B1 | | 5/2002 | Saiki et al. | 348/553 |
| 6,453,071 B1 | | 9/2002 | Ito et al. | 382/232 |
| 6,476,821 B1 | | 11/2002 | Sawada et al. | 345/620 |
| 6,477,184 B1 | | 11/2002 | Ishikawa | 370/509 |
| 6,477,185 B1 | | 11/2002 | Komi et al. | 370/536 |
| 6,567,117 B1 | * | 5/2003 | Nago et al. | 348/180 |
| 6,661,414 B1 | * | 12/2003 | Miyamoto | 345/213 |
| 2003/0025717 A1 | | 2/2003 | Nakano | 345/690 |

OTHER PUBLICATIONS

Extended Display Identification Data Programming of Microprocessor–Based Display Data Channel Design (IBM Technical Disclosure Bulletin), vol. 38, No. 03 (Mar. 1995, pp. 169 to 171).

European Search Reports dated Mar. 24, 2003 (Ref. No. 2710230) and Mar. 28, 2003 (Ref. No. IM/2711430).

Terminal For Low Bit–Rate Multimedia Communication, ITC International Telecommunication Union, (Feb. 1998), pp. 1 to 49.

European Search Report dated May 24, 2004 (Application No. 00 301 351.3–2202).

* cited by examiner

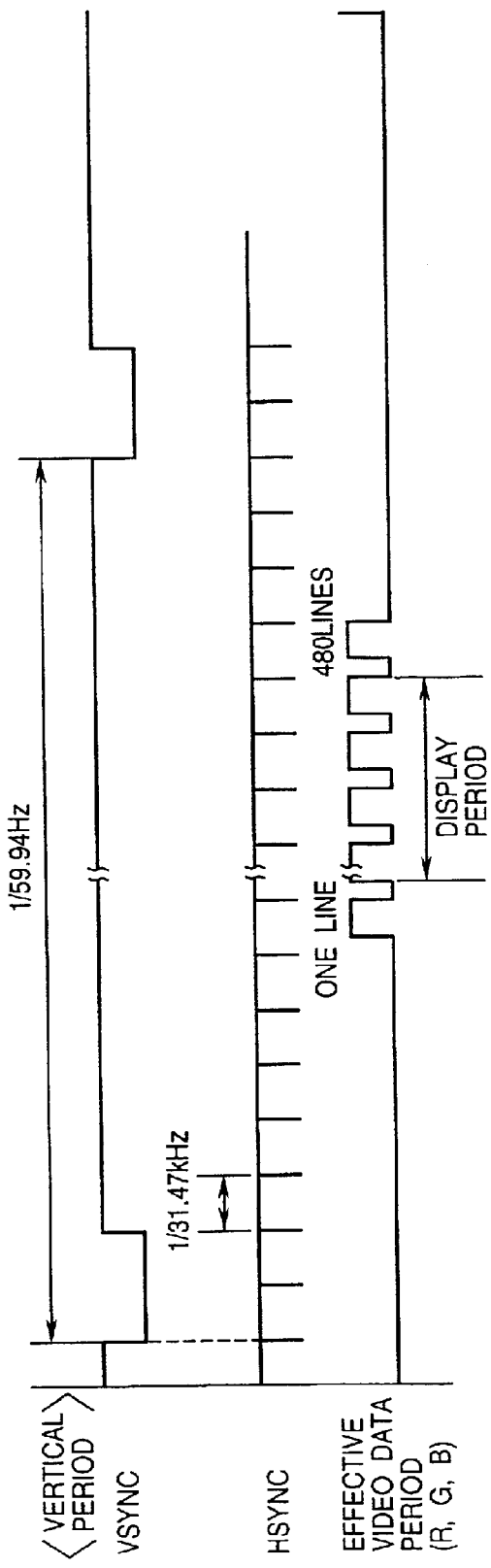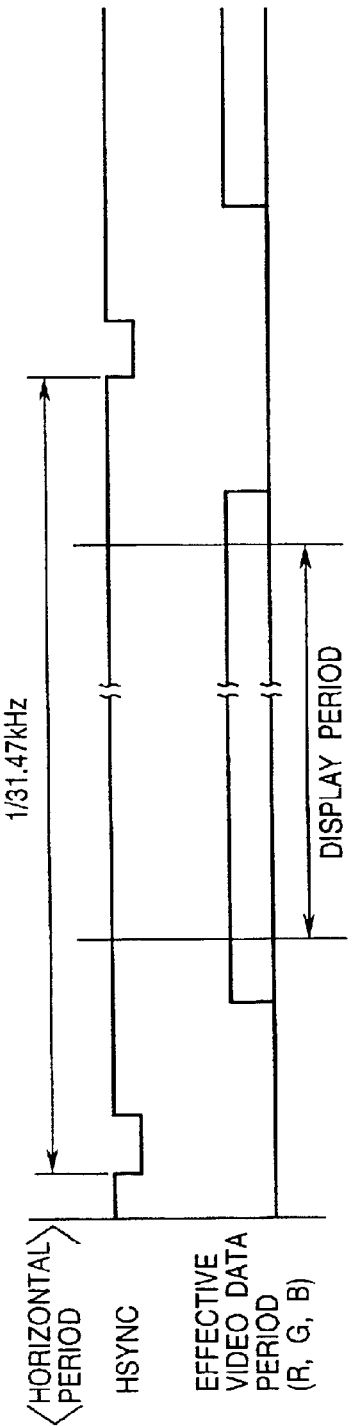

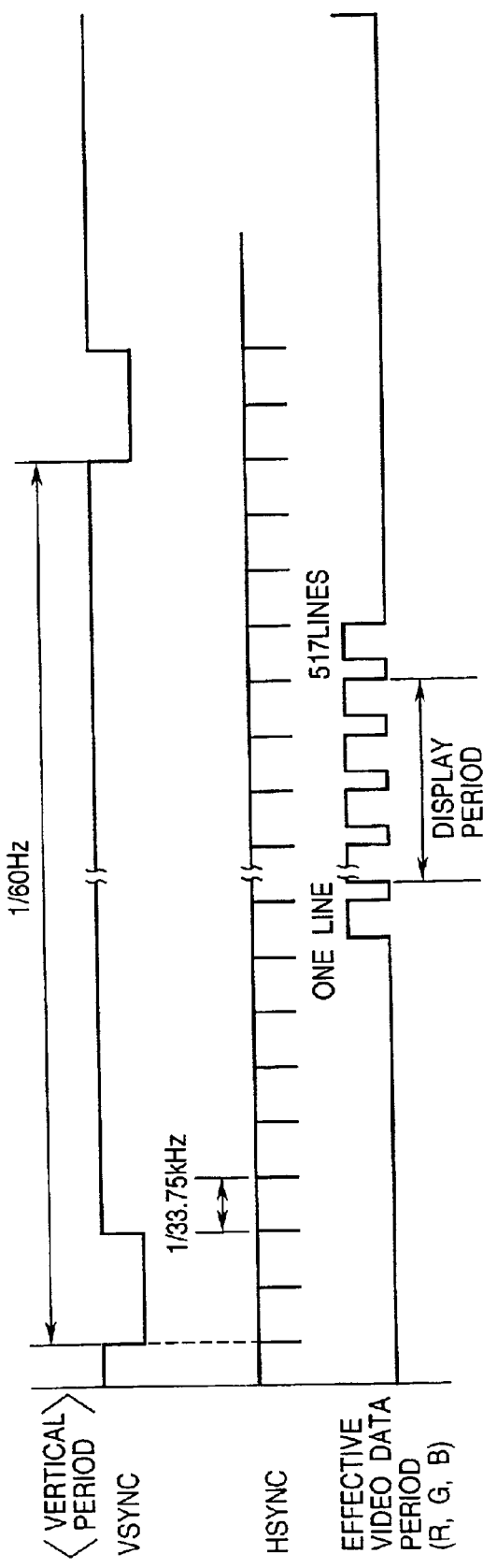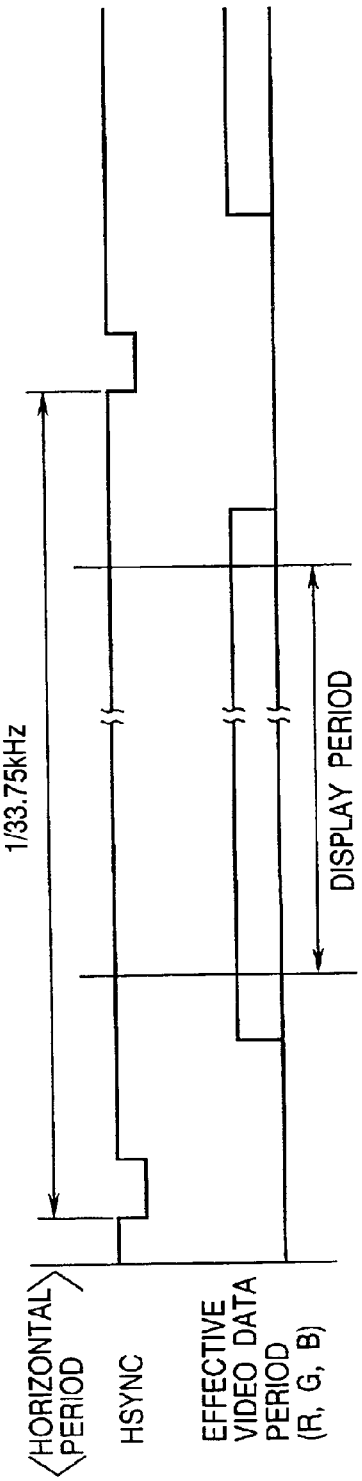

FIG. 14A
DISPLAY→TERMINAL

| | |
|---|---|
| HEADER DATA 1 | |
| 2 | DISPLAY TYPE 1 |
| 3 | DISPLAY TYPE 2 |
| 4 | DISPLAY TYPE 3 |
| 5 | COMMAND 1 (ADJUSTMENT MODE) |
| 6 | COMMAND 2 (ADJUSTMENT RIGHT) |
| 7 | CONTRAST |
| 8 | COLOR TEMPERATURE 1 (G_LEVEL) |
| 9 | COLOR TEMPERATURE 2 (B_LEVEL) |
| 10 | COLOR TEMPERATURE 3 (R_LEVEL) |
| 11 | BRIGHTNESS |
| 12 | G_Black LEVEL |
| 13 | B_Black LEVEL |
| 14 | R_Black LEVEL |
| 15 | GAMMA / G_GAMMA |
| 16 | B_GAMMA / R_GAMMA |
| 17 | DISPLAY MODE |
| 18 | HORIZONTAL / VERTICAL DISPLAY SIZE |
| 19 | HORIZONTAL / VERTICAL DISPLAY POSITION |
| 20 | VOLUME |
| 21 | VOLUME L & R BALANCE |
| 22 | DISPLAY AUDIO SPECIFICATION |
| 23 | |
| | CHECK SUM |

FIG. 14B
TERMINAL→DISPLAY

| | |
|---|---|
| DATA 1 | |
| 2 | RECEPTION SIGNAL TYPE 1 |
| 3 | RECEPTION SIGNAL TYPE 2 |
| 4 | RECEPTION SIGNAL TYPE 3 |
| 5 | COMMAND 1 (ADJUSTMENT MODE) |
| 6 | COMMAND 2 (ADJUSTMENT RIGHT) |
| 7 | CONTRAST |
| 8 | COLOR TEMPERATURE 1 (G_LEVEL) |
| 9 | COLOR TEMPERATURE 2 (B_LEVEL) |
| 10 | COLOR TEMPERATURE 3 (R_LEVEL) |
| 11 | BRIGHTNESS |
| 12 | G_Black LEVEL |
| 13 | B_Black LEVEL |
| 14 | R_Black LEVEL |
| 15 | GAMMA / G_GAMMA |
| 16 | B_GAMMA / R_GAMMA |
| 17 | DISPLAY MODE |
| 18 | HORIZONTAL / VERTICAL DISPLAY SIZE |
| 19 | HORIZONTAL / VERTICAL DISPLAY POSITION |
| 20 | VOLUME |
| 21 | VOLUME L & R BALANCE |
| 22 | |
| 23 | |
| | CHECK SUM |

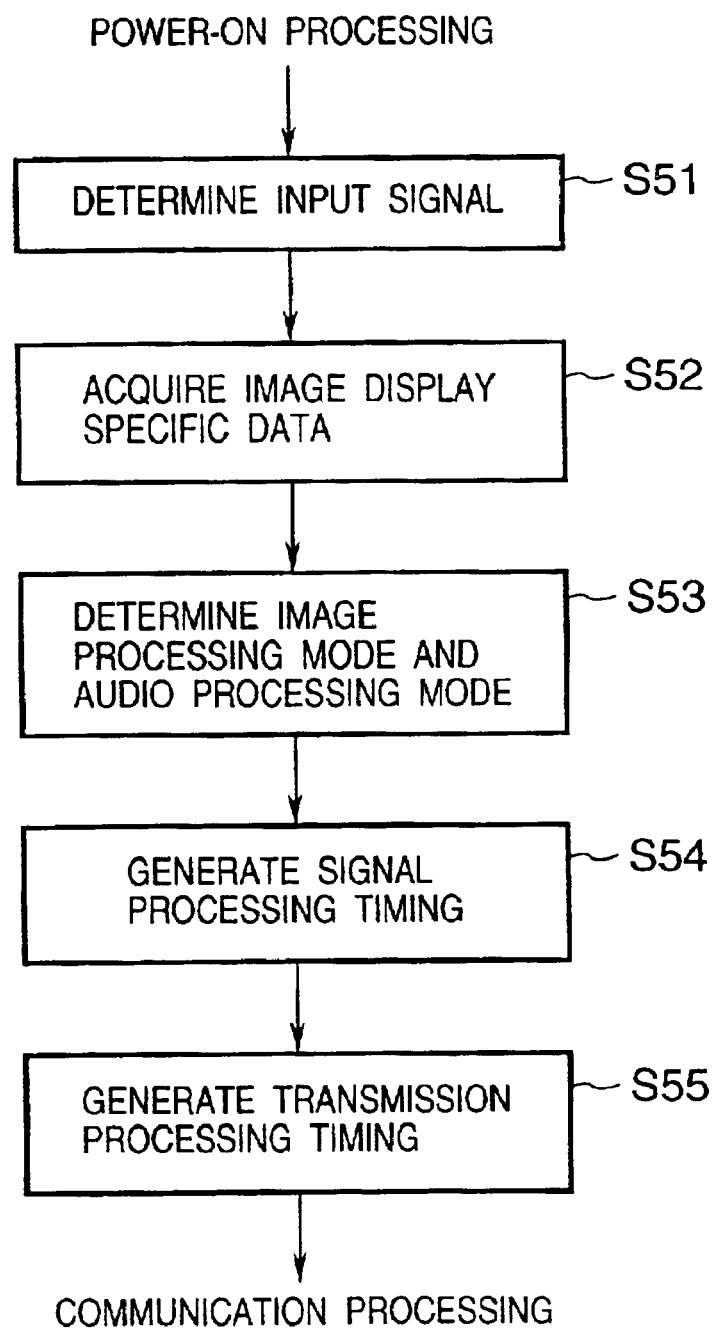

IMAGE DISPLAY CONTROL SYSTEM AND METHOD ALLOWING CONNECTION OF VARIOUS KINDS OF IMAGE DISPLAYS TO ONE SUPPLY SOURCE

FIELD OF THE INVENTION

The present invention relates to an image display control system having a supply source for transmitting a signal including at least a video signal, and an image display for receiving a signal from the supply source and displaying a corresponding image, and an image display system control method.

BACKGROUND OF THE INVENTION

FIG. 49 shows an arrangement used to display various images on a television receiver for receiving and displaying a conventional television program. As shown in FIG. 49, the television receiver is conventionally connected to a terrestrial television broadcasting (VHS/UHF) antenna line and satellite broadcasting (BS) antenna line as antenna lines. As cables extending from other display information supply sources, the television receiver is connected to signal cables such as a video signal line and acoustic signal line from a video cassette recorder, a video signal line and acoustic signal line from an LD/DVD playback apparatus, and a signal line from a digital broadcasting receiver (STB).

In this manner, the conventional television receiver is integrally constituted by a display, input signal selector such as a tuner, and the like. This inevitably makes the main body large in depth, resulting in a bulky housing.

The trend in recent years has been to reduce the depth of televisions, and flat type televisions have become available. This flat type television must be made as thin as possible, and must be light in weight. In a television of this type, therefore, an image display and a terminal for supplying display information to the image display have separate housings.

In the conventional flat type television of this type and the like, an image display and a terminal form one television receiver. For example, one terminal can be connected to only one kind of image display.

Inconveniently, the television quality or the like can only be adjusted from either the terminal or image display.

The image display and terminal, paired to form one television receiver, basically operate independently. As a matter of course, the image display and terminal may be manufactured at different times, or only one of them may be exchanged.

The image display and terminal may be manufactured with a large time difference or undergo minor changes. In this case, the image display and terminal may have different operating specifications. The image display and terminal used in this situation cannot take full advantage of the advantages or improvements in each piece of equipment.

Most of image displays and terminals of this type operate under the control of microcomputers, and their versions can be made to coincide with each other by changing some programs. Conventionally, however, upgrading requires a special operation by a specialist.

This problem also arises when the image display is to be exchanged with one from a different manufacturer, or of a different size, or having a different display method.

SUMMARY OF THE INVENTION

It is an object of the present invention to provide an image display control system having a supply source for transmitting a signal including at least a video signal, and an image display for receiving a signal from the supply source and displaying a corresponding image, in which one supply source can connect to various kinds of image displays.

It is another object of the present invention to provide easy adjustment of an image display from the supply source connected thereto.

It is still another object of the present invention to allow for easy changes of the specifications and version of the control program of the image display.

To achieve the above objects, according to the first aspect of the present invention, an image display control system comprises a supply source for transmitting a signal including at least a video signal, and an image display for receiving the signal from the supply source and displaying a corresponding image, the supply source including characteristic acquisition means for acquiring characteristic data of the image display when the supply source is powered on, determination means for determining a signal communication specification with the image display on the basis of the characteristic data acquired by the characteristic acquisition means, and communication means for communicating a signal including the video signal with the communication specification determined by the determination means, and the image display including characteristic transmission means for transmitting characteristic data for specifying a characteristic of the image display to the supply source, and display communication means for communicating the signal including the video signal determined by the determination means of the supply source.

In this case, the characteristic acquisition means comprises, for example, characteristic request means for transmitting a characteristic data transmission request to the image display, detection means for detecting a connection request including characteristic data from the image display, and characteristic detection means for detecting the characteristic data sent back from the image display, and the image display comprises connection request transmission means for transmitting a connection request including characteristic data of the image display to the supply source, and characteristic transmission means for transmitting characteristic data of the image display in correspondence with a characteristic data transmission request from the supply source.

The characteristic request means preferably stops transmitting the characteristic data transmission request when no characteristic data is sent back from the image display even upon transmitting the characteristic data transmission request a predetermined number of times after the supply source is powered on. Alternatively, the connection request transmission means monitors detection of the characteristic data transmission request from the supply source when no characteristic data transmission request is sent back from the supply source even upon transmitting the connection request a predetermined number of times after the image display is powered on.

It is more preferable that the characteristic data transmission request from the characteristic request means include a specification information transmission request of the image display, and the image display send back specification information of the image display in correspondence with the specification information transmission request.

The characteristic data transmission request from the characteristic request means includes an adjustment information transmission request of the image display, and the image display sends back adjustment information of the image display in correspondence with the adjustment information transmission request. Alternatively, the determination means preferably specifies a display screen size of the image display from the characteristic data, obtains a video signal amount to be transmitted in correspondence with the specified display screen size, and determines a signal communication specification.

The signal communication specification determined by the determination means preferably includes a vertical synchronization period, a horizontal synchronization period, and a video signal transmission clock period for transmitting a video signal.

The characteristic data of the image display preferably includes at least any one of
- the number of pixels and pixel layout of a display device of the image display,
- an emission characteristic of the display device of the image display,
- a gray level characteristic of the image display (the number of gray levels and a gamma characteristic of the display device),
- the type of image display (a screen size, an aspect ratio, and the type of device),
- a specification of an audio playback system of the image display, and
- a displayable frame frequency of the image display.

With this arrangement, the supply source can transmit a video signal in accordance with the characteristics of a connected image display. Hence, the supply source can easily transmit a video signal in accordance with even changed characteristics of the connected image display.

At the start of operation, the supply source can reliably recognize the adjustment state of the image display. Any error caused by a shift in adjustment result can be prevented prior to operation.

To achieve the above objects, according to the second aspect of the present invention, an image display control system comprises a terminal for transmitting a signal including at least a pair of video and acoustic signals, and an image display for receiving the signal from the terminal and displaying a corresponding image, the terminal including request means for detecting a program specification held in the image display upon powering on the terminal, and when program download is determined to be necessary from the detected program specification, requesting program download of the image display, and program download means for downloading a program, and the image display including program update means for storing, in a corresponding program memory of the image display, the downloaded program transmitted subsequently upon reception of the program download request.

In this case, the request means preferably acquires a program ID stored in the program memory of the image display, and detects a program specification.

When the request means determines that program download is unnecessary and upon completion of program download, the terminal preferably performs display control for the image display.

With this arrangement, a program specification concerning display control of the image display can be updated prior to display control, and a desired display quality can be easily obtained. The processing version of the image display can also be upgraded.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are timing charts showing output timing of the input I/F when an NTSC image signal is input to the input I/F in the first embodiment shown in FIG. 4;

FIGS. 6A and 6B are timing charts showing output timing of the input I/F when an HDTV image signal is input to the input I/F in the first embodiment shown in FIG. 4;

FIGS. 14A and 14B are views each showing an adjustment data format in the first embodiment;

FIG. 15 is a flow chart showing operation mode setup processing of the terminal in the first embodiment;

DETAILED DESCRIPTION OF THE PREFERRED EMBODIMENTS

Preferred embodiments of the present invention will now be described in detail in accordance with the accompanying drawings.

First Embodiment

Figure 1:
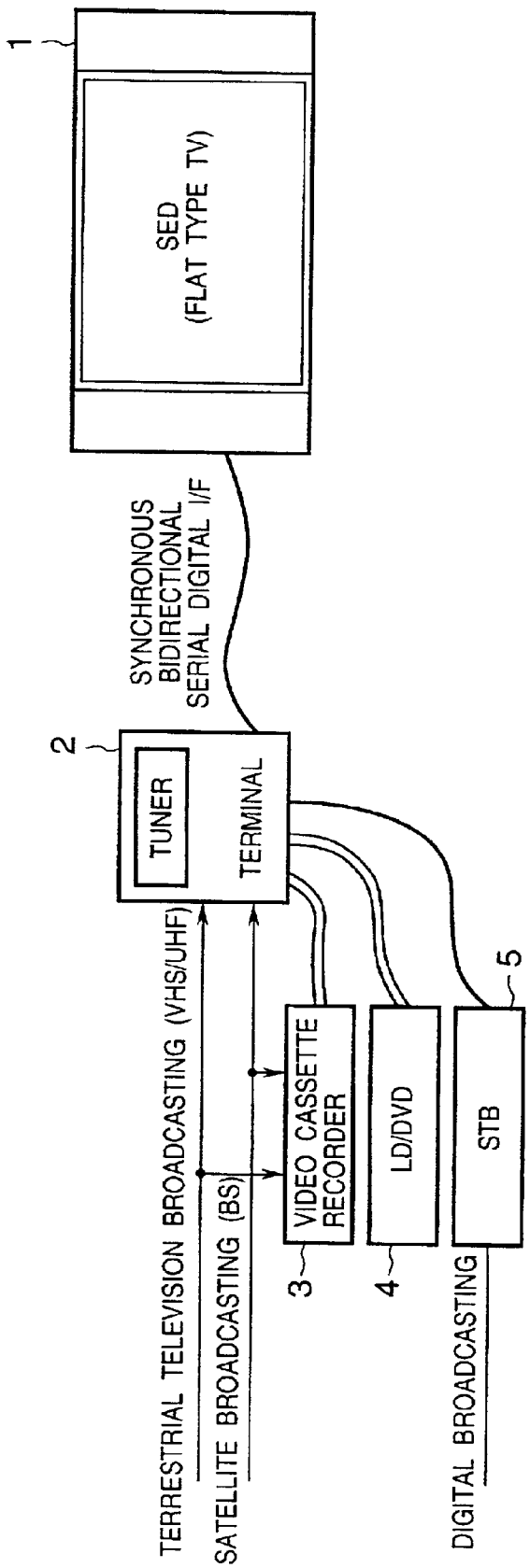
FIG. 1 is a block diagram for explaining the basic arrangement according to the first embodiment of the present invention.

FIG. 1 is a view for explaining the basic arrangement according to the first embodiment of the present invention. In FIG. 1, reference numeral 1 denotes an image display which has a wall-mounted thin structure in this embodiment; and reference numeral 2, a terminal which outputs display data and acoustic data to the image display 1 in accordance with synchronous bidirectional serial data (to be described later), and includes a tuner for receiving a television program, as will be described later.

Reference numeral 3 denotes a video cassette recorder serving as a supply source of an image and acoustic signal to the terminal 2; reference numeral 4, an LD/DVD player for playing back a laser disk or DVD disk; and reference numeral 5, an STB for receiving and selecting a digital program.

The terminal 2 is connected to connection cables extending from the supply sources for the respective image signals and the like, and to a terrestrial television broadcasting (VHS/UHS) antenna line and satellite broadcasting (BS) antenna line extending to the tuner. As the communication medium between the terminal 2 and image display 1, only one thin cable is basically connected. Even in the wall-mounted image display, the cable layout is simplified and does not impair appearance.

The specific arrangements of the image display 1 and terminal 2 according to the first embodiment in the above system arrangement will be explained with reference to FIG. 2. The specific arrangement of the image display 1 will be first described.

In the image display 1, reference numeral 101 denotes a display CPU which controls the whole image display 1, and incorporates a ROM storing a control sequence and the like shown in a flow chart (to be described later). The display CPU 101 executes reception control of various reception data in accordance with command data received by the terminal 2 via a display modem 103. The display CPU 101 controls each unit via a control bus 151.

Reference numeral 102 denotes a connection cable receiving connector to the terminal 2. The image display 1 also includes the display modem 103. Reference numeral 104 denotes a timing generator for generating the control timing of the image display 1 under the control of the display CPU 101 in accordance with a regenerated SYNC signal or CLK signal from the display modem 103.

Reference numeral 105 denotes a video signal processor for converting a 24-bit digital video signal decoded by the display modem 103 into a luminance image signal which can be displayed on a display panel 110. Reference numeral 106 denotes a panel driver for driving the display panel 110 with a luminance signal from the video signal processor 105 at timing from the timing generator in accordance with driving conditions from the display CPU 101. The image display 1 comprises the display panel 110.

Reference numeral 121 denotes a D/A converter for receiving a 16-bit digital audio signal from the display modem 103 at the reception timing from the timing generator and converting the received signal into a corresponding analog audio signal. Reference numeral 122 denotes an audio amplifier for amplifying an input analog signal from the D/A converter 121, and reference numeral 123 denotes a speaker.

Reference numeral 130 denotes a user interface (user I/F) for inputting various operations from the user. These operations include, e.g., display adjustment and detection of a remote controller input.

Next, details of the terminal 2 will be described.

In the terminal 2, reference numeral 201 denotes a terminal CPU which controls the whole terminal 2, and includes a ROM storing a control sequence and the like shown in a flow chart (to be described later). The terminal CPU 201 controls a timing generator 204 and video signal processor 205 so as to transmit display data with a desired format via a terminal modem 203. The terminal CPU 201 similarly outputs control command data to the image display 1 via the terminal modem 203. The terminal CPU 201 controls each unit via a control bus 251.

Reference numeral 202 denotes a cable connector to the image display 1. The terminal 2 comprises the terminal modem 203, and terminal timing generator 204 for outputting a SYNC signal or CLK signal, a command timing signal representing command transmission timing, and the like controlling the terminal CPU 201 and to the terminal modem 203.

The video signal processor 205 receives an input image signal from an input I/F 220 and an image signal (video signal) from a tuner 240, converts a received signal into a corresponding 24-bit digital video signal, and outputs the digital video signal to the terminal modem 203. Reference numeral 210 denotes an audio signal processor for similarly receiving an input acoustic signal (audio signal or the like) from the input I/F 220, converting the received signal into a corresponding 16-bit digital acoustic signal, and outputting the digital acoustic signal to the terminal modem 203.

The input I/F 220 interfaces the supply sources (3 to 5) for respective pieces of image information and the like shown in FIG. 1. Further, the input I/F 220 receives an image information signal and acoustic signal from the tuner 240, identifies either input under the control of the terminal CPU 201, and outputs an acoustic signal to the audio signal processor 210, an image information signal as a video signal to the video signal processor 205, a clock signal such as a SYNC signal to the timing generator 204, and input signal determination data to the terminal CPU 201.

Reference numeral 230 denotes a user interface (user I/F) for inputting various operations from the user. These operations include, e.g., display adjustment and detection of a remote controller input. The tuner 240 receives terrestrial television program signals and satellite program signals. Reference numerals 221 to 223 denote input terminals extending from the supply sources (3 to 5). Reference numeral 241 denotes a terrestrial television broadcasting antenna input; and reference numeral 242, a satellite broadcasting antenna input.

The terminal 2 having this arrangement is not limited by the specifications of a connected image display, and allows connecting image displays of various specifications so long as they have similar interface specifications.

The specific arrangements of the interface circuit portion and modem input/output portion between the terminal 2 and image display 1 will be explained with reference to FIG. 3.

In the display modem 103, reference numeral 310 denotes an input/output driver circuit for receiving a signal through a cable in accordance with a communication direction control signal from the timing generator 104 and outputting a signal from a modulator 312. Reference numeral 311 denotes a demodulator for demodulating a reception signal from the receiver of the input/output driver circuit 310, converting the demodulated serial demodulation data into 24-bit demodulated parallel data, and outputting the demodulated parallel data. The modulator 312 converts 16-bit parallel control data from the display CPU 101 into serial data, modulates the serial data, and outputs the modulated data to the driver of the input/output driver circuit 310.

Reference numeral 313 denotes a demultiplexer for demultiplexing a demodulated signal in response to a timing control signal from the timing generator 104 and distributing the demultiplexed signal to each unit. The demultiplexer 313 outputs a regenerated SYNC signal and CLK signal to the timing generator 104, outputs a demultiplexed video signal to the video signal processor 105, outputs a demultiplexed acoustic signal to the D/A converter 121, and outputs demultiplexed command information to the display CPU 101. Reference numeral 314 denotes a driver circuit for outputting control data from the display CPU to the modulator 312.

In the terminal modem 203, reference numeral 320 denotes an input/output driver circuit for receiving a signal through a cable in accordance with a communication direction control signal from the timing generator 204 and outputting a signal from a modulator 322. Reference numeral 321 denotes a demodulator for demodulating a reception signal from the receiver of the input/output driver circuit 320, converting the demodulated serial demodulation data into 16-bit demodulated parallel data, and outputting the demodulated parallel data to the terminal CPU 201 via a driver circuit 324. The modulator 322 converts a 24-bit parallel multiplexed signal from a multiplexer 323 into serial data, modulates the serial data, and outputs the modulated data to the driver of the input/output driver circuit 320.

The multiplexer 323 receives a video signal from the video signal processor 205, an acoustic signal from the audio signal processor 210, and control information from the terminal CPU 201, multiplexes these signal and information in response to a timing signal from the timing generator 204 so as to prevent these signal and information from overlapping each other, and outputs the multiplexed signal to the modulator 322. The driver circuit 324 outputs control data from the image display 1 via the demodulator 321 to the terminal CPU 201.

In the first embodiment, the terminal 2 and image display 1 are adapted to exchange various kinds of information via only a pair of signal lines, and hence the connection cable can be simplified and thinned. Basically, the connection cable connecting the image display 1 and terminal 2 is a twisted pair cable. The transmission format is determined by the specifications of the image display 1 (to be described later) and the type of input signal received by the terminal 2.

Figure 46:
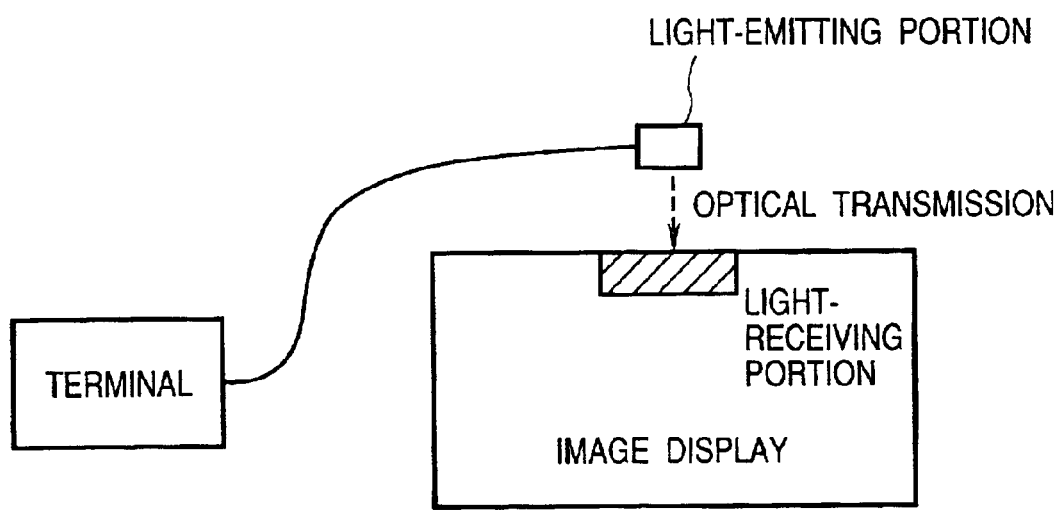
FIG. 46 is a block diagram for explaining an example in which part of an interface cable adopts radio communication in the eighth embodiment of the present invention.

However, the communication medium connecting the two image display and terminal is not limited to an electric conductor cable, but may be an optical signal communication line such as an optical fiber or wireless communication such as electromagnetic waves. For example, as shown in FIG. 46 (to be described later), the communication medium may employ an optical communication unit attached to the upper or lower portion of the display, and a terminal-side optical communication unit installed near the optical communication unit of the display that is connected to the terminal via an electric wire or the like.

Figure 4:
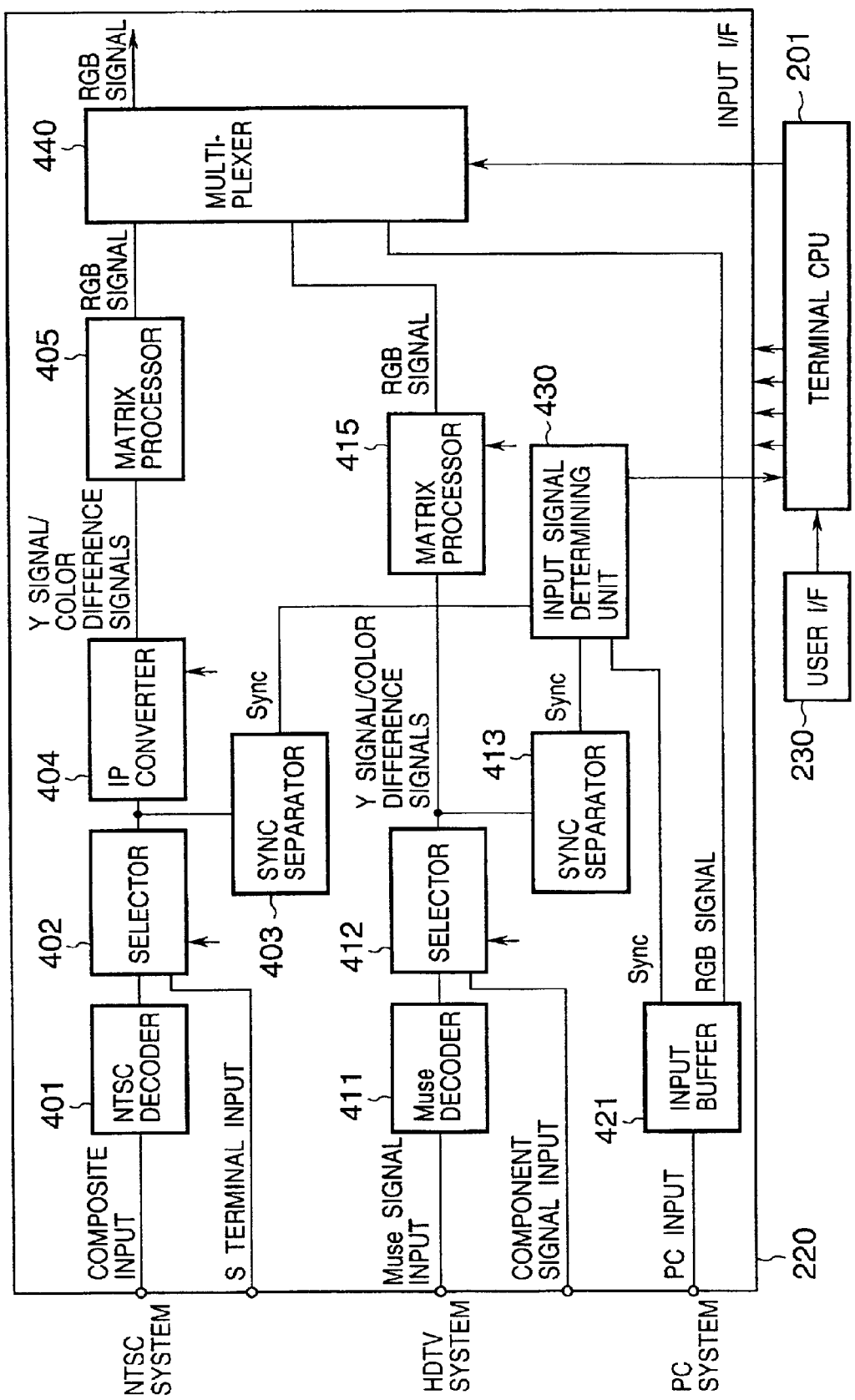
FIG. 4 is a block diagram showing a detailed arrangement of a portion of the input I/F of the first embodiment in which pieces of image information of different specifications are received and output to a video signal processor.

The input I/F 220 of the first embodiment is adapted to input pieces of image information of various specifications. FIG. 4 shows an arrangement of a portion of the input I/F 220 of this embodiment in which the pieces of image information of different specifications are received and output to the video signal processor 205. Although FIG. 4 shows only an image signal, the input I/F 220 also receives, as for an acoustic signal, signals of different specifications, converts them into common specifications, and outputs the converted signals.

The image information input portion of the input I/F 220 is adapted to input a composite input and S terminal input of NTSC specifications, a Muse signal input and component signal input of HDTV specifications, and a PC input of PC (computer graphics) specifications. The input I/F 220 converts signals of these specifications into R, G, and B signals, and outputs the R, G, and B signals to the video signal processor 205.

For example, an NTSC composite signal is sent via the composite input to an NTSC decoder 401 where the signal is decoded and output to a selector 402. The selector 402 also receives an S input signal via the S terminal input, and selects either input. In this case, the selector 402 is preferably controlled to give priority to the S terminal input.

A signal from the selector 402 is sent to an IP converter 404 and sync separator 403. The IP converter (Interlaced/Progressive converter) 404 receives a video signal. If progressive scanning is requested in accordance with the specifications of the image display 1, the IP converter 404 outputs, e.g., Y signal/color difference signals acquired by converting a video signal of 240 lines/60 Hz into a signal of 480 lines/60 Hz. If the image display 1 comprises a panel with the number of pixels (320×240) corresponding to QVGA, the IP converter 404 does not execute any IP conversion, and directly outputs a video signal of 240 lines/60 Hz.

A matrix processor 405 converts the signal from the IP converter 404 into corresponding R, G, and B signals, and outputs them to a multiplexer 440. On the other hand, the sync separator 403 separates synchronization signals (H-SYNC signal and V-SYNC signal), and outputs them to an input signal determination unit 430.

For example, a HDTV Muse signal is decoded by a Muse decoder 411 and output to a selector 412. In the first embodiment, high-vision component signals are also input, and directly input to the selector 412 which selects either input. In this case, the selector 412 is controlled to give priority to the component inputs.

The Y signal/color difference signals from the selector 412 are sent to a matrix processor 415. The matrix processor 415 converts these signals into corresponding R, G, and B signals, and outputs them to the multiplexer 440. On the other hand, a sync separator 413 separates synchronization signals (H-SYNC signal and V-SYNC signal), and outputs them to the input signal determination unit 430. Moreover, for example, a PC input signal of PC specifications is received by an input buffer 421, a synchronization signal is sent to the input signal determination unit 430, and R, G, and B signals are output to the multiplexer 440.

The input signal determination unit 430 receives each synchronization signal (SYNC signal), determines an input signal on the basis of the frequency and type (polarity, H/V-separated or mixed SYNC, and the like) of received synchronization signal, and informs the terminal CPU 201 of the determination results. The multiplexer 440 selects one of the input signals under the control of the terminal CPU 201, and outputs the selected signal to the video signal processor 205.

FIGS. 5A and 5B show output timing of the input I/F 220 when an NTSC image signal is input to the input I/F 220 shown in FIG. 4.

The example shown in FIGS. 5A and 5B show timing when as an output from the input I/F 220, a signal having an effective video period of about 480 lines for the vertical period and about 28.6 µS for the horizontal period is displayed by over-scanning of about 10%. The display period is about 430 lines for the vertical period, and about 25.7 µS for the horizontal period. In the first embodiment, the default settings of 10% over-scanning and the like can be changed via the user I/F 230.

In NTSC specifications, as shown in FIGS. 5A and 5B, an NTSC image signal is input such that a vertical synchronization signal (VSYNC signal) arrives at a period of 1/59.94 Hz and is converted by the IP converter at a double speed, and a horizontal synchronization signal (HSYNC signal) arrives at a period of 1/31.47 kHz.

Then, for example, the period shown in FIGS. 5A and 5B is received by the video signal processor 205 and sampled again so as to match the resolution of the image display 1. When the display panel 110 of the image display has 852×480 pixels, the horizontal synchronization signal is sampled by a CLK signal of about 33.1 MHz, and the vertical synchronization signal undergoes, e.g., inter-line interpolation so as to change image data of about 430 lines into image data of about 480 lines.

FIGS. 6A and 6B show output timing of the input I/F 220 upon reception of an HDTV input which is also a television image. The example in FIGS. 6A and 6B show timing when an output from the input I/F 220 is displayed by over-scanning of about 7%.

As shown in FIGS. 6A and 6B, an HDTV image signal is input such that a vertical synchronization signal (VSYNC signal) arrives at a period of 1/60 Hz, and a horizontal synchronization signal (HSYNC signal) arrives at a period of 1/33.75 kHz. Then, for example, the period shown in FIGS. 6A and 6B is received by the video signal processor 205 and sampled again so as to match the resolution of the image display 1. When the display panel 110 of the image display has 852×480 pixels, the horizontal synchronization signal is sampled by a CLK signal of about 35.5 MHz, and about 480 lines of the vertical synchronization signal among 517 effective lines are directly output.

The control of the first embodiment having the above arrangement will be described. The terminal 2 of this embodiment is adapted to control image displays of various specifications, as described above. For this reason, when the terminal 2 is powered on, power-on processing to confirm the specifications of a connected image display is first executed.

An operation confirmation control sequence with the image display 1 after the terminal 2 is powered on will be explained with reference to FIG. 7. According to this operation confirmation control sequence, the specifications of a connected image display are unknown, so that an asynchronous communication control sequence using a communication rate of 300 BPS or 1,200 BPS is determined as a communication control sequence capable of most easily performing communication control with a partner. Using this communication control sequence, communication control is executed.

Upon power-on operation, the terminal 2 sends an ID request (connection request) to the image display 1. The image display 1 having received this request immediately sends back the display ID to the terminal 2. If the ID is sent back from the image display 1, the terminal 2 determines that the image display 1 has been powered on.

If the image display 1 has not been powered on when the terminal 2 is powered on, the image display 1 does not send back any response to the ID request. When the terminal 2 does not receive any ID from the image display 1 even upon sending the ID request a predetermined number of times, e.g., n times at a predetermined interval, the terminal 2 determines that the image display 1 has not been powered on yet, and stops access to the image display 1.

When the apparatus of the image display 1 is powered on, the image display 1 monitors a command such as an ID request sent from the terminal 2 during a predetermined period as a standby period. If a command is sent, the image display 1 performs corresponding control. That is, if an ID request is sent, the image display 1 sends back its ID.

Figure 7:
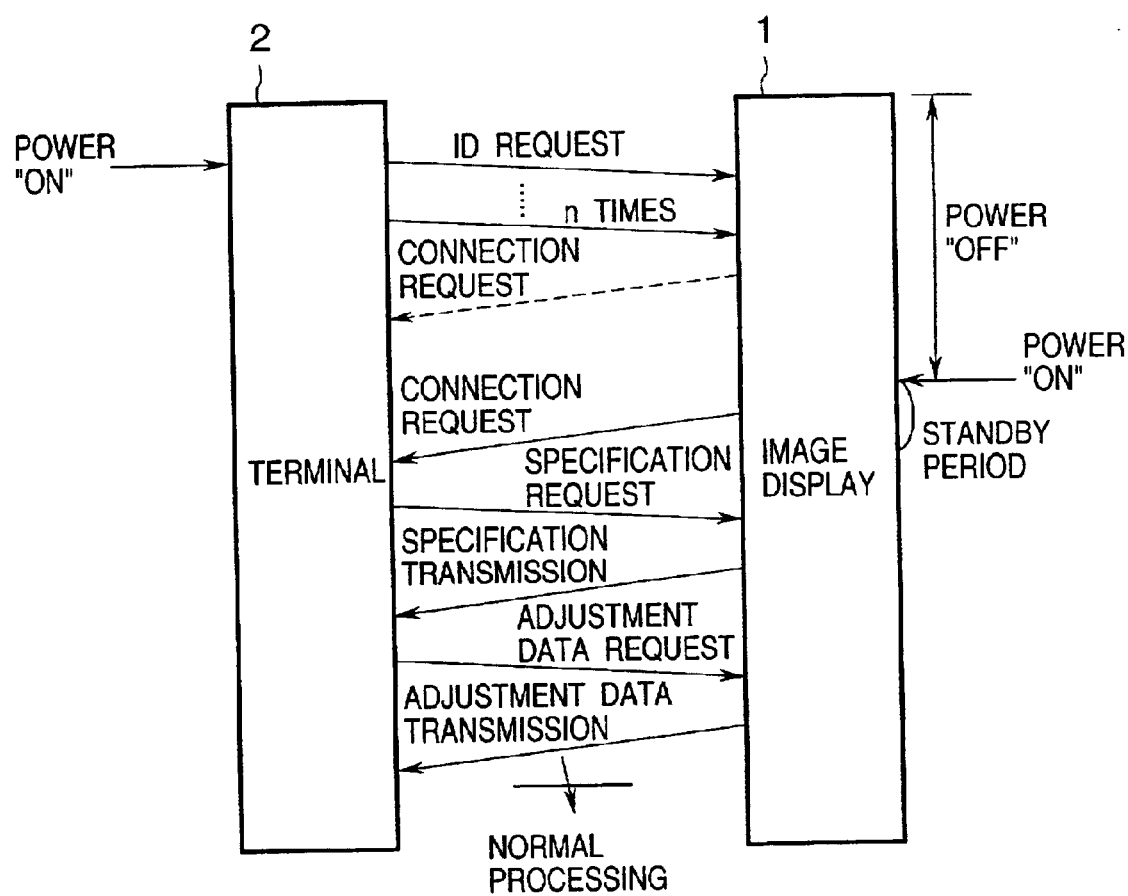
FIG. 7 is a view showing an operation confirmation control sequence with the image display after the terminal is powered on in the first embodiment.

If no connection request or the like is sent from the terminal 2 during the standby period, the image display 1 transmits a connection request (display ID is added as a parameter to the connection request command) to the terminal 2 after the standby period, as shown in FIG. 7. The terminal 2 always monitors reception of a command sent from the image display 1, and when detecting reception of the connection request, requests the image display 1 to transmit its specifications. Then, the image display 1 transmits display specification information to the terminal 2.

The terminal 2 requests transmission of necessary adjustment data based on the specifications. In response to the adjustment data transmission request, the image display 1 transmits the held image display adjustment data to the terminal 2.

Since the terminal 2 can obtain the specifications of the image display 1 from the received data, the terminal 2 shifts to normal processing conforming to the specifications of the image display 1.

When the image display 1 does not receive any reply from the partner terminal 2 even upon transmitting a connection request to the terminal 2 a predetermined number of times after the apparatus is powered on, the image display 1 determines that the connected terminal has not been powered on yet, and enters a mode in which reception of command data from the terminal 2 is monitored. If the terminal 2 is powered on and sends an ID request, the image display 1 shifts to control of sending back a connection request.

More specifically, the first embodiment establishes communication basically using the terminal 2 as a master and the image display 1 as a slave.

In the above description, the terminal 2 stops access after trying to connect a predetermined number of times, and the image display 1 outputs a connection request. Alternatively, it is also possible that the terminal 2 always periodically accesses the image display 1, and the image display 1 does not spontaneously transmit any command always as a slave.

Note that the ID is an identification code which specifies the hardware specifications of the image display, and represents, e.g., the manufacturer and model. The specifications represent the hardware specifications of the image display 1, and include, e.g., the number of pixels of the display panel, pixel layout, color/monochrome, device type, screen size, aspect ratio, the number of gray levels, gamma characteristics, displayable frame frequency, and audio specification. The specifications further include items adjustable on the image display.

Adjustment data includes, e.g., contrast, color balance, brightness, black level, display position, display size, volume, and balance, and can be changed even during normal operation. Adjustment information is exchanged between the image display 1 and terminal 2. Adjustment data also includes information about an adjustment authorization which allows either of the terminal 2 and image display 1 to adjust items adjustable by them.

As will be described later, the terminal 2 stores in a nonvolatile memory (not shown) a pair of ID and specifications of the image display 1 having already been connected. When an ID from the image display 1 coincides with the previous ID, the terminal 2 has already held the specifications and the like of the image display 1, and hence immediately shift to normal processing without requesting any transmission.

In the image display 1, data before power-off operation is stored in the internal nonvolatile memory (not shown) of the display CPU 101 in the image display, and read out and displayed upon power-on operation. Alternatively, readout adjustment data is transmitted from the image display 1 to the terminal 2, and adjustment processing is done in the terminal 2 and image display 1 in accordance with the above-described adjustment authorization.

Figure 8:
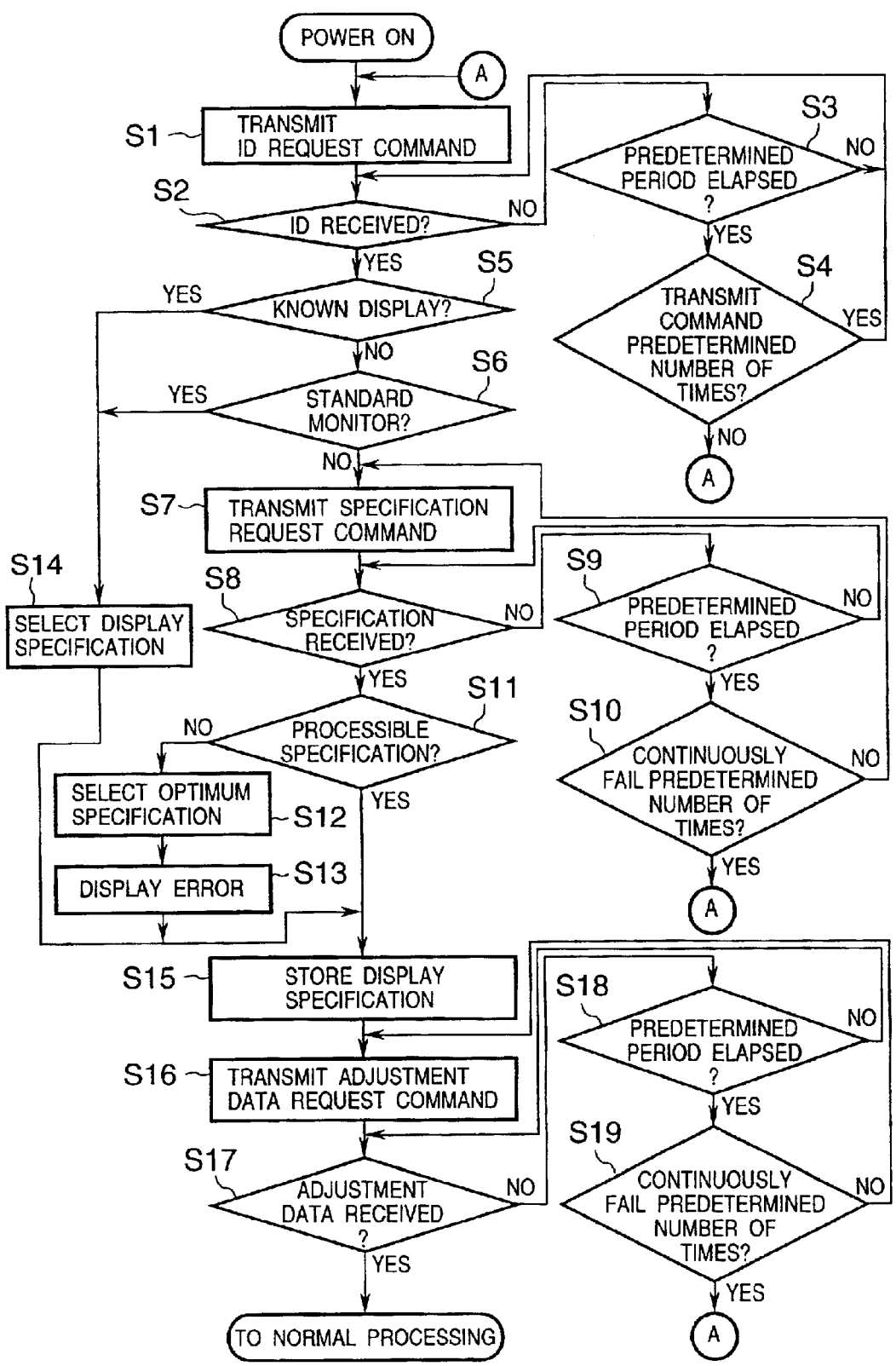
FIG. 8 is a flow chart showing control upon power-on operation of the terminal in the first embodiment.
Figure 9:
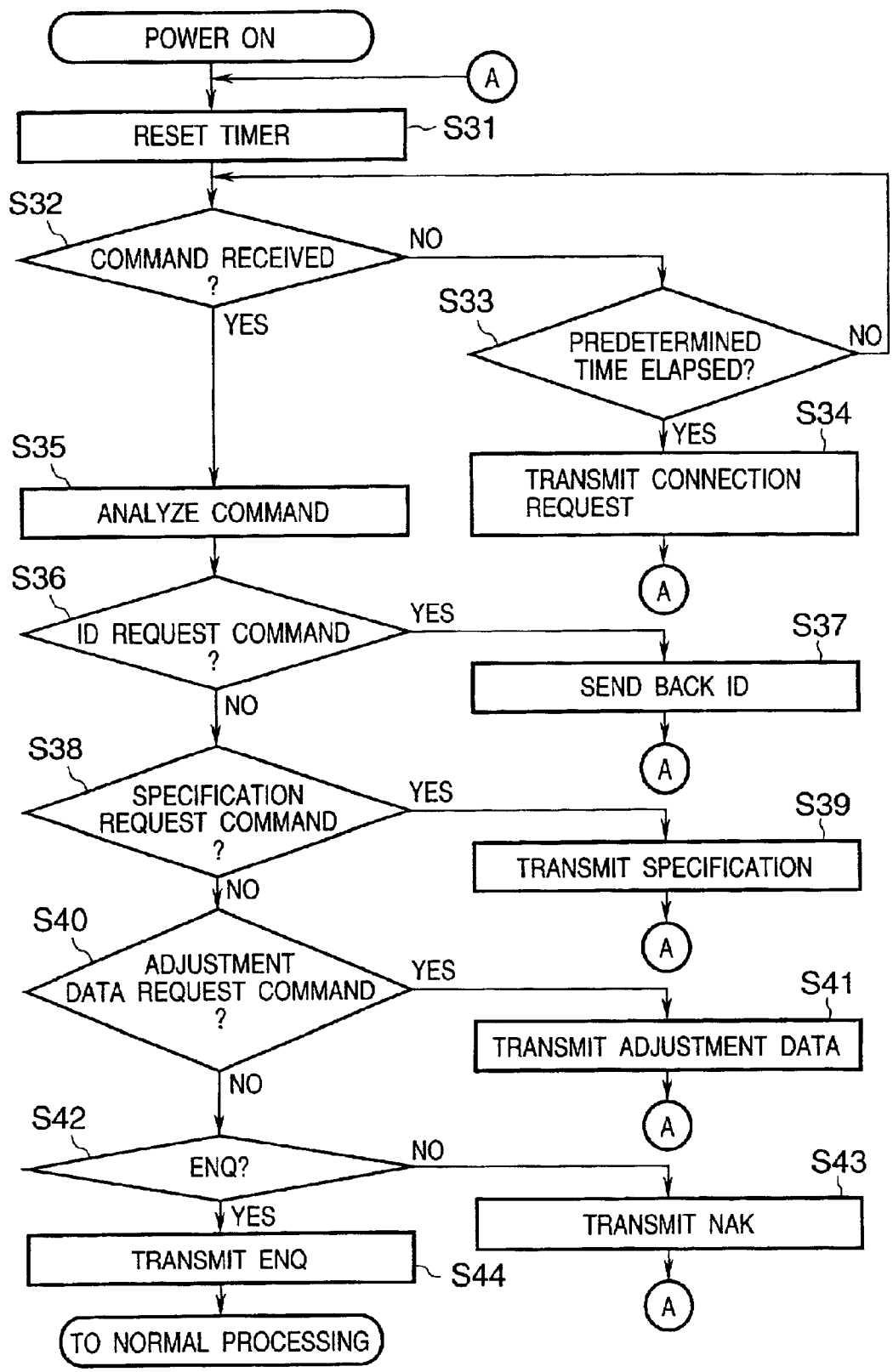
FIG. 9 is a flow chart showing control upon power-on operation of the image display in the first embodiment.

Detailed control upon power-on operation will be explained with reference to FIGS. 8 and 9. FIG. 8 is a flow chart showing control upon power-on operation of the terminal 2 in the first embodiment, and FIG. 9 is a flow chart showing control upon power-on operation of the image display 1 in the first embodiment.

The control of the terminal 2 will be described with reference to FIG. 8. When the terminal 2 is powered on, executes a power-on control sequence shown in FIG. 8 in accordance with a predetermined communication control sequence.

In step S1 of FIG. 8, the terminal 2 transmits an ID request (connection request) command to the connected image display 1. In step S2, the terminal 2 checks whether it receives an ID from the image display 1. If NO in step S2, the terminal 2 shifts to step S3 to check whether a predetermined time has elapsed. If NO in step S3, the terminal 2 returns to step S2 to monitor reception of an ID within the predetermined time. If no ID is sent from the image display 1 even upon the lapse of the predetermined time, the terminal 2 advances to step S4 to check whether to have transmitted an ID request command to the image display 1 a predetermined number of times, e.g., n times. If NO in step S4, the terminal 2 returns to step S1 to transmit an ID request command again.

If YES in step S4, the terminal 2 returns to step S2 to monitor transmission of an ID (connection request) from the image display 1. If the terminal 2 receives the ID from the image display 1, the terminal 2 proceeds from step S2 to step S5, and checks whether the received ID is an ID which has already been held in the terminal 2, and can be used to grasp the specifications of the connected image display.

If NO in step S5, the terminal 2 advances from step S5 to step S6, and checks whether a default switch representing a standard monitor recommended as a standard image display of the terminal 2 is ON (whether the standard monitor is connected). If NO in step S6, the terminal 2 advances to step S7 to transmit a specification request command to the image display 1. In step S8, the terminal 2 checks whether specifications from the image display 1 have been received. If NO in step S8, the terminal 2 shifts to step S9 to check whether a predetermined time has elapsed. If NO in step S9, the terminal 2 returns to step S8 to monitor reception of specifications within the predetermined time. If no specifications are sent from the image display 1 even upon the lapse of the predetermined time, the terminal 2 advances to step S10 to check whether it cannot receive any specifications within the predetermined time upon transmitting a request a predetermined number of times. If NO in step S10, the terminal 2 returns to step S7 to transmit a specification request command again.

If YES in step S10, the terminal 2 determines that the image display 1 has been powered off or disabled, and returns to step S1 to shift to transmission processing of an ID request command to the image display 1.

If YES in step S8, the terminal 2 advances to step S11 to check whether the received specifications are ones applicable to the terminal 2. If YES in step S1, the terminal 2 shifts to step S15.

If NO in step S1, the terminal 2 shifts to step S12 to select specifications considered to be able to most satisfy the received specifications, from specifications applicable to the terminal 2. In step S13, the terminal 2 displays the selected specification information together with an error display. Then, the terminal 2 shifts to step S15.

If YES in step S5 or S6, the terminal 2 advances to step S14 to select held specifications, and shifts to step S15.

In step S15, the terminal 2 stores the selected specifications of the image display 1 in a nonvolatile memory (not shown), and shifts to step S16. In step S16, the terminal 2 requests the image display 1 to transmit necessary adjustment data on the basis of the selected specifications. In step S17, the terminal 2 checks whether adjustment data from the image display 1 has been received. If NO in step S17, the terminal 2 shifts to step S18 to check whether a predetermined period has elapsed. If NO in step S18, the terminal 2 returns to step S17 to monitor reception of adjustment data within the predetermined time. If no adjustment data is sent from the image display 1 even upon the lapse of the predetermined time, the terminal 2 advances to step S19 to check whether it cannot receive any adjustment data within the predetermined time upon transmitting a request a predetermined number of times. If NO in step S19, the terminal 2 returns to step S16 to transmit an adjustment data request command again.

If YES in step S19, the terminal 2 determines that the image display 1 has been powered off or disabled, and returns to step S1 to shift to transmission processing of an ID request command to the image display 1.

If the terminal 2 receives adjustment data in step S17, the terminal 2 can grasp the specifications of the image display 1 from the adjustment data, and thus shifts to normal communication processing conforming to the specifications of the image display 1 in FIG. 7.

The control of the image display 1 will be described. When the image display 1 is powered on, it executes a power-on control sequence (command reception control sequence) shown in FIG. 9, in accordance with a predetermined communication control sequence.

In step S31 of FIG. 9, the image display 1 resets a timer for counting a communication response time. In step S32, the image display 1 checks whether a command has been received. If NO in step S32, the image display 1 shifts to step S33 to check whether a predetermined time has elapsed. If NO in step S33, the image display 1 returns to step S32 to monitor reception of a command within the predetermined time. If the image display 1 does not receive any command from the terminal 2 even upon the lapse of the predetermined time, the image display 1 shifts to step S34 to transmit a connection request including the display ID to the terminal 2. Then, the image display 1 returns to step S31.

If YES in step S32, the image display 1 advances to step S35 to analyze the received command. In step S36, the image display 1 determines whether the analyzed command is an ID request command. If YES in step S36, the image display 1 advances to step S37 to send back the display ID to the terminal 2, and returns to step S31.

If NO in step S36, the image display 1 shifts to step S38 to determine whether the received command is a specification request command. If YES in step S38, the image display 1 shifts to step S39 to send back display specification information to the terminal 2, and returns to step S31.

If NO in step S38, the image display 1 advances to step S40 to determine whether the received command is an adjustment data request command. If YES in step S40, the image display 1 advances to step S41 to send back display adjustment data to the terminal 2, and returns to step S31.

If NO in step S40, the image display 1 advances to step S42 to determine whether the received command is idle communication (ENQ). If NO in step S42, the image display 1 determines that the received command is an invalid one which cannot be executed, and shifts to step S43. Then, the image display 1 sends back NAK (signal representing that the received command is an invalid one) to the terminal 2, and returns to step S31.

If YES in step S42, the image display 1 shifts to step S44 to send back "ENQ", and shifts to normal communication processing.

Figure 10:
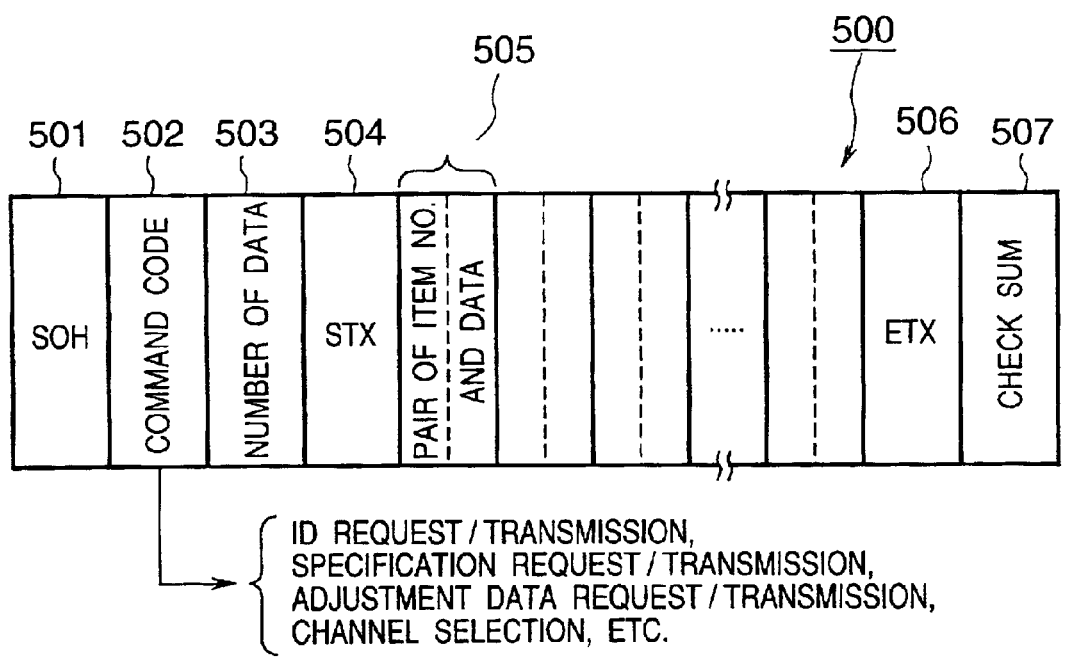
FIG. 10 is a view showing a structure of a communication packet used in communication control upon power-on operation in the first embodiment.

A structure of a communication packet used in transmitting/receiving command data and the like in the above communication control will be described with reference to FIG. 10. FIG. 10 is a view showing a structure of a communication packet used in communication control upon power-on operation in the first embodiment.

In this embodiment, the specifications of a partner apparatus have not been determined, so bit synchronization in communication cannot be established. For this reason, it is desirable to perform asynchronous (start-stop synchronous) communication which enables reception by adding a start bit and stop bit to the head and end of transmission/reception data and establishing synchronization every data transmission/reception.

As a communication control sequence, e.g., an ISO 1745 sequence can be adopted. This sequence is made up of an SOH 501 representing the start of the heading of an information message, a command code 502 and data count 503 constituting the heading, an STX 504 representing the start of the text and the end of the heading, a predetermined number of text data groups 505 each made up of a pair of item number and corresponding data, an ETX 506 representing the end of the text, and a check sum (BCC) 507 for checking whether text data has been transmitted without any error.

The command code 502 includes an ID request command, ID transmission command, specification request command, specification transmission command, adjustment data request command, adjustment data transmission command, channel selection command, and the like. When a video printer is connected (to be described later), the command code 502 includes a video print command and the like.

This packet structure can be used not only in power-on control but also in transmission/reception of command data in normal communication. In the latter case, when a pair of an item number and corresponding item data are transmitted/received as data to be transmitted as text data, only a changed data item among data items is controlled to be transmitted/received, thereby reducing the amount of the transmission/reception data.

In this case, transmission of changed item data must be controlled to be completed only after receiving a confirmation packet, e.g., "ACK" packet representing that an updated data item from a partner apparatus has reliably been received.

Figure 11:
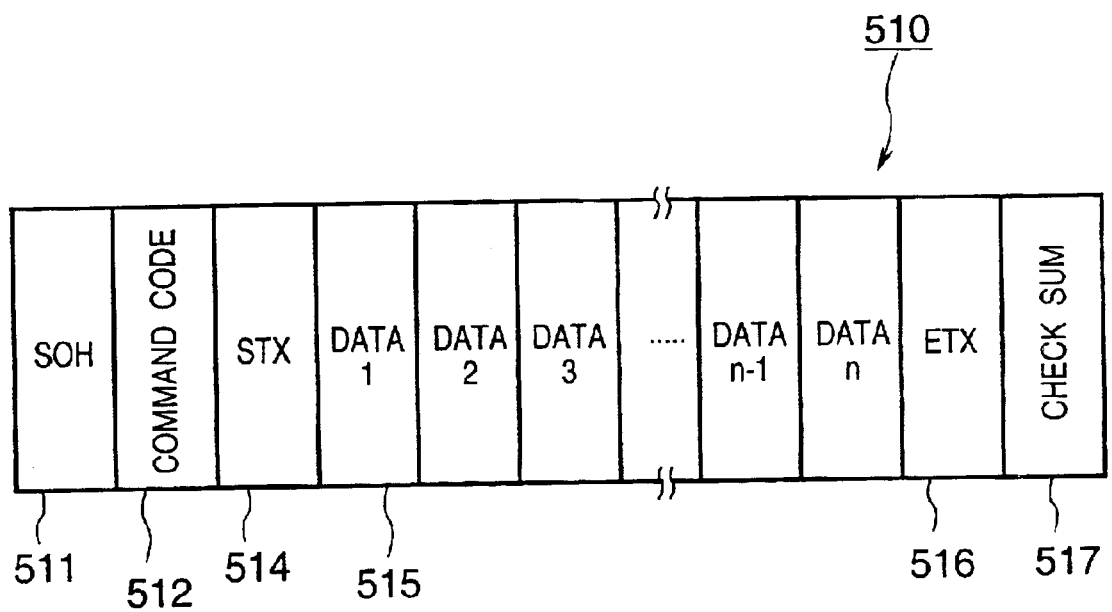
FIG. 11 is a view showing another structure of the communication packet used in communication control upon power-on operation in the first embodiment.

In the above description, a data item number and corresponding item data are transmitted as text data. However, the present invention and embodiments are not limited to this. For example, when the packet is a fixed-length packet having a packet length uniquely determined by a command code, and all the items are to be transmitted though only one item was changed, command data may be communicated using a fixed-length packet shown in FIG. 11.

In this case, compared to the packet structure of FIG. 10, the data count 503 is omitted, and no item number need be transmitted as far as the item order has been determined. Hence, the packet can be made up of an SOH 511, command code 512, STX 514, data 515, ETX 516, and check sum (BCC) 517.

Upon the completion of power-on processing, the processing shifts to normal communication processing. In normal processing, the communication speeds of respective devices and the transmission/reception timing of synchronization signals (VSYNC and HSYNC) between the devices are uniquely determined, and thus various communication control operations corresponding to the synchronization signals are done.

Figure 12:
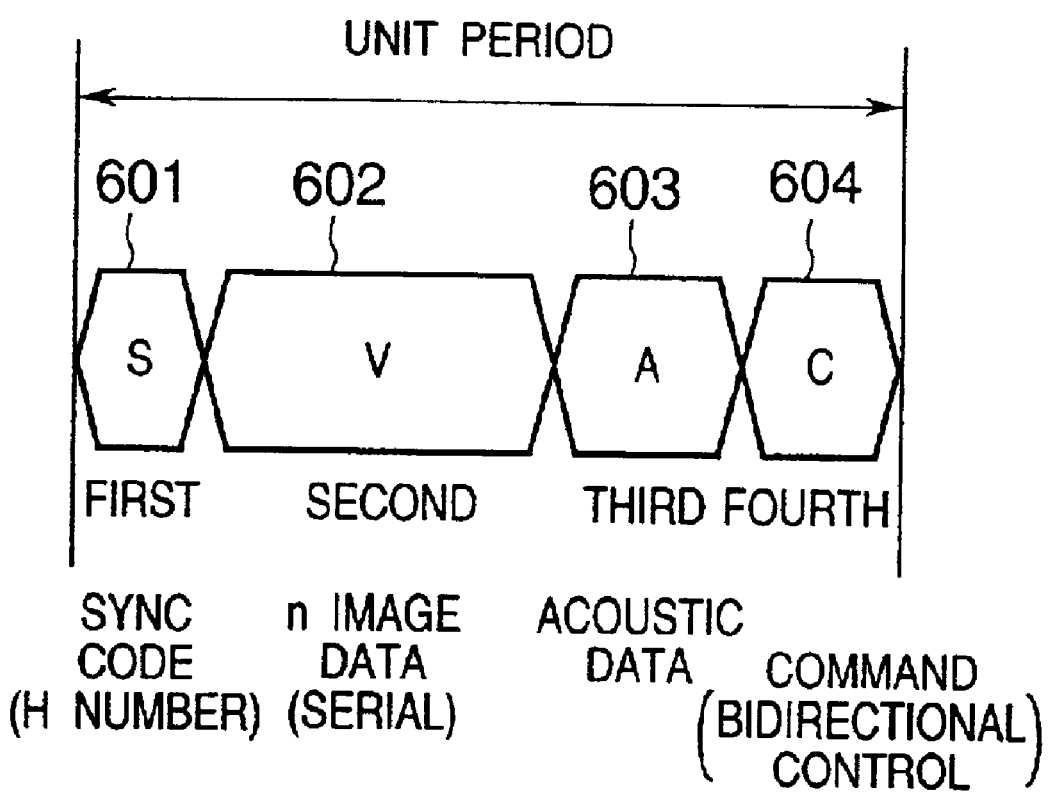
FIG. 12 is a view showing a data structure in a unit period in the first embodiment.
Figure 13:
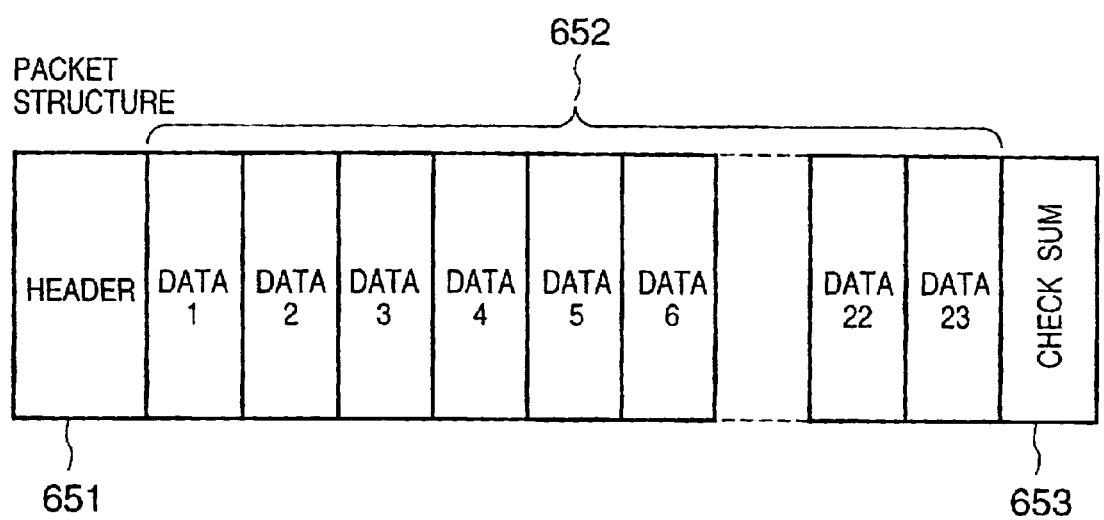
FIG. 13 is a view showing a packet structure in transmitting/receiving a command packet in the first embodiment.

The basic data communication format of the first embodiment will be explained with reference to FIGS. 12 to 14B. FIG. 12 is a view showing a data structure in a unit period in the first embodiment, and FIG. 13 is a view showing a packet structure in transmitting/receiving a command packet. The example of FIG. 13 concerns a fixed-length packet. FIGS. 14A and 14B are views each showing an adjustment data format.

In the first embodiment, image data and acoustic data are communicated in a unit period shown in FIG. 12. This unit period is the period of the horizontal synchronization signal (HSYNC) or vertical synchronization signal (VSYNC) of a video signal.

The unit period is comprised of a first sync code (H number) 601, n second image data (serial) 602, third acoustic data 603, and fourth command data (bidirectional control) 604.

The fourth command data 604 has, e.g., a detailed packet structure shown in FIG. 13. The packet is made up of a header 651 representing the type of command data, data area 652, and check sum 653.

An example of adjustment data is shown in FIG. 14 as a structure of the data field. FIG. 14A shows an example of adjustment data from the image display 1 to the terminal 2, and FIG. 14B shows an example of adjustment data from the terminal 2 to the image display 1.

Adjustment data from the image display 1 to the terminal 2 includes display type data, a command representing the adjustment mode, a command representing the adjustment authorization, contrast setting data, color temperature setting data (G, B, and R), brightness setting data, black level setting data (G, B, and R), gamma adjustment data (G, B, and R), display mode setting data, horizontal/vertical display size setting data, horizontal/vertical display position setting data, volume setting data, right & left volume balance setting data, audio specification setting data of the display, and the like.

On the other hand, adjustment data from the terminal 2 to the image display 1 includes reception signal type data, a command representing the adjustment mode, a command representing the adjustment authorization, contrast setting data, color temperature setting data (G, B, and R), brightness setting data, black level setting data (G, B, and R), gamma adjustment data (G, B, and R), display mode setting data, horizontal/vertical display size setting data, horizontal/vertical display position setting data, volume setting data, right & left volume balance setting data, and the like.

Figure 16:
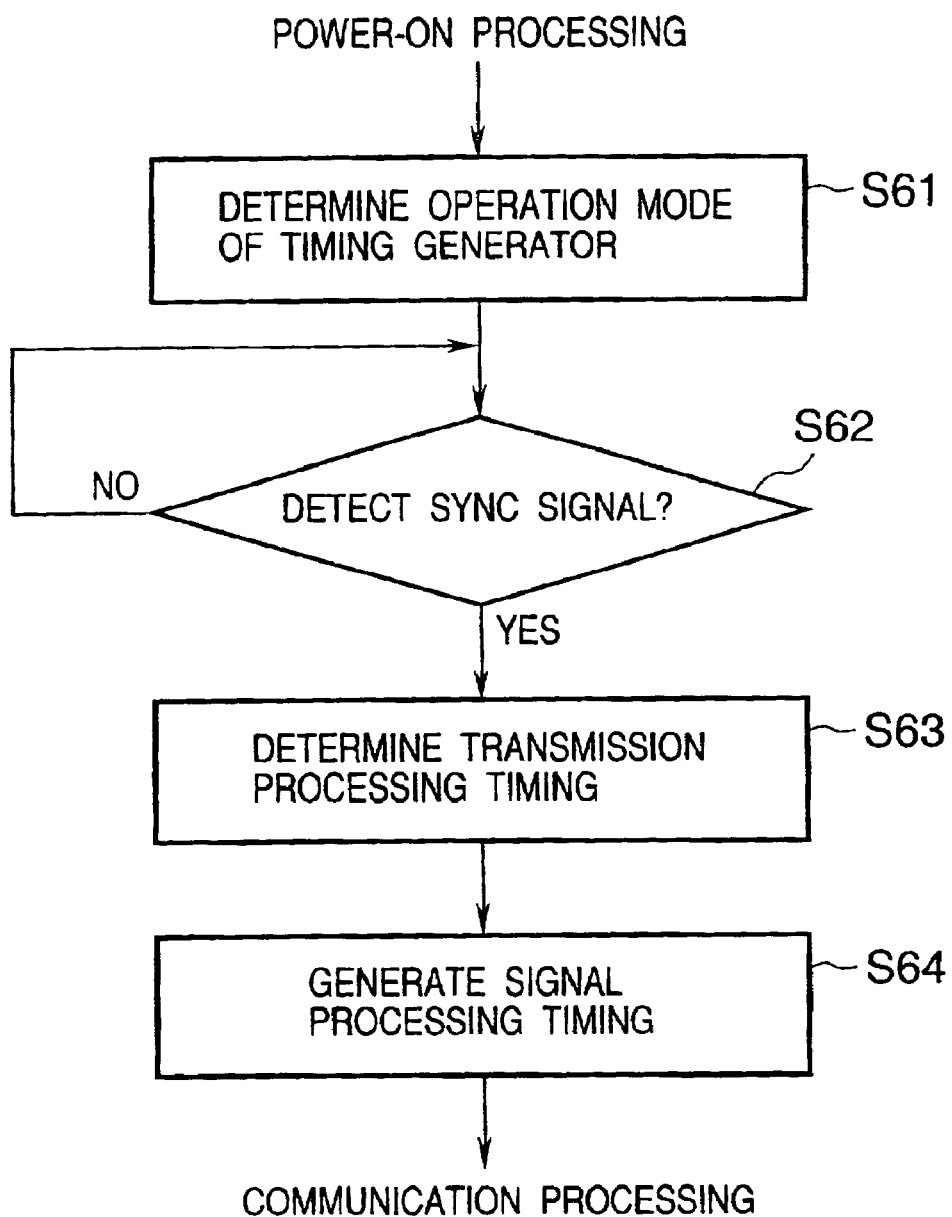
FIG. 16 is a flow chart showing operation mode setup processing of the image display in the first embodiment.

Setup processing first executed in the normal processing operation mode of the first embodiment upon the completion of the above-described power-on processing will be described with reference to the flow charts of FIGS. 15 and 16. FIG. 15 is a flow chart showing operation mode setup processing of the terminal 2 in the first embodiment, and FIG. 16 is a flow chart showing operation mode setup processing of the image display 1 in the first embodiment.

If the terminal 2 receives specification information, adjustment data, and the like from the connected image display 1 by power-on processing shown in FIG. 8, the terminal 2 shifts to setup processing in the operation mode shown in FIG. 15. In step S51, the terminal CPU 201 determines an input signal based on input signal determination data from the input I/F 220. In step S52, the terminal CPU 201 acquires specific data of the image display 1 based on adjustment data and the like.

In step S53, the terminal CPU 201 determines an image processing mode from the acquired data, and also specifies an audio processing mode. For example, the terminal CPU 201 specifies the image processing mode as an NTSC processing mode, and sets the audio processing mode to a stereo mode.

In step S54, the terminal CPU 201 instructs the timing generator 204 to generate a timing signal at signal processing timing corresponding to the determined processing mode.

In step S55, the terminal CPU 201 generates communication (transmission) processing timing. For example, the CPU 201 outputs an enable signal and the like for time-division multiplexing of respective processing data, such as the communication direction control timing to the terminal modem 203, interrupt signal generation timing to the terminal CPU 201 for command transmission/reception, and command data processing timing for the video signal processor 205, audio signal processor 210, and terminal CPU 201. The CPU 201 sets to perform communication control shown in FIG. 12. Then, the CPU 201 executes data communication at the processing timing.

On the other hand, the image display 1 transmits its specification information to the terminal 2 by the power-on processing shown in FIG. 9 to share adjustment data and the like, and then shifts to setup processing in the operation mode shown in FIG. 16. In step S61, the display CPU 101 determines the operation mode of the timing generator 104. The display CPU 101 monitors whether the display modem 103 detects a synchronization signal from the terminal 2 at timing corresponding to the determined operation mode.

If the display modem 103 receives a synchronization signal from the terminal 2, the display CPU 101 outputs a regeneration SYNC signal and regeneration CLK signal. Then, the display CPU 101 advances from step S62 to step S63 to generate transmission processing timing. For example, the CPU 101 generates an enable signal and the like for time-division multiplexing of respective processing data, such as communication direction control timing to the display modem 103, interrupt signal generation timing to the display CPU 101 for command transmission/reception, and command data processing timing for the video signal processor 105, audio signal processor, and display CPU 101.

In step S64, the display CPU 101 generates signal processing timing to control a video signal to be received and the like to a receivable state. After that, the CPU 101 performs reception control of a video signal and audio signal (acoustic signal) and transmission/reception control of command data in accordance with this setup processing.

Upon the completion of setup processing, the terminal 2 performs data communication with the image display 1 synchronized with synchronization signals corresponding to generation of display data from the input I/F 220.

Figure 17:
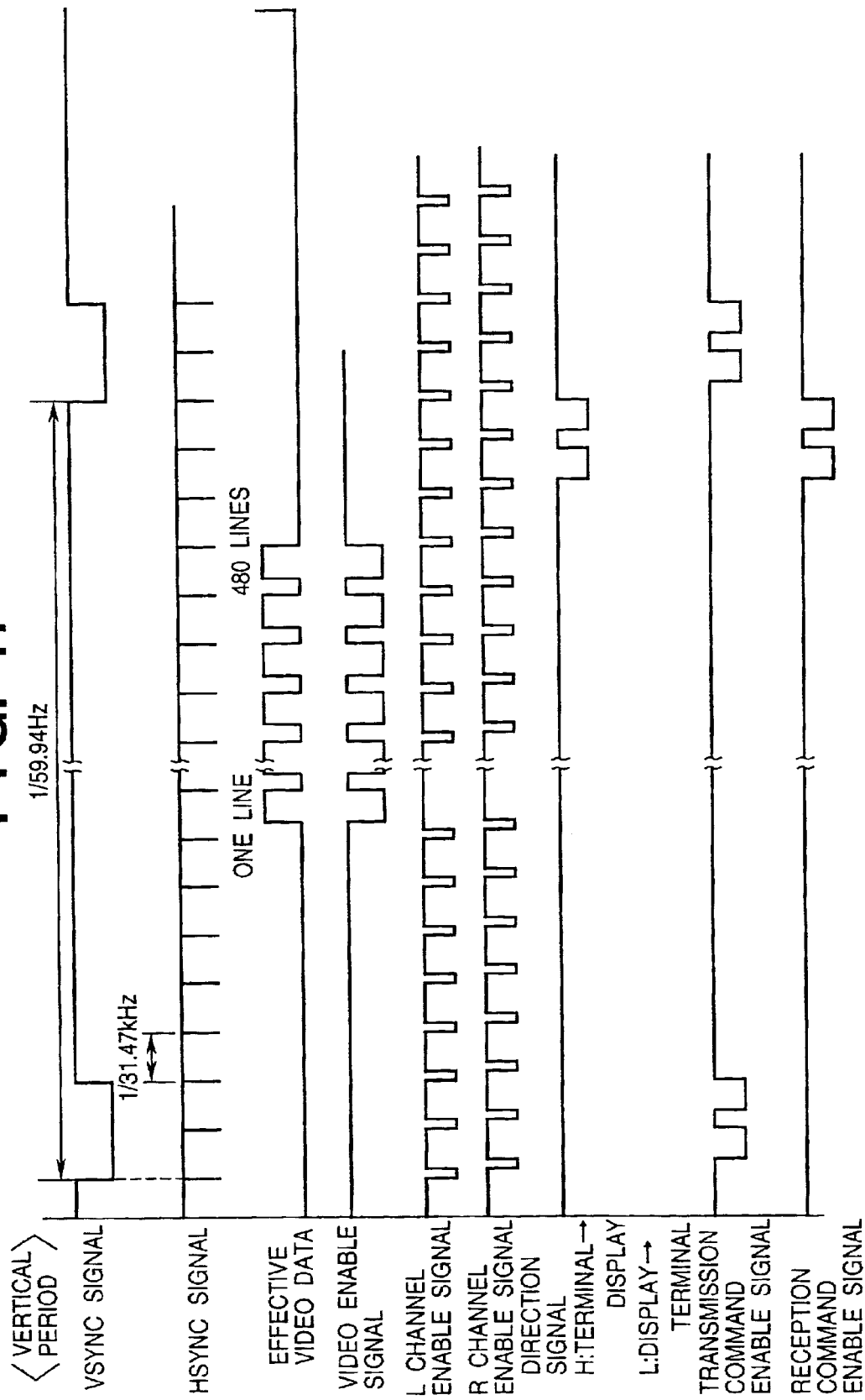
FIG. 17 is a timing chart showing data communication control timing in a vertical synchronization signal generation period in the image display and terminal of the first embodiment.
Figure 18:
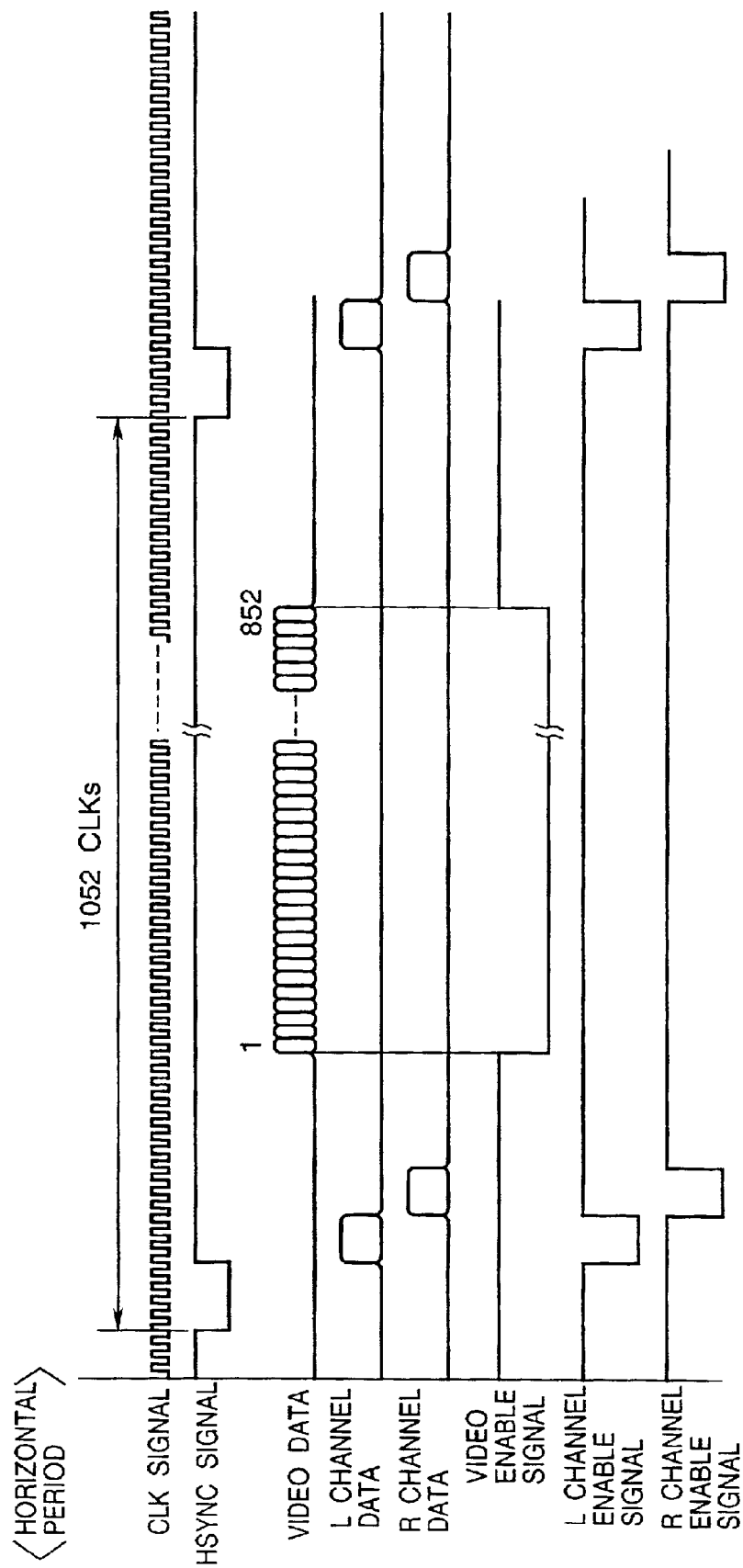
FIG. 18 is a timing chart showing data communication control timing in a horizontal synchronization signal generation period in the image display and terminal of the first embodiment.

Data communication timing between the terminal 2 and image display 1 when an image of the NTSC format is input to the input I/F 220 and the display panel 110 of the image display 1 has 852 dots×480 dots will be described with reference to FIGS. 17 and 18. FIG. 17 is a timing chart showing data communication control timing in a vertical synchronization signal generation period in the image display 1 and terminal 2 of the first embodiment, and FIG. 18 is a timing chart showing data communication control timing in a horizontal synchronization signal generation period in the image display 1 and terminal 2 of the first embodiment.

In the first embodiment, as shown in FIG. 17, effective video data are transmitted at the above-mentioned timing in synchronism with a VSYNC signal and HSYNC signal. Since the display panel 110 has 852 dots×480 dots in this embodiment, video data of 480 lines is transmitted/received at an interval between VSYNC signals.

In this embodiment, a DIR signal for controlling the communication direction is kept at high level except for a predetermined period immediately before VSYNC signal output timing. Accordingly, the command communication direction is set to a transmission direction from the terminal 2 to the image display 1 in principle.

As an example of a command transmission/reception timing, VSYNC signal output timing is set as actual command transmission timing from the terminal 2 to the image display 1 using the fact that the transmission timing of effective video data is not set before and after the VSYNC signal in order to ensure blanking timing. A transmission command enable signal is output at predetermined timing between HSYNC signals at the VSYNC signal timing shown in FIG. 17. Note that FIG. 17 shows an example of transmitting a command of two blocks.

A command transmission timing from the image display 1 to the terminal 2 is set to predetermined timing between HSYNC signals of two cycles immediately before the VSYNC signal timing, and a reception command enable signal is output. Note that the image display 1 has a transmission/reception enable timing opposite to that of FIG. 17.

As shown in FIG. 18, the data transmission timing between HSYNC signals uses an interval from HSYNC signal timing to video data communication timing, and L-channel audio data and R-channel audio data are transmitted/received. At subsequent video data enable timing, image data of 852 dots of one horizontal line is transmitted/received.

In this manner, according to the first embodiment, video data and acoustic data (audio data) to be displayed between VSYNC signals are multiplexed for transmission/reception. If necessary, command data can also be multiplexed for transmission/reception.

The above processing determines the timing of various control operations to be executed at the terminal of this embodiment. Detailed adjustment control conforming to the specifications of the image display 1 will be explained.

The transmission format is determined by characteristic data (resolution, pixel layout, screen aspect ratio, and refresh rate) of the display panel 110. (The number of display lines+necessary blanking period) is set in the refresh rate (vertical sync frequency) to determine a horizontal period. For example, 480 display lines and a blanking period of 45 lines are set in a period of 60 Hz.

If the transmission specification suffices to be the same as the input signal specification, data can be output without performing any special conversion processing. When, however, a large amount of command data (control signals) need to be communicated, the blanking period may be prolonged.

The (number of display pixels+audio data to be multiplexed+necessary blanking period) in one horizontal period is calculated to determine the frequency of master CLK. Also in this case, if the transmission format suffices to be the same as the input signal format, the CLK signal of input information can be used without any change. However, if the blanking period in the input format is long, and the frequency is to be decreased, an input CLK signal is changed, as needed.

The layout of video data/audio data in the horizontal period and the layout of video data/control signal data in the vertical period are determined. If necessary, the terminal 2 transmits the determined contents as command data to the image display. The terminal 2 and image display 1 recognize the command data and share the recognized results.

In determining the refresh rate, this rate is set to the refresh rate of an input signal to the input I/F 220 when the refresh rate of the image display 1 is sufficiently high. However, if the user requests a higher refresh rate by an instruction via the user I/F 230 or 130, the refresh rate may be increased. For example, the refresh rate is increased in converting a signal of the interlaced scheme into a signal of the progressive scheme in order to improve flicker characteristics.

When the screen aspect ratio of the display panel 110 does not coincide with the aspect ratio of an input signal to the input I/F 220, the display mode can be changed by automatic determination or a user request.

In this way, the transmission specification is determined. An example of changing the transmission specification in accordance with the specifications of the display panel 110 of the image display 1 connected to the terminal 2 in the first embodiment will be described below.

Figure 19:
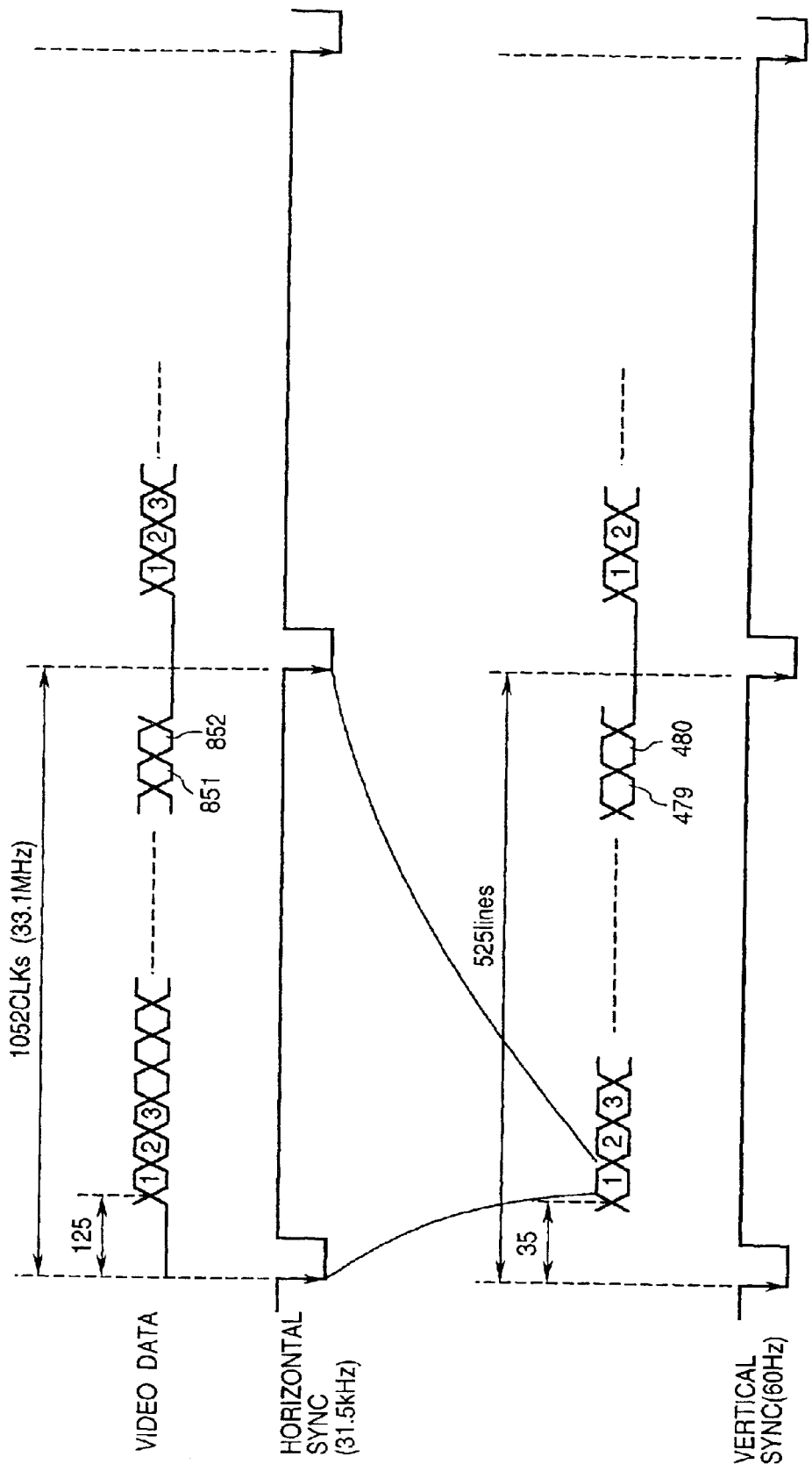
FIG. 19 is a timing chart for explaining data communication timing between the image display and terminal when a display panel has 852 dots×480 dots in the first embodiment.

FIG. 19 shows an example when the display panel 110 has 852 dots×480 dots (R, G, and B stripes). In this case, as shown in FIG. 19, the vertical sync (VSYNC) frequency is about 60 Hz, 525 HSYNC signals are generated during one VSYNC period, and 480 HSYNC periods from the 36th HSYNC signal among the 525 HSYNC signals upon generation of a VSYNC signal are set as an effective video data period.

The horizontal synchronization signal (HSYNC) has a frequency of 31.5 kHz, and the clock signal (CLK signal) has a frequency of 33.1 MHz. During one HSYNC period, 1,052 CLK signals are generated. Video data is communicated in synchronism with 852 clock signals from the 126th CLK signal among the 1,052 CLK signals upon generation of an HSYNC signal.

Figure 20:
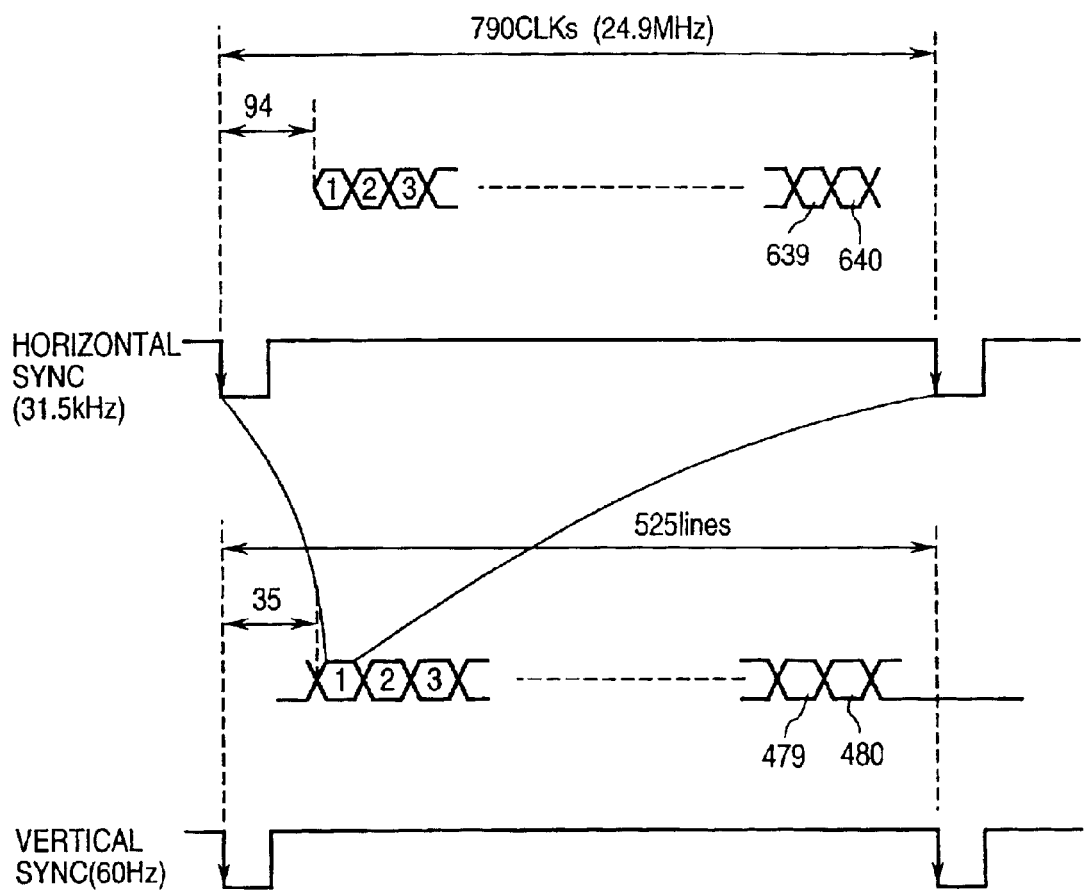
FIG. 20 is a timing chart for explaining data communication timing between the image display and terminal when the display panel has 640 dots×480 dots in the first embodiment.

FIG. 20 shows an example when the display panel 110 has 640 dots×480 dots (R, G, and B stripes). In this case, as shown in FIG. 20, the vertical sync (VSYNC) frequency is about 60 Hz, 525 HSYNC signals are generated during one VSYNC period, and 480 HSYNC periods from the 36th HSYNC signal among the 525 HSYNC signals upon generation of a VSYNC signal are set as an effective video data period.

The horizontal synchronization signal (HSYNC) has a frequency of 31.5 kHz, and the clock signal (CLK signal) has a frequency of 24.9 MHz. During one HSYNC period, 790 CLK signals are generated. Video data is communicated in synchronism with 640 clock signals from the 95th CLK signal among the 790 CLK signals upon generation of an HSYNC signal.

Figure 21:
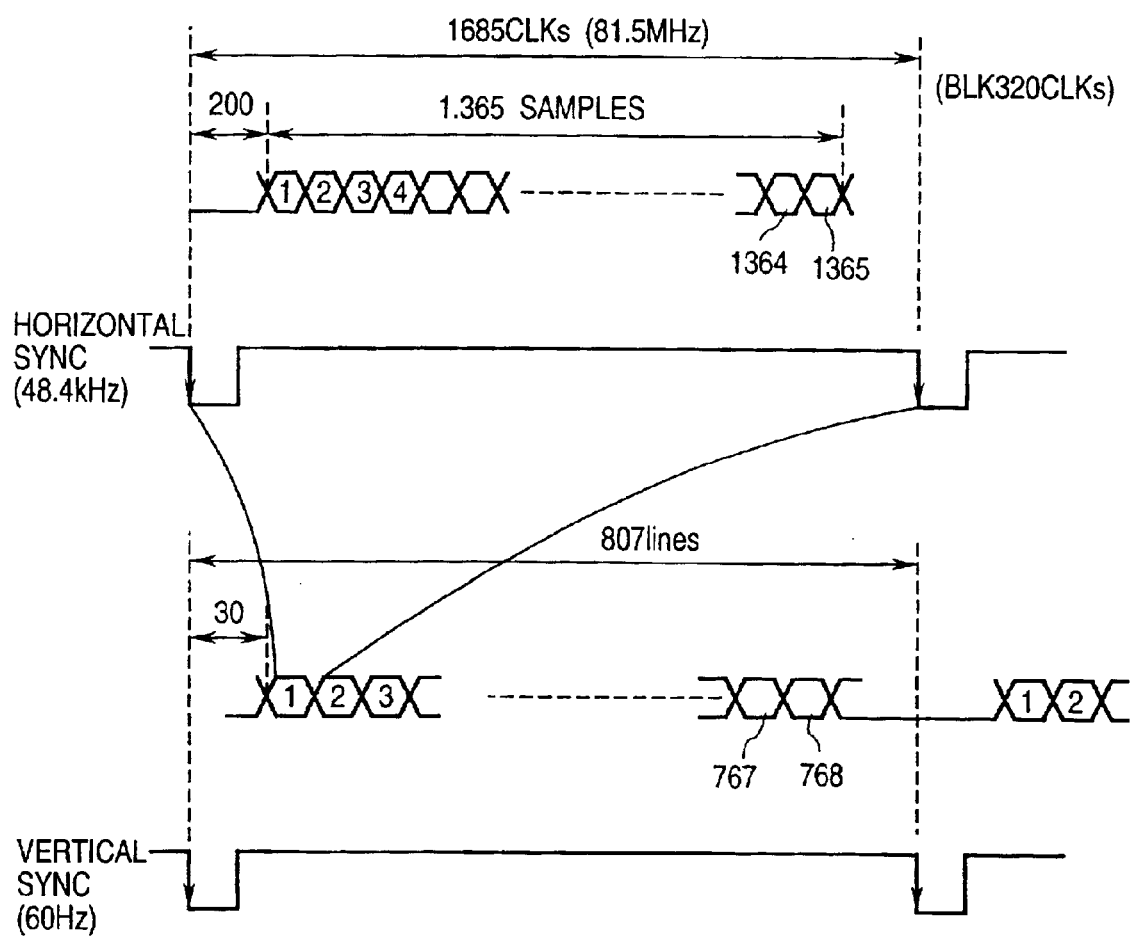
FIG. 21 is a timing chart for explaining data communication timing between the image display and terminal when the display panel has 1,365 dots×768 dots in the first embodiment.

FIG. 21 shows an example when the display panel 110 has 1,365 dots×768 dots (R, G, and B stripes). In this case, as shown in FIG. 21, the vertical sync (VSYNC) frequency is about 60 Hz, 807 HSYNC signals are generated during one VSYNC period, and 768 HSYNC periods from the 31st HSYNC signal among the 807 HSYNC signals upon generation of a VSYNC signal are set as an effective video data period.

The horizontal synchronization signal (HSYNC) has a frequency of 48.4 kHz, and the clock signal (CLK signal) has a frequency of 81.5 MHz. During one HSYNC period, 1,685 CLK signals are generated. Video data is communicated in synchronism with 1,365 clock signals from the 201st CLK signal among the 1,685 CLK signals upon generation of an HSYNC signal.

Figure 22:
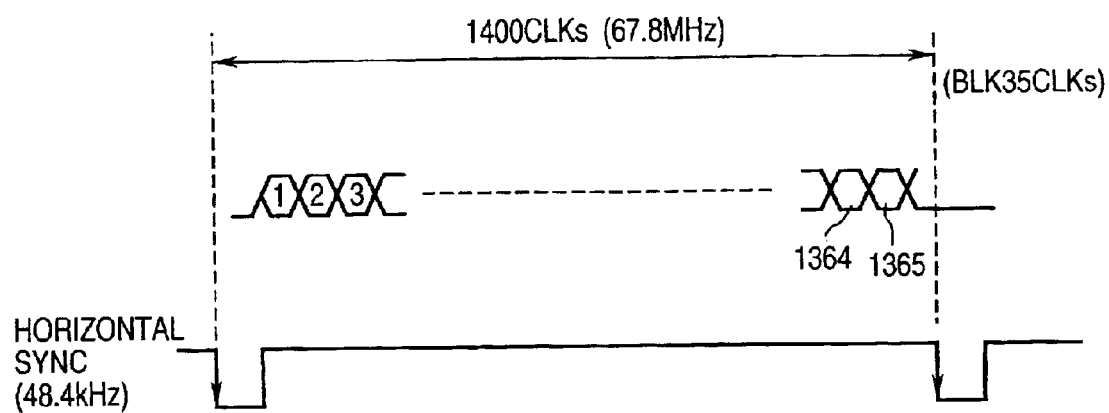
FIG. 22 is a timing chart for explaining data communication timing between the image display and terminal when the display panel has 1,365 dots×768 dots, and the frequency of a horizontal transfer clock (CLK) is changed in the first embodiment.

When the image display 1 has a memory for temporarily storing video data transferred to the image display 1, the display timing of the display panel 110 and the video data transfer timing need not always coincide with each other in the above manner. Video data may be transferred by changing the number of clocks (CLK) during the blanking period to decrease the clock frequency. For example, as shown in FIG. 22, the frequency of the clock signal (CLK signal) may be set to 67.8 MHz so as to generate 1,400 CLK signals during one HSYNC period, and video data of 1,365 dots may be transferred during the HSYNC period.

For a low transfer rate (clock signal frequency), the image display 1 becomes highly resistant to noise, and a decrease in display quality can be effectively prevented. The terminal 2 of the first embodiment determines the processing specification of an audio signal in accordance with the speaker specifications of the image display 1.

For example, when the image display 1 is equipped with only one monaural speaker 123, audio data is data of one channel.

If the image display 1 is equipped with two speakers 123, and the audio amplifier 122 has independent amplifier circuits of two channels for the respective speakers, audio data are right (R) and left (L) stereo audio data. For multichannel surround data, the terminal 2 determines to transfer audio data of necessary channels in accordance with the surround specification.

When an input signal to the input I/F 220 is a digital input, asynchronous audio signals are synchronized and horizontally multiplexed. Alternatively, communication audio data can be changed in accordance with a user request (e.g., the user wants to listen to a main sound from right and left speakers).

A detailed processing method of video data is also determined in accordance with specific data of the image display. For example, the quantization precision is determined in correspondence with characteristic data of the display panel 110 so as to make the number of gray levels match the display gray level.

Not only the number of gray levels but also the gray level characteristic undergo processing such as nonlinear transformation so as to make the gamma ($\gamma$) characteristic of the display device match the emission characteristic of the display panel 110. For example, the emission luminance controlled by PWM modulation exhibits a linear characteristic, so that only reverse $\gamma$ transformation is performed.

As for the color temperature of the display device, the reproduced white color temperature changes depending on the specifications of the display. Thus, the R/G/B balance is adjusted to obtain a desired color temperature. The enhancer is optimized in correspondence with the screen size and resolution. Note that processing also changes depending on an input signal or user request.

Similarly, the resolution is converted to match a changed resolution, pixel layout, display aspect ratio, refresh rate, input signal format, or transmission format.

The user I/Fs 130 and 230 of the above-described embodiment enable image quality adjustment and acoustic adjustment by inputting an instruction to the operation panel of the apparatus. At the same time, the user I/Fs 130 and 230 enable remote control using, e.g., a system remote controller.

More specifically, the terminal 2 and image display 1 share user adjustment data (remote controller or key switch operation), share operation input results by exchanging command data, to meet a user request in either of the terminal 2 and image display 1. Communication command data of the first embodiment controls to transfer even an operation input result (remote controller or key switch operation) for either user I/F to the terminal 2 and image display 1. The terminal 2 and image display 1 can be similarly controlled even by an instruction to either user I/F.

For example, channel selection of the tuner 240 of the terminal 2 can be done by an instruction input to the user I/F 130 of the image display 1.

In this embodiment, it is determined in accordance with the specifications of the image display 1 whether better adjustment can be achieved by the video signal processor 105 or panel driver 106 of the image display 1 or the video signal processor 205 of the terminal 2. The adjustment authorization is assigned to one determined to be optimum. In other words, when the terminal 2 and image display 1 have the same adjustment function, they exchange data for determining the one that executes adjustment, and perform optimal adjustment.

Distribution results of the adjustment authorization in the first embodiment are as follows:

_Contrast adjustment is done by the terminal 2.
_Color adjustment is done by the terminal 2.
_Color temperature adjustment is done by the image display 1.
_Volume adjustment is done by the image display 1.
_Enhancer adjustment is done by the terminal 2.

According to distribution of these adjustment authorizations, the adjustment authorization is assigned to the image display 1 or terminal 2 which easily performs adjustment for obtaining optimal results or better results. When one of the image display 1 and terminal 2 detects an adjustment instruction for which no adjustment authorization is assigned, it does not execute any adjustment, and transfers at least the adjustment instruction detection result to the other having the adjustment authorization at the transmission timing of command data.

For an adjustment instruction for which the adjustment authorization is assigned, one of the image display 1 and terminal 2 executes adjustment, and transfers the adjustment results to the other.

Modification of First Embodiment

In the above-described first embodiment, video data, acoustic data (audio data), and command data are multiplexed such that acoustic data is multiplexed between video data enable timing by each HSYNC signal, and command data is multiplexed between HSYNC signals outside the video data enable period between VSYNC signals, as shown in FIGS. 17 and 18.

However, the present invention is not limited to this multiplexing timing. For example, audio data is communicated not divisionally at respective HSYNC timing but at once every VSYNC timing.

Figure 23:
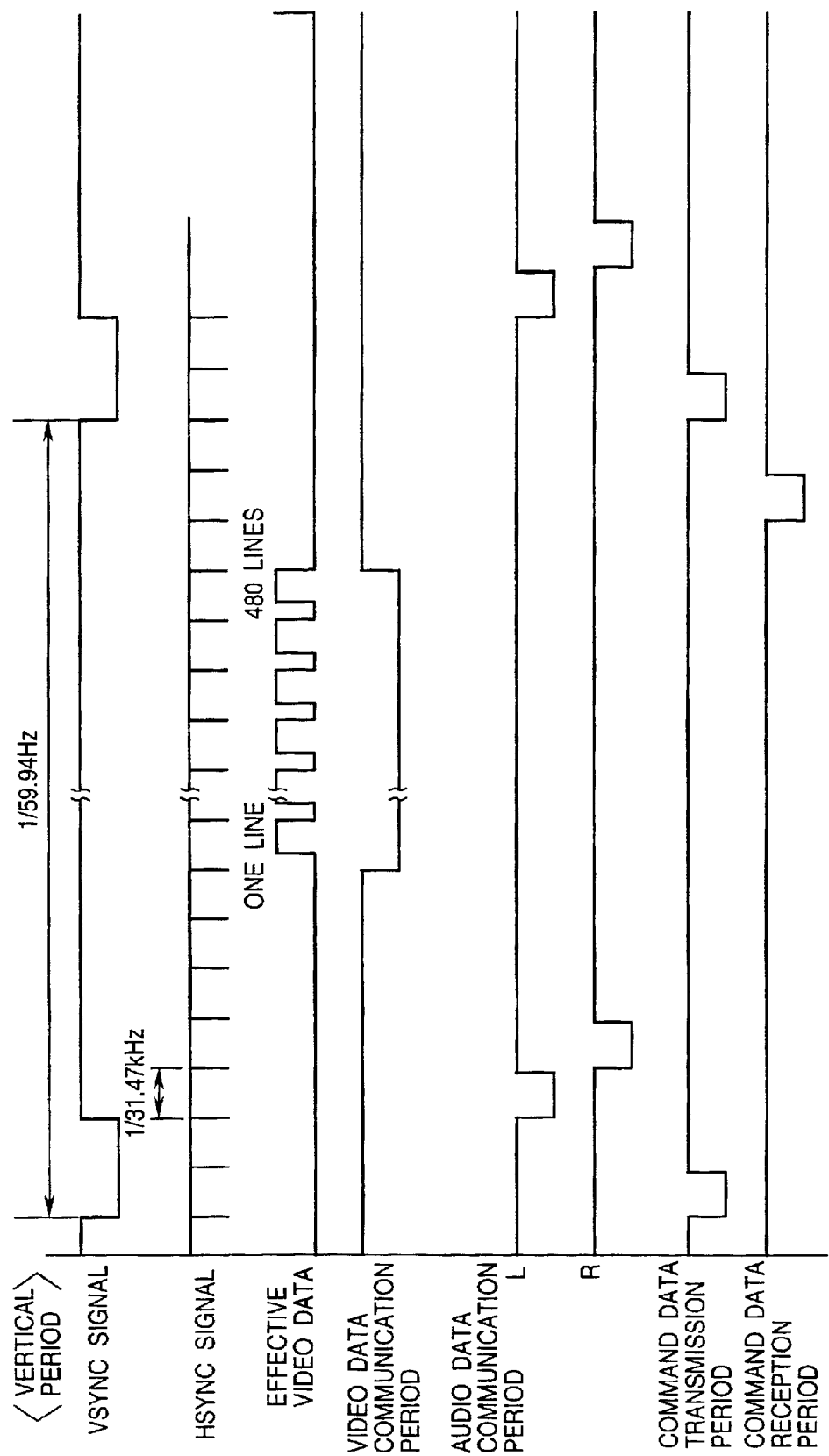
FIG. 23 is a timing chart showing communication timing between the terminal and image display when audio data is communicated at once every VSYNC timing in the first embodiment.

FIG. 23 shows communication timing between the terminal 2 and image display 1 when audio data is communicated not divisionally at respective HSYNC timing but at once every VSYNC timing.

In the example shown in FIG. 23, audio data is communicated at once at inter-HSYNC timing between video data enable timing upon arrival of a VSYNC signal.

This communication timing is effective when the image display 1 comprises a memory capable of temporarily holding audio data.

In the first embodiment, command data is multiplexed between HSYNC signals outside the video data enable period between VSYNC signals. However, the present invention is not limited to this multiplexing timing. For example, command data may be communicated divisionally at respective HSYNC timing.

Figure 24:
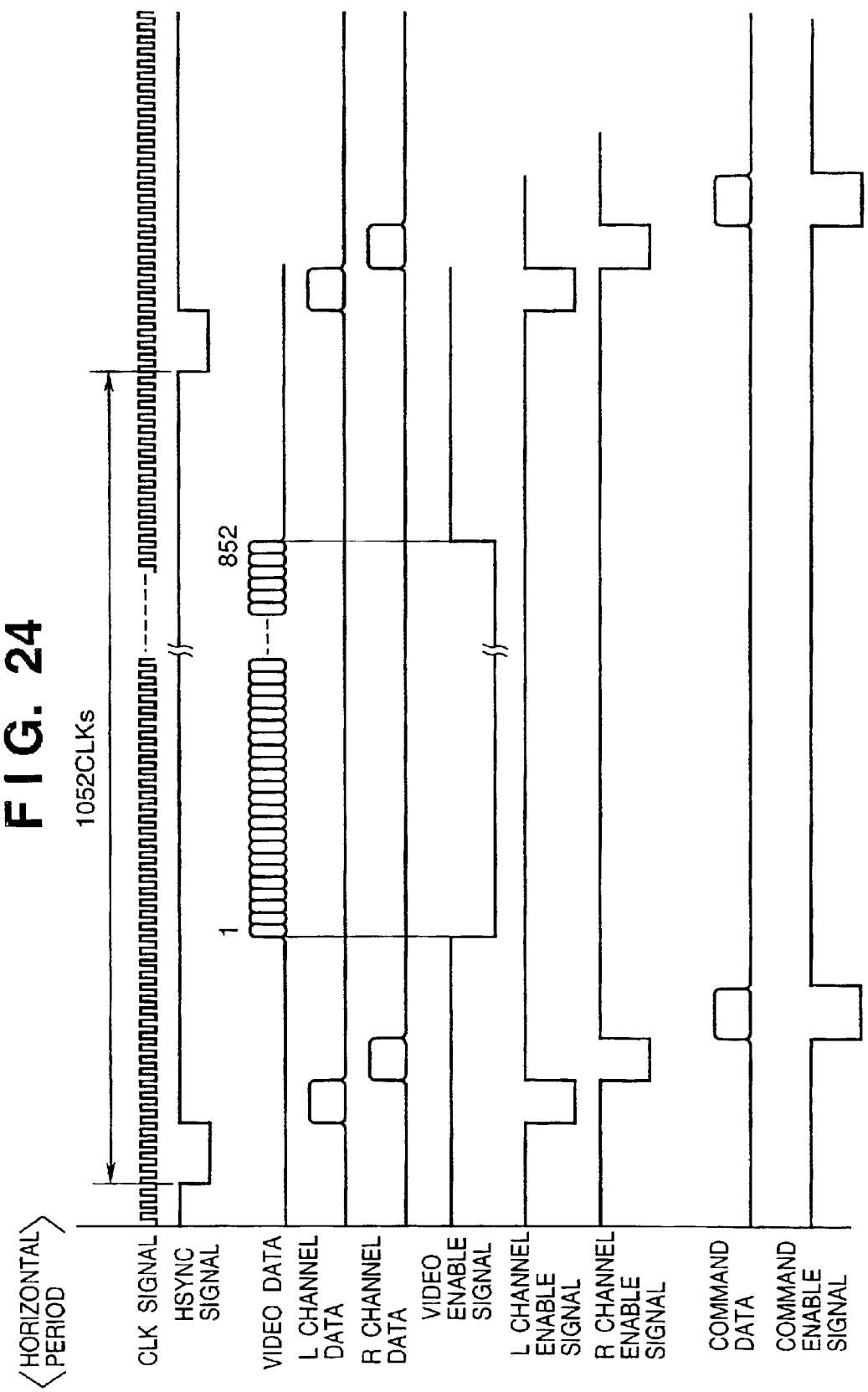
FIG. 24 is a timing chart showing communication timing between the terminal and image display when command data is communicated divisionally at respective HSYNC timing in the first embodiment.

FIG. 24 shows communication timing between the terminal 2 and image display 1 when command data is communicated not at once every VSYNC timing but divisionally at respective HSYNC timing.

In the example shown in FIG. 24, command data is communicated divisionally in units of, e.g., words at timing between video data enable timing after the audio data communication timing. In this case, command data of one packet is transmitted in several HSYNC periods.

This communication timing is suitable in communicating command data which must be communicated emergently or in a small amount of entire communication command data so as to communicate only changed data among various data.

Figure 25:
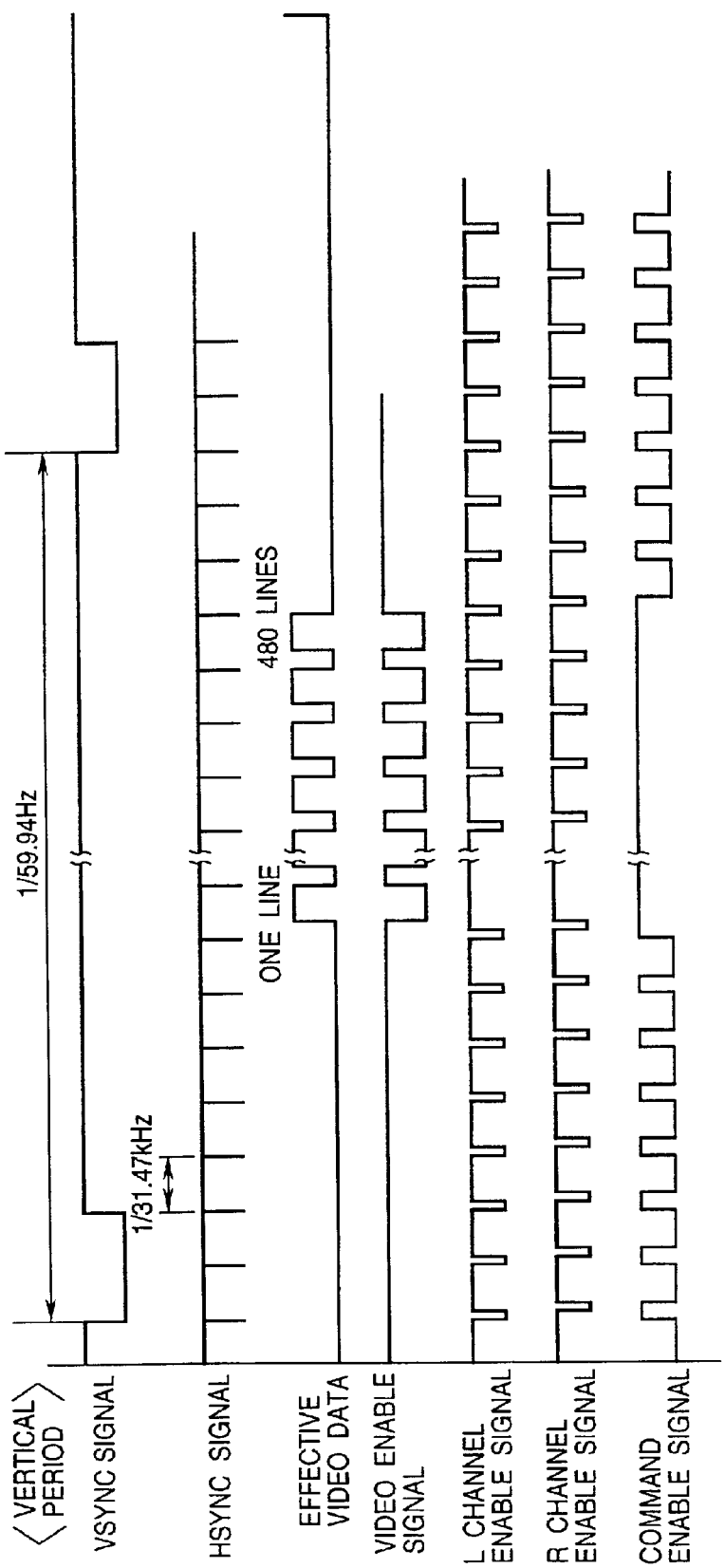
FIG. 25 is a timing chart showing communication timing between the terminal and image display when command data is controlled to be communicable over the period except for a video data enable period and audio data communication period in the first embodiment.

In the example shown in FIG. 17, the command data communication timing is set to, e.g., two HSYNC periods and VSYNC signal arrival period immediately before arrival of a VSYNC signal. However, the present invention is not limited to this. Command data can be communicated over the period except for the video data enable period and audio data communication period. FIG. 25 shows communication timing between the terminal 2 and image display 1 in this control.

In the example shown in FIG. 25, a necessary number of command data can be transmitted during the VSYNC period. This communication timing is effective when not only changed information but also the whole information is necessarily communicated as command data. Even if a communication error occurs or a packet is discarded, the influence can be minimized.

Second Embodiment

In the first embodiment, the terminal 2 is connected to one image display 1, and the image display 1 is not connected to any other device. However, the present invention is not limited to this. Another optional device may be connected to one terminal or image display. For example, a video printer is connected to hard-copy image data displayed on the image display. Note that the second embodiment is the same as the first embodiment except for the following arrangement, and a detailed description thereof will be omitted.

The second embodiment according to the present invention in which another optional device, e.g., a video printer is connected to one terminal or image display will be described with reference to FIGS. 26 to 28. In the second embodiment, the same reference numerals as in the first embodiment denote the same parts, and a detailed description thereof will be omitted. Also in the second embodiment, exchange of various data between the image display 1 and terminal 2 is the same as in the first embodiment.

Figure 26:
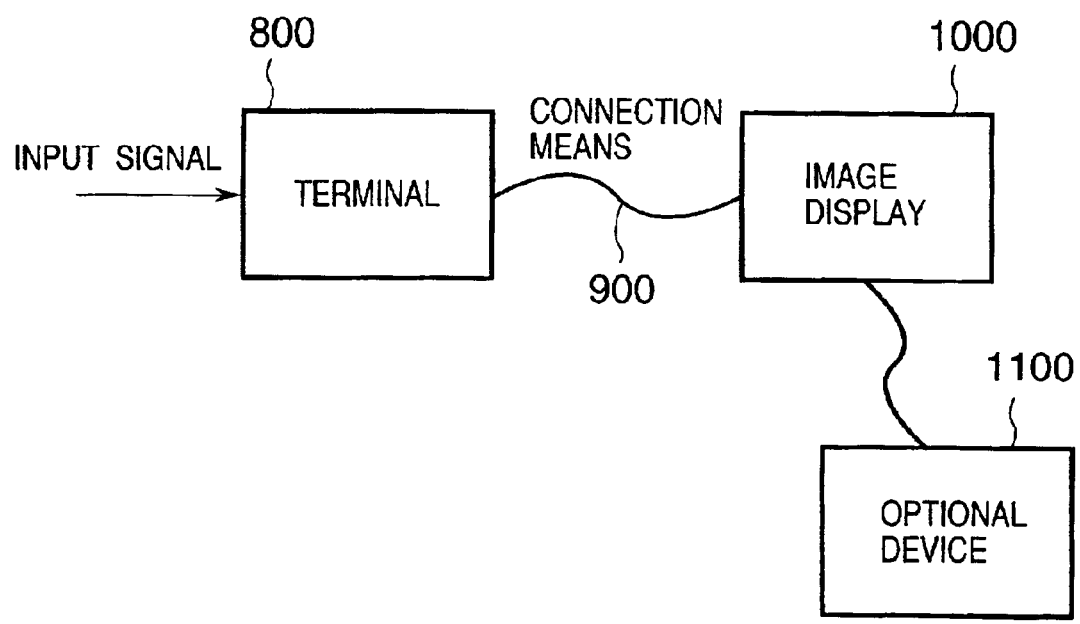
FIG. 26 is a block diagram for explaining a basic system arrangement of the second embodiment according to the present invention.

FIG. 26 is a block diagram for explaining a basic system arrangement of the second embodiment according to the present invention. As shown in FIG. 26, in the second embodiment, a terminal 800 performs necessary conversion processing or the like for an input signal in accordance with the specifications of an image display 1000, and outputs the processed signal to the image display 1000 via a connection means 900.

The image display 1000 is designed to allow connecting an optional device 1100. The terminal 800 is adapted to transfer data to the optional device 1100 via the image display 1000.

In the example of FIG. 26, the optional device 1100 is connected to the image display 1000. The terminal 800 of the second embodiment is also designed to allow connecting an optional device, and may be arranged as shown in FIG. 27. In the following description, the optional device can be connected to both the terminal 800 and image display 1000. However, the present invention is not limited to this, and includes a case in which the optional device can be connected to only the image display 1000 or terminal 800.

Figure 27:
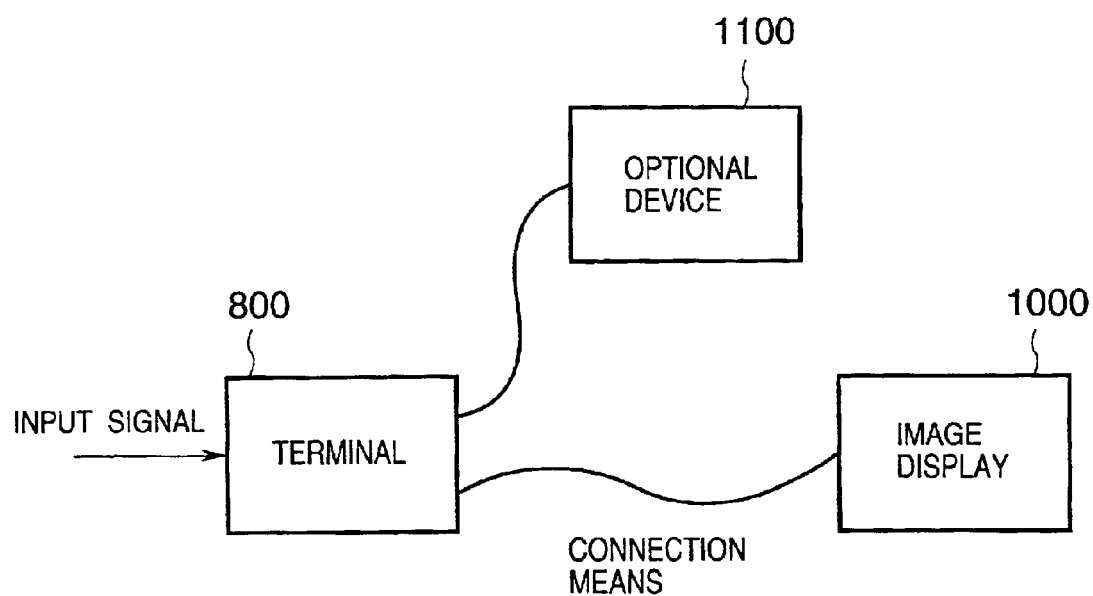
FIG. 27 is a block diagram for explaining another basic system arrangement of the second embodiment according to the present invention.
Figure 28:
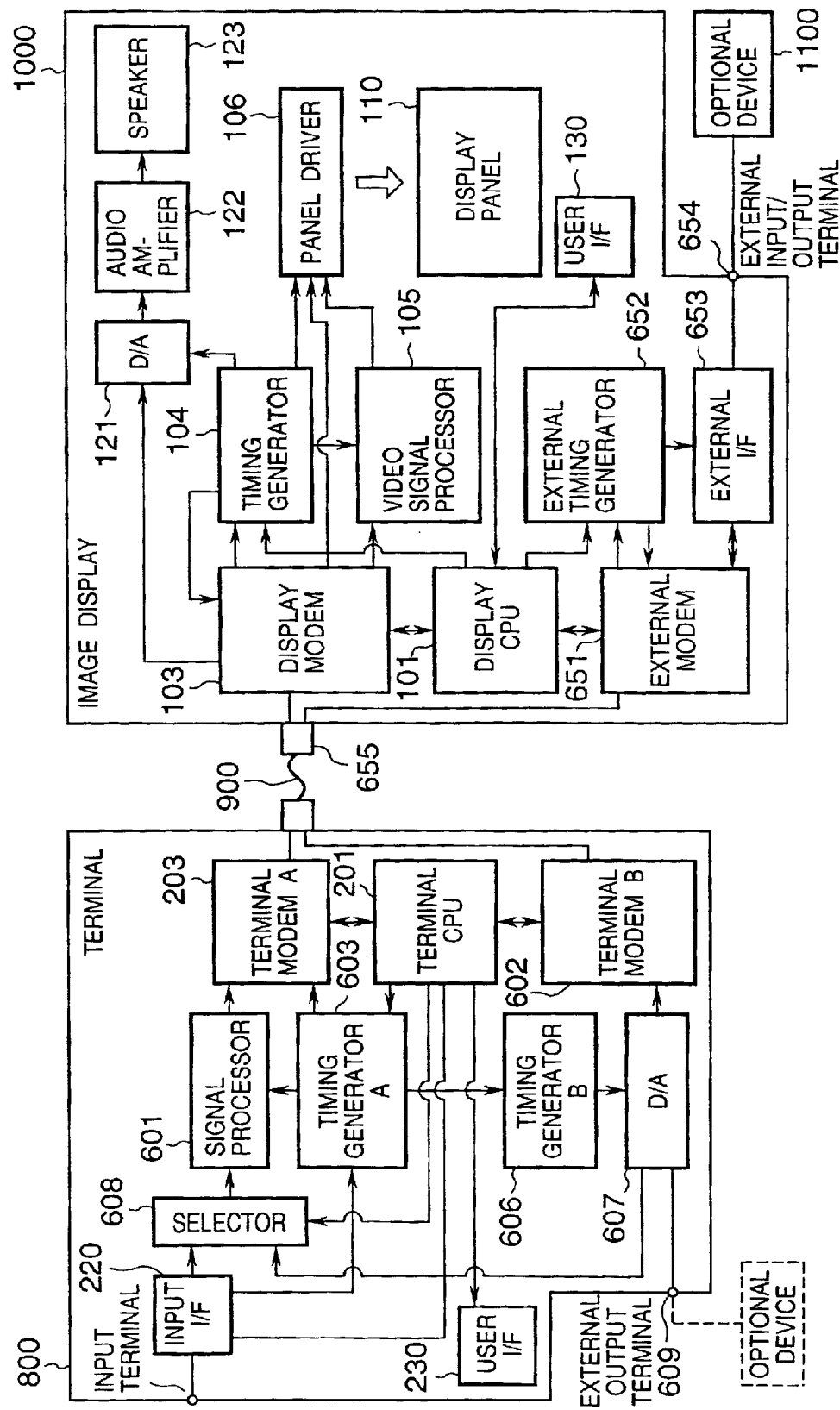
FIG. 28 is a block diagram showing the detailed arrangement of the second embodiment.

A detailed arrangement of the second embodiment shown in FIG. 26 or 27 is shown in FIG. 28. FIG. 28 is a block diagram showing the detailed arrangement of the second embodiment. Referring to FIG. 28, only a different arrangement from that of the first embodiment shown in FIG. 2 will be explained.

Figure 2:
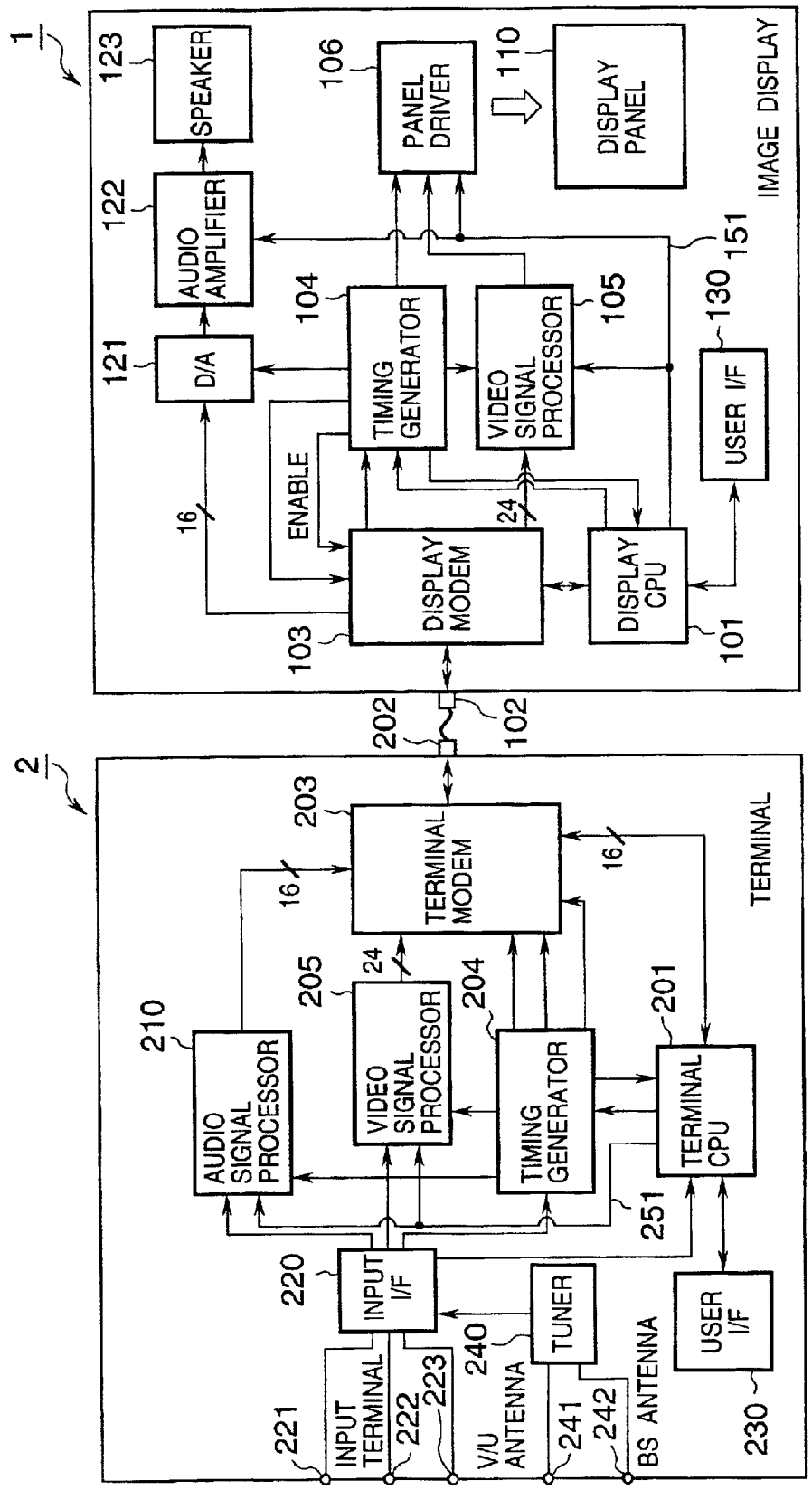
FIG. 2 is a block diagram showing the detailed arrangements of an image display and terminal in the first embodiment.

In the image display 1000, in addition to the arrangement shown in FIG. 2, a connection line dedicated for the optional device 1100 is connected to a connector 655 for the terminal 800. A signal through this dedicated connection line is input to an external modem 651. The external modem 651 demodulates a signal from the terminal 800 to output the demodulated signal to an external I/F 653, and modulates a signal from the external I/F 653 to output the modulated signal to the dedicated connection line.

The image display 1000 comprises an external timing generator 652. Control of the external I/F 653 and communication control with the terminal 800 using the external modem 651 are done under the control of a display CPU 101.

The external I/F 653 interfaces the optional device 1100, e.g., a video printer via an external input/output terminal 654.

In the terminal 800, a signal processor 601 realizes both the functions of the video signal processor 205 and audio signal processor 210 shown in FIG. 2. A terminal modem A 203 realizes the same function as the terminal modem 203 in FIG. 2. A terminal modem B 602 is used for communication with the optional device 1100 connected to the image display 1000.

A timing generator A 603 realizes the same function as the timing generator 204 in FIG. 2. A timing generator B 606 receives a clock signal and synchronization signal from the timing generator A 603 under the control of a terminal CPU 201. If necessary, the timing generator B 606 outputs a control timing signal to the terminal modem B 602 or a D/A converter 607 in synchronism with the clock signal and synchronization signal.

The D/A converter 607 is adopted not for a case in which a device such as a video printer is connected as the optional device 1100 and data is output to it, but for a case in which data input from the optional device 1100 is transmitted to the terminal 800 via the external I/F 653 and external modem 651. The D/A converter 607 D/A-converts data output from the terminal modem B 602 and outputs the analog data to a terminal output terminal 609.

Instead, an output signal from the D/A converter 607 can be transmitted to the image display 1000 via a selector 608, the signal processor 601, and the terminal modem A 203.

Also in the second embodiment having this arrangement, when the terminal 800, image display 1000, and optional device 1100 are powered on, the ID, specifications, and adjustment data of the optional device 1100 are shared between the terminal 800 and optional device 1100 similarly to power-on processing of the first embodiment shown in FIGS. 8 and 9. The data transmission specification between the terminal modem B 602 and external modem 651 is determined similarly to processing in FIGS. 15 and 16, and necessary optional device data is transmitted.

When the optional device 1100 is a video printer, video data to be printed or print data for the optional device is output.

The optional device 1100 is a video printer in this example, but is not particularly limited to this. For example, the optional device 1100 may be a video output device such as a video cassette recorder. In this case, a video signal from the optional device 1100 is input to the external input/output terminal 654, and data is transmitted to the terminal 800 via the external I/F 653 and external modem 651.

In the terminal 800, the D/A converter 607 converts data received by the terminal modem B 602 into the same format as that of input data to the external input/output terminal 654 of the image display 1000, and outputs the converted data to the external output terminal 609 of the terminal 800. For example, when the external input/output terminal 654 of the image display 1000 and the external output terminal 609 of the terminal 800 comprise an RCA pin jack connector and DV connector, data is output from the terminal 800 with a signal format represented by a connector used for the input of the image display 1000.

It is also possible to transmit a signal input to the external input/output terminal 654 of the image display 1000 to the terminal 800, process the signal by the signal processor 601 in the terminal 800 so as to match the specifications of the image display 1000, and send back the processed signal to the image display 1000 via the terminal modem A 203.

Third Embodiment

In the second embodiment, the dedicated modem and connection line are employed for the optional device 1100 in order to connect the optional device 1100. However, when the optional device is not one which need not emergently transmit/receive a large amount of information in real time, for example, when the optional device is a video printer, the dedicated modem and connection line need not be necessarily adapted for the optional device 1100.

Even when the optional device is connected to the image display, information for the optional device is controlled to be multiplexed and communicated using the idle time of information communication between the terminal and image display.

The third embodiment according to the present invention in which communication between the optional device and terminal is executed during the idle time of communication between the terminal and image display even when the optional device is connected to the image display will be described with reference to FIGS. 29 and 30. The third embodiment is the same as the above embodiments except for the following arrangement, and a detailed description thereof will be omitted.

Figure 29:
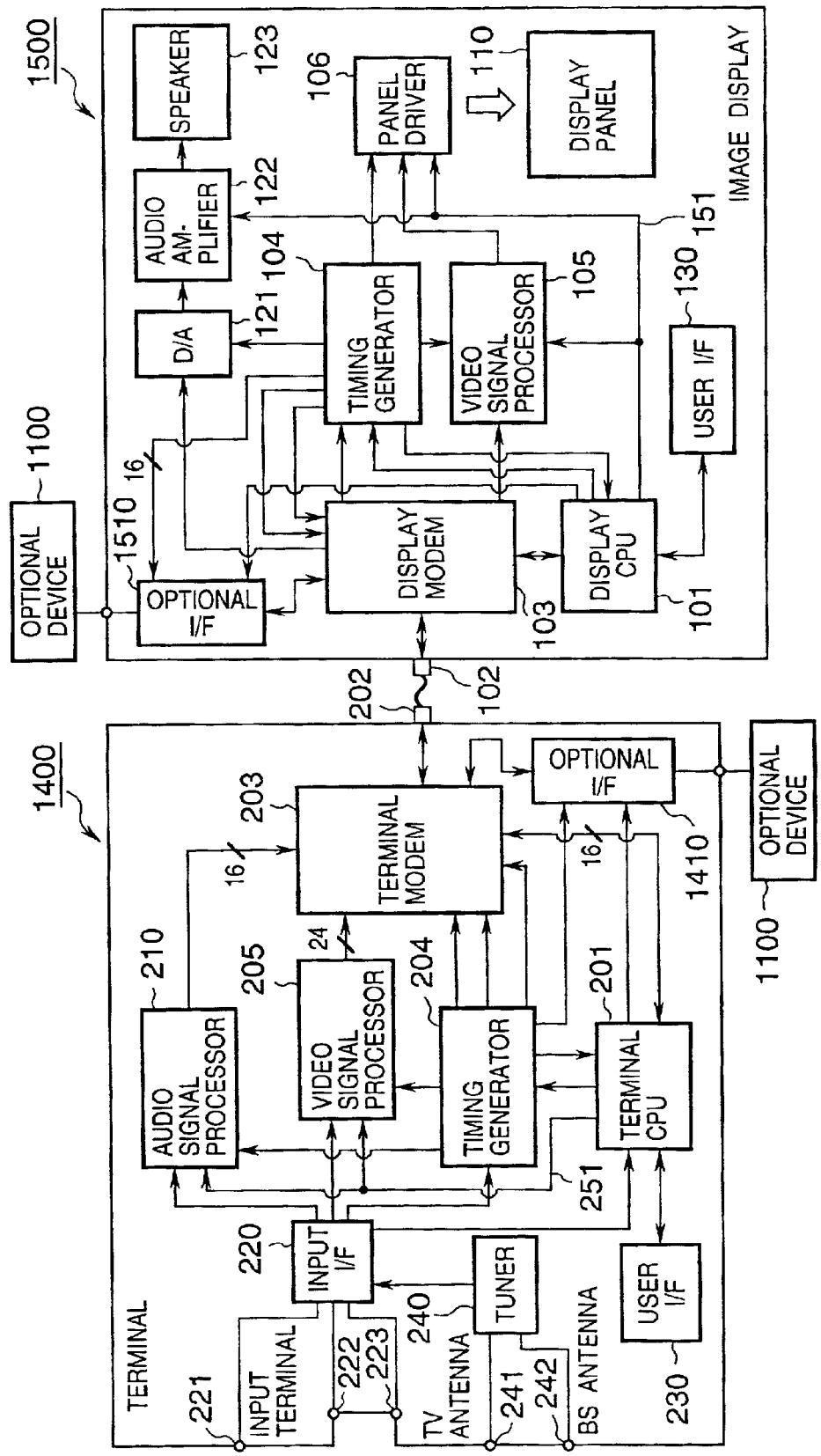
FIG. 29 is a block diagram showing the arrangement of the third embodiment according to the present invention.
Figure 30:
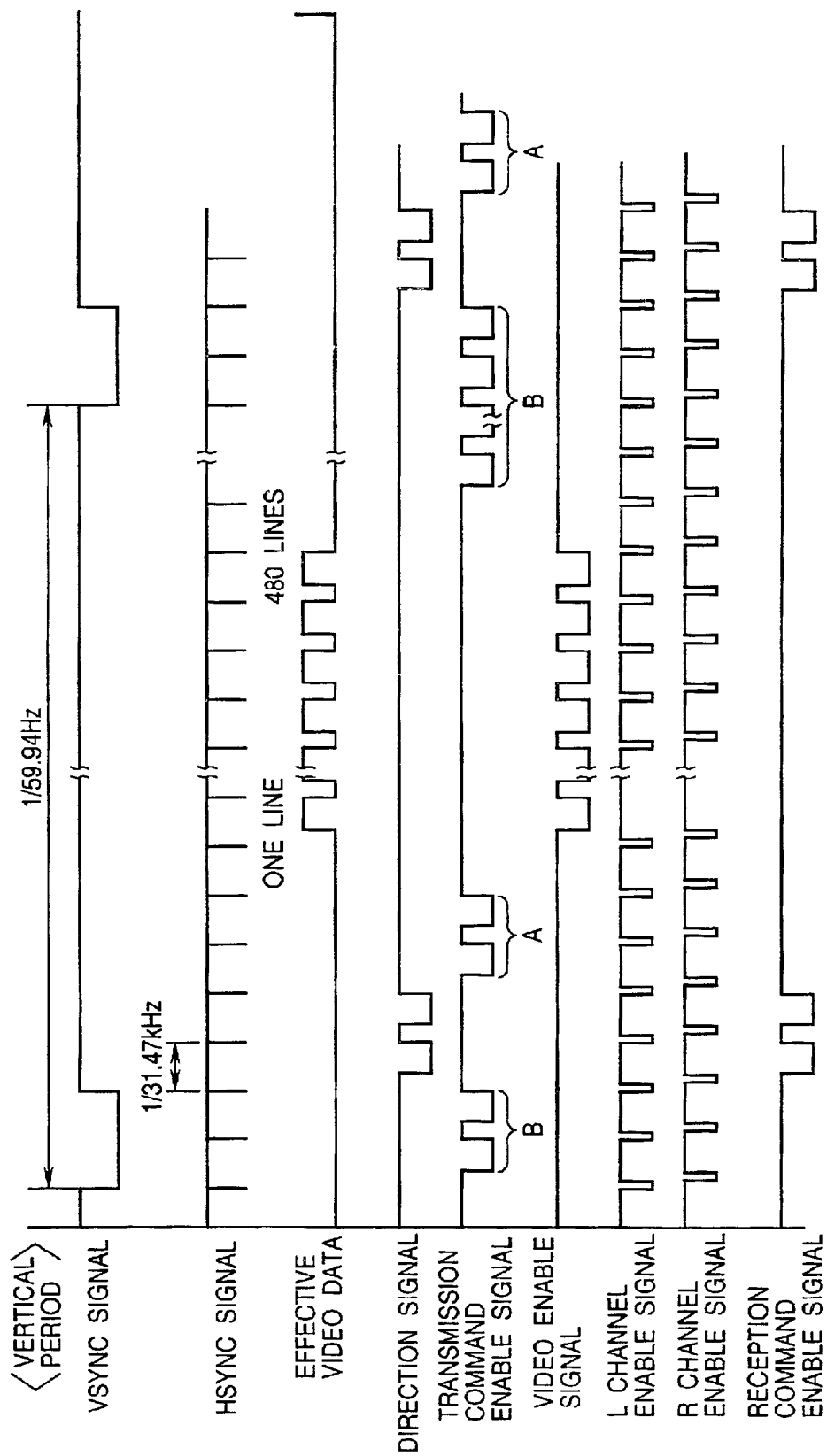
FIG. 30 is a timing chart for explaining information communication timing in the third embodiment.

In the third embodiment, FIG. 29 is a block diagram showing the arrangement of the third embodiment according to the present invention, and FIG. 30 is a timing chart for explaining information communication timing in the third embodiment.

Also in the third embodiment shown in FIG. 29, the terminal and image display have the same basic arrangements as in the first embodiment shown in FIG. 2. In the third embodiment shown in FIG. 29, the following units are added to a terminal 1400 and image display 1500 in addition to the arrangements of FIG. 2.

More specifically, the image display 1500 comprises an external I/F 1510 which interfaces with an optional device 1100 and receives communication data from a display modem 103 to the optional device 1100. The terminal 1400 comprises an external I/F 1410 which interfaces with an optional device 1100 and receives communication data from a terminal modem 203 to the optional device 1100.

The input/output timing from the terminal modem 203 (display modem 103) is controlled to the timing shown in FIG. 30.

Compared to the control timing of the first embodiment shown in FIG. 17, the control timing shown in FIG. 30 controls to communicate a transmission command enable signal from the terminal modem 203 of the terminal 1400 to the optional device 1100 using an HSYNC period A shown in FIG. 30 as transmission timing to the image display 1500, and a period B except for effective video data communication timing and command data reception timing from the image display 1500 when a DIR signal is at low level.

For example, when the optional device 1100 is connected to the image display 1500, a timing generator 104 outputs, to the external I/F 1510 at the timing B shown in FIG. 30, a timing signal for receiving demodulated data from the display modem 103 and transmitting the data to the optional device 1100.

In the example shown in FIG. 30, data of about 20 lines can be ensured during the period B to transmit 1-frame data in units of 20 lines at about 60 Hz within 1 sec. In divisionally transmitting data in this fashion, a line number is desirably added to the head of every transmission of 1-line data in order to determine transmitted data.

If the image display additionally comprises a frame memory, it is possible to write data transferred to this optional device in the frame memory, and after all the data are written, transfer the data to the connected optional device. If the image display holds display data to its display screen in the frame memory, the image display may receive from the terminal a command for outputting the held data to the optional device.

The image display equipped with the external output frame memory can output information conforming to the specifications of an optional device connected to the image display. Limitations on the connected optional device can be greatly reduced, resulting in high versatility.

When the external I/F 1510 receives a command data transmission request from the optional device 1100, the external I/F 1510 instructs a display CPU 101 to set command data transmission timing from the optional device 1100 during the period B or to transmit command data from the optional device 1100 mixedly in transmission during the command data transmission period from the image display 1500 to the terminal 1400. In this case, the ID of the optional device 1100 is attached to a header in order to determine the transmission source.

On the other hand, when the optional device 1100 is connected to the terminal 1400, a timing generator 204 outputs, to the external I/F 1410 at the timing B shown in FIG. 30, a timing signal for receiving demodulated data from the terminal modem 203 and transmitting the data to the optional device 1100.

Upon reception of a command data transmission request from the optional device 1100, the external I/F 1410 instructs a terminal CPU 201 to request reception of command data from the optional device 1100.

Under this control, the optional device can be controlled without using any modem for the optional device.

Fourth Embodiment

In the above-mentioned embodiments, one image display is connected to the terminal 2. However, the present invention is not limited to this, and includes a case in which a plurality of image displays can be connected to one terminal. The present invention further includes a case in which an optional device is connected, as described in the second or third embodiment.

The fourth embodiment according to the present invention in which a plurality of image displays can be connected to the terminal will be described with reference to FIGS. 31 to 33. The fourth embodiment is the same as the above embodiments except for the following arrangement, and a detailed description thereof will be omitted.

Figure 31:
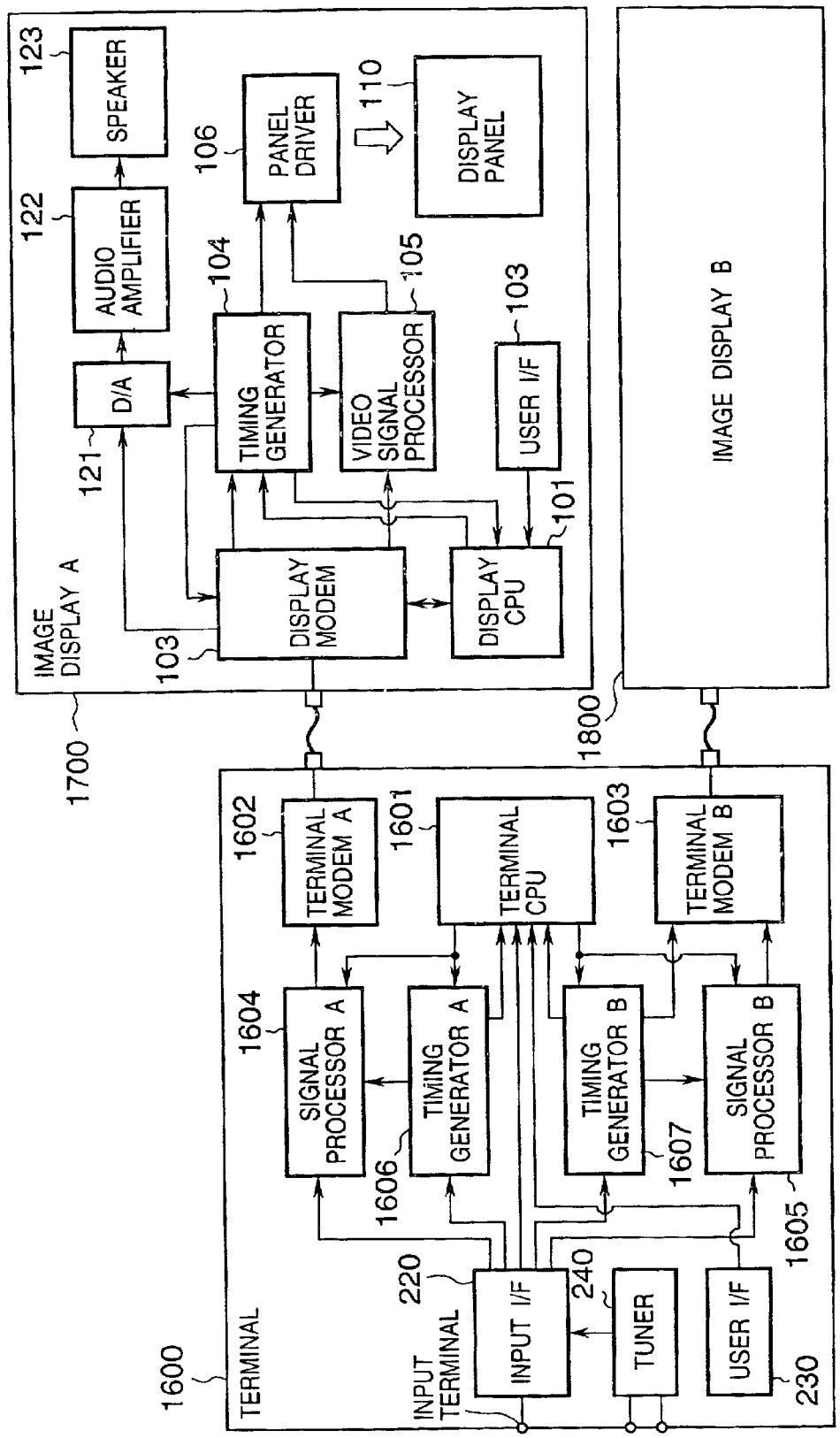
FIG. 31 is a block diagram showing the arrangement of the fourth embodiment according to the present invention.

FIG. 31 is a block diagram showing the arrangement of the fourth embodiment according to the present invention. FIG. 32 is a timing chart for explaining communication control during the VSYNC period between the terminal and image display of the fourth embodiment. FIG. 33 is a timing chart for explaining communication control during the HSYNC period between the terminal and image display of the fourth embodiment.

The whole arrangement of the fourth embodiment will be explained with reference to FIG. 31. In FIG. 31, reference numeral 1600 denotes a terminal capable of connecting two image displays; 1700, an image display A; and 1800, an image display B. The image display A 1700 and image display B 1800 may have the same arrangement. FIG. 31 shows only the detailed arrangement of the image display A 1700.

The image display A 1700 has the same arrangement as that of the image display 1 shown in FIG. 2, and the same reference numerals denote the same parts.

The terminal 1600 has an arrangement for communicating with the image displays 1700 and 1800 because it must transmit display information to the two image displays 1700 and 1800.

The terminal 1600 comprises a terminal modem A 1602, signal processor A 1604, and timing generator A 1606 for the image display A 1700, and a terminal modem B 1603, signal processor B 1605, and timing generator B 1607 for the image display B 1800. For the image displays 1700 and 1800, a terminal CPU 1601 performs the same control as that for the image display of the first embodiment.

That is, the terminal CPU 1601 executes power-on processing shown in FIGS. 8 and 9 with the image displays 1700 and 1800, operation mode setup processing shown in FIGS. 15 and 16, and transmission specification determination processing and the like.

To display a common image on the respective image displays and output a common acoustic output, the terminal shares an input source, and makes the operations of each signal processor and timing generator match a connected image display. To display different images on the respective image displays, the terminal appropriately distributes input signals to an input I/F 220. Alternatively, a tuner 240 may be formed from double tuners to display independent television programs on the image displays.

Also in this case, the terminal can share adjustment data with each image display, and a user instruction through the user I/F of the image display can be applied to, e.g., the tuner 240 of the terminal. Hence, the image display can be controlled without any spatial arrangement and operation.

Remote controller input detection modes to a user I/F 230 of the terminal 1600 may be set detectable for two remote controllers, and the respective detection modes may be distributed to the image displays. This enables controlling the terminal with the remote controllers.

When an optional device can be connected to each image display or the terminal, the arrangement shown in FIG. 29 for the optional device may be added to the arrangement shown in FIG. 31 to perform the same control as in FIG. 29. Instead, the arrangement shown in FIG. 28 may be added to each image display or the terminal.

Communication control timing between the terminal 1600 and image displays 1700 and 1800 of the fourth embodiment having the above arrangement will be described with reference to FIGS. 32 and 33.

Communication control during the VSYNC period (vertical period) in the fourth embodiment will be explained with reference to FIG. 32. For example, the terminal 1600 of the fourth embodiment outputs a transmission command 1 enable signal for permitting command transmission to the image display A 1700 during the first HSYNC period (horizontal period) at arrival of a VSYNC signal during the VSYNC period (vertical period). Then, the terminal 1600 outputs a transmission command 2 enable signal for permitting command transmission to the image display B 1800 during the next HSYNC period.

During a predetermined HSYNC period after the effective video data transmission timing, the terminal 1600 outputs a reception command 1 enable signal for permitting command reception from the image display A 1700. Then, during the subsequent HSYNC period, the terminal 1600 outputs a reception command 2 enable signal for permitting command reception from the image display B 1800. Accordingly, command communication between the image displays 1700 and 1800 can be continuously processed by the terminal CPU 1601 without any overlap.

Communication control during the HSYNC period (horizontal period) in the fourth embodiment will be explained with reference to FIG. 33.

Figure 33:
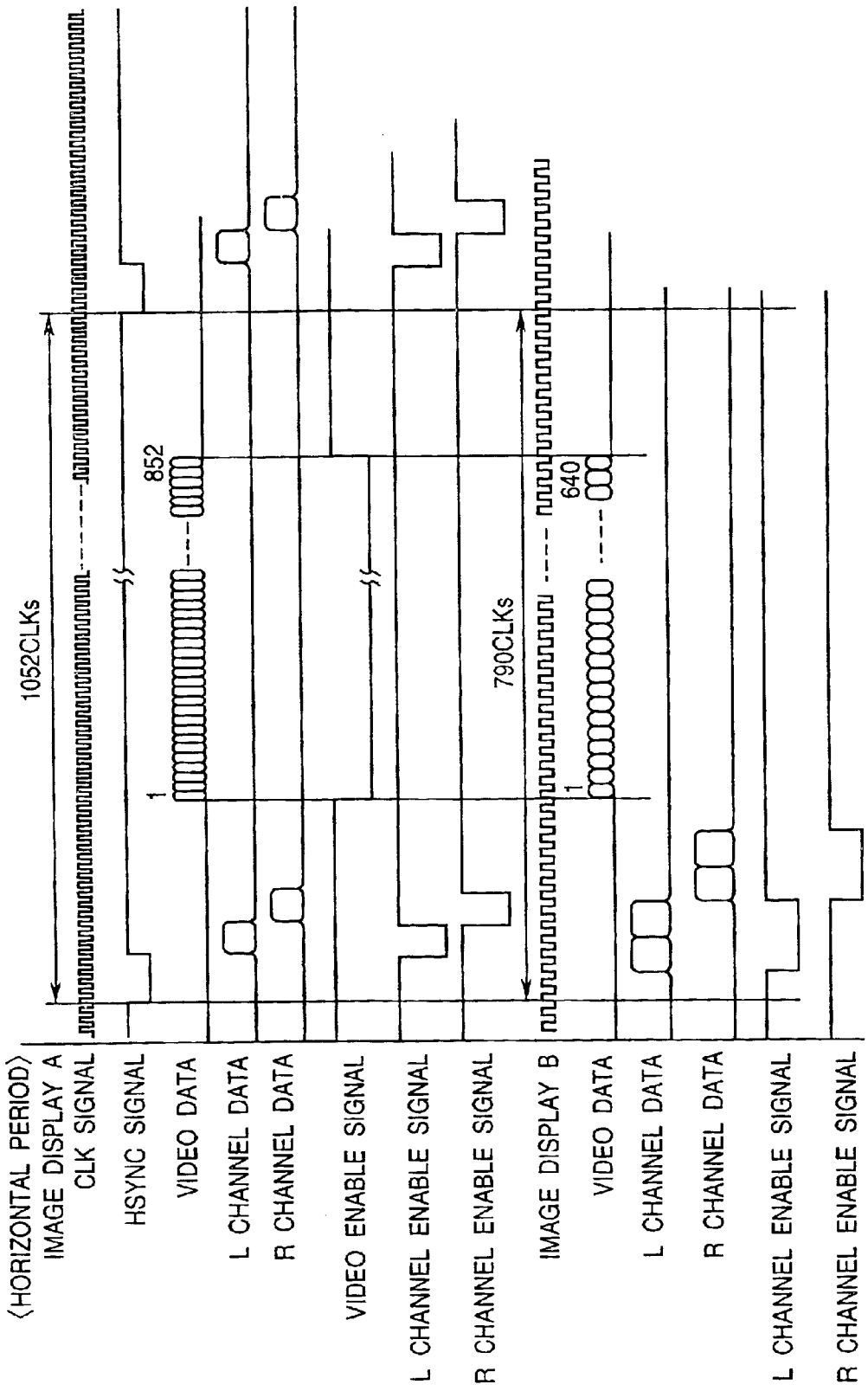
FIG. 33 is a timing chart for explaining communication control during the HSYNC period between the terminal and image display of the fourth embodiment.

In the example of FIG. 33, the upper timing charts show an example in which a display panel 1100 of the image display A 1700 has 852 dots×480 dots, as described with reference to FIG. 19 in the first embodiment, and acoustic signals of two channels are transmitted to stereo speakers of two L and R channels. The lower timing charts show an example in which a display panel 1100 of the image display B 1800 has 640 dots×480 dots, as described with reference to FIG. 20 in the first embodiment, and acoustic signals of four channels are transmitted to speakers of four channels.

Figure 32:
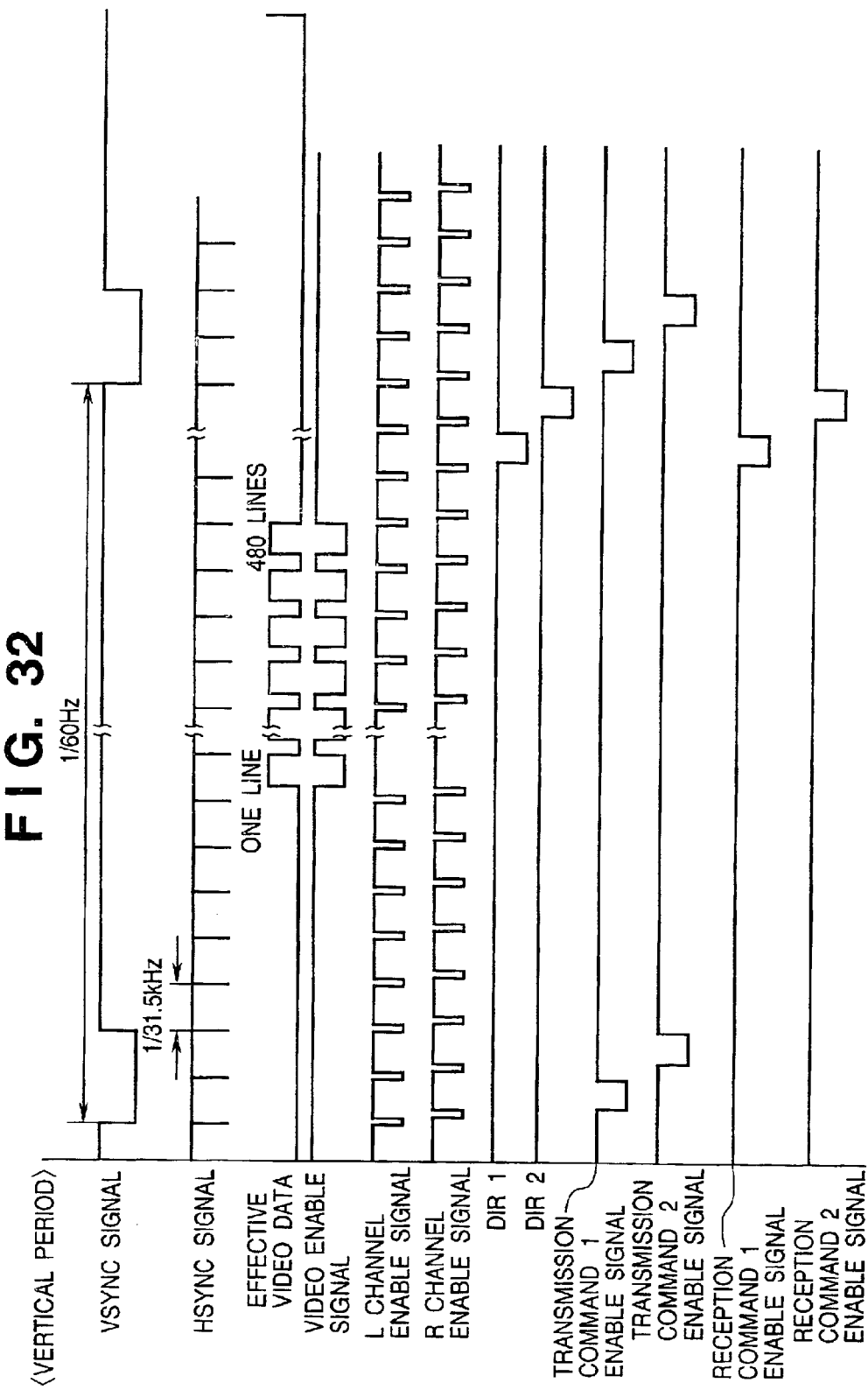
FIG. 32 is a timing chart for explaining communication control during the VSYNC period between the terminal and image display of the fourth embodiment.

Since the terminal 1600 has only one terminal CPU 1601, communication of command data with each image display is controlled to prevent communication timing from overlapping each other, as shown in FIG. 32. To the contrary, the terminal 1600 comprises the signal processor and timing generator for each image display. Therefore, the terminal 1600 of the fourth embodiment can perform video data communication without any error even with different communication specifications for respective image displays.

According to the fourth embodiment, a plurality of image displays can be connected to the terminal. Still further, with transmission specifications suitable for respective image displays without any special arrangement, display data and audio data can be transmitted to even image displays having different display specifications.

Fifth Embodiment

In the fourth embodiment, the terminal 2 comprises information communication modems for two connected image displays. However, the present invention is not limited to this, and includes an arrangement in which the terminal can be connected to one image display, and the image display can be connected to another image display or the like. The present invention also includes an arrangement in which an optional device is connected, as described in the second or third embodiment.

The fifth embodiment according to the present invention in which the terminal is adapted to control a plurality of image displays via an image display, and the image display can be connected to still another image display or the like will be described with reference to FIGS. 34 to 38. The fifth embodiment is the same as the above embodiments except for the following arrangement, and a detailed description thereof will be omitted.

Figure 34:
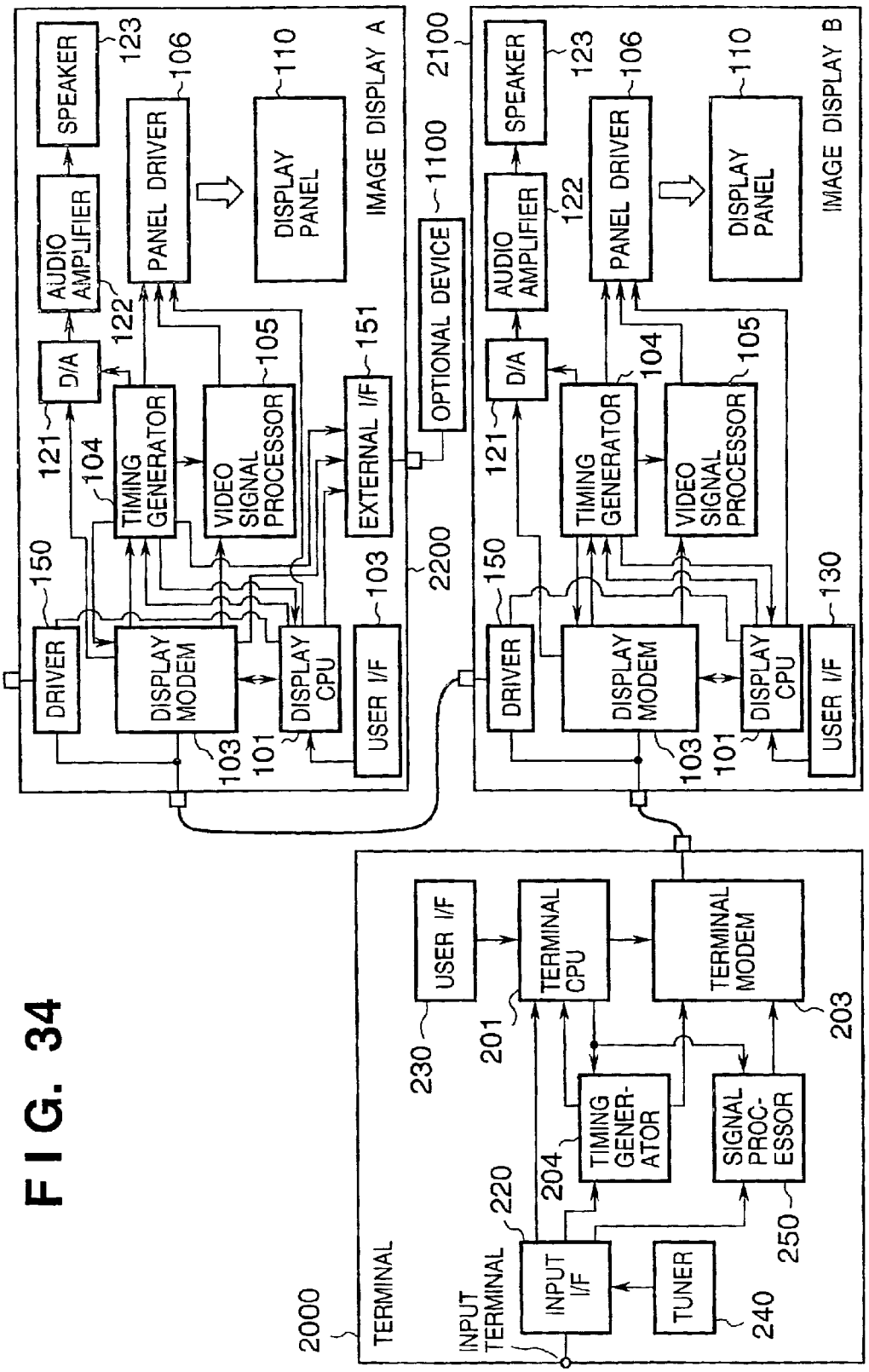
FIG. 34 is a block diagram showing the arrangement of the fifth embodiment according to the present invention.
Figure 35:
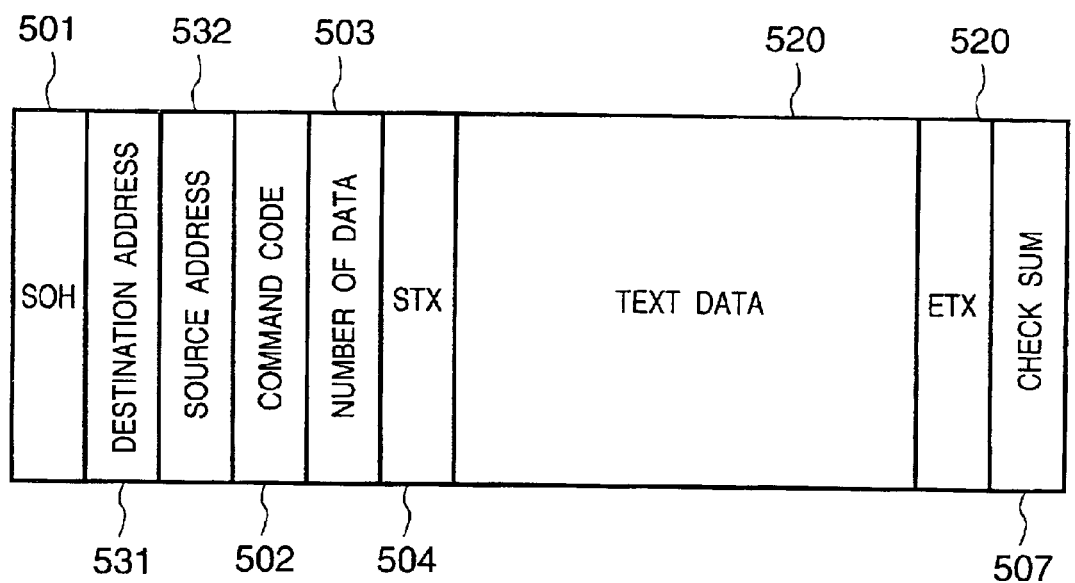
FIG. 35 is a view for explaining a packet structure used in the fifth embodiment.
Figure 36:
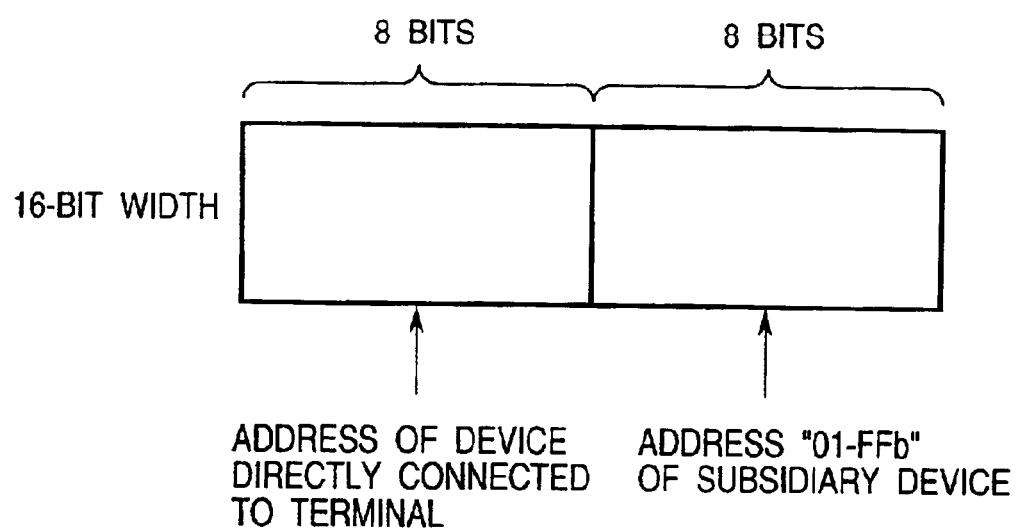
FIG. 36 is a view for explaining the detailed structure of an address command shown in FIG. 35.
Figure 37:
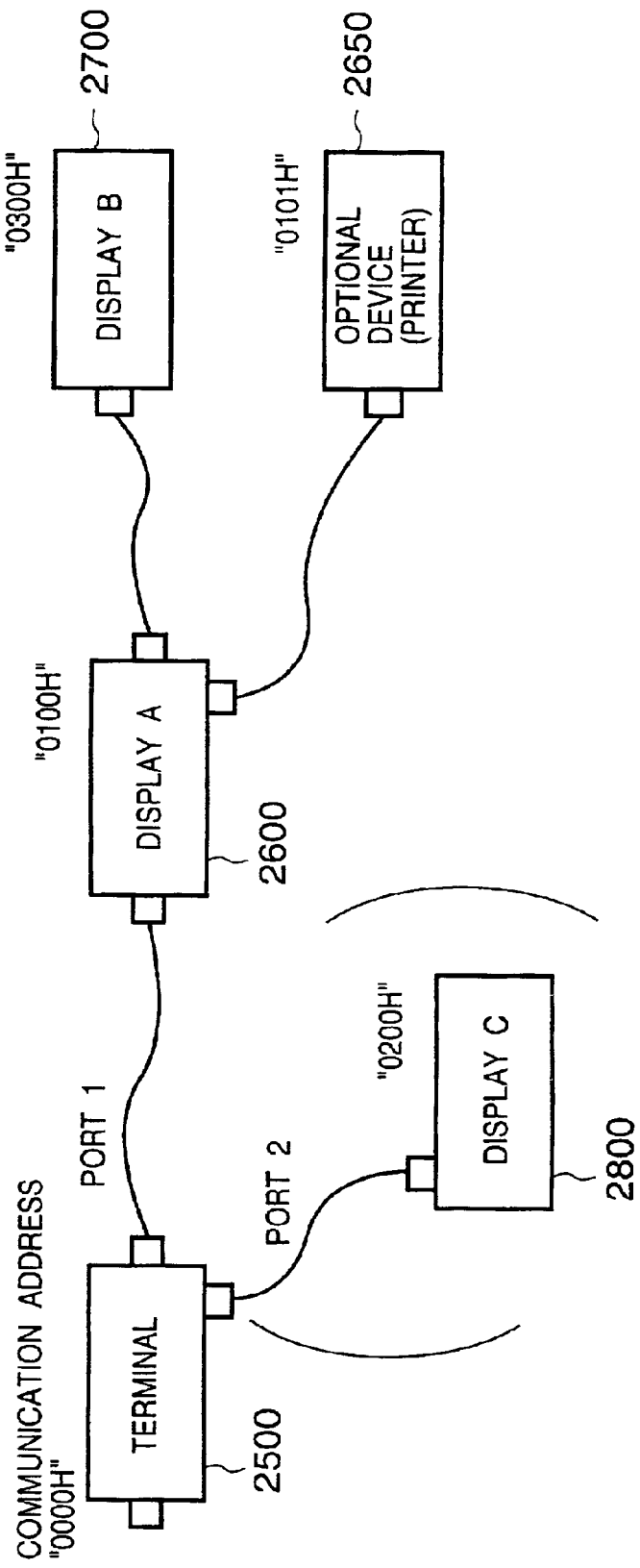
FIG. 37 is a block diagram showing a state in which a plurality of image displays are connected in the fifth embodiment.
Figure 38:
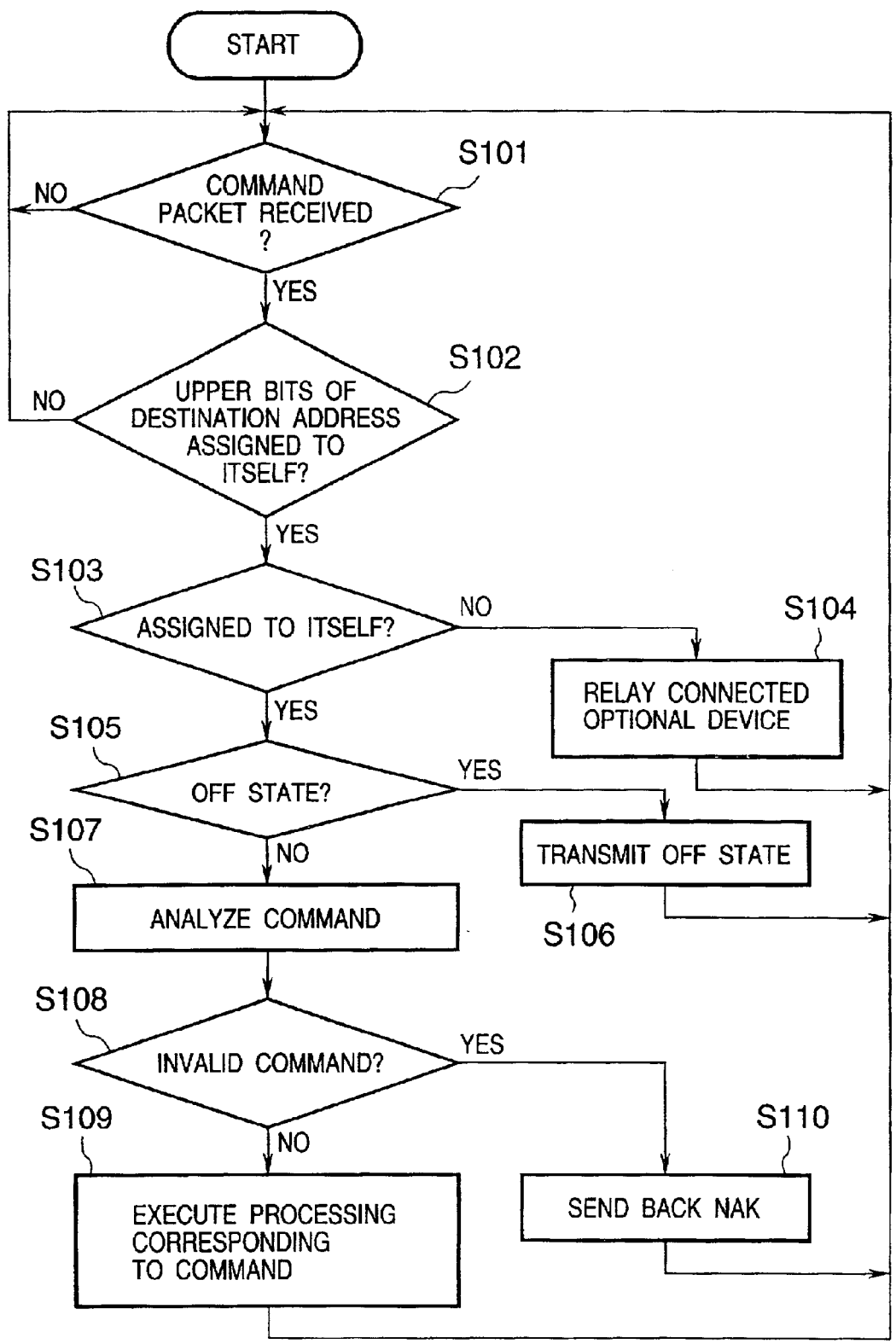
FIG. 38 is a flow chart for explaining command data reception processing of the image display in the fifth embodiment.

FIG. 34 is a block diagram showing the arrangement of the fifth embodiment according to the present invention. FIG. 35 is a view for explaining a packet structure used in the fifth embodiment. FIG. 36 is a view for explaining the detailed structure of an address command shown in FIG. 35. FIG. 37 is a block diagram showing a state in which a plurality of image displays are connected in the fifth embodiment. FIG. 38 is a flow chart for explaining command data reception processing of the image display.

In the fifth embodiment, the hardware arrangement is simplified as much as possible, and the communication control sequence is changed to allow connecting many image displays to one terminal.

For this purpose, a terminal 2000 may adopt the same hardware arrangement as the first or third embodiment. When the terminal 2000 adopts the same arrangement as the third embodiment, the terminal 2000 can be connected to an optional device, e.g., printer via an external I/F.

In addition, the image display of the fifth embodiment includes a driver circuit 150 in comparison with the image display 1 of the first embodiment shown in FIG. 2. The driver circuit 150 can be connected to another image display.

Like an image display A 2200, an external I/F 151 may be employed to allow connecting an optional device to the image display, similar to the third embodiment. In place of the arrangement shown in FIG. 34, the terminal may take the same arrangement as the terminal 1600 of the fourth embodiment shown in FIG. 31. Also in this case, a transmission control sequence (to be described later) can be applied. The transmission control sequence will exemplify a case in which the terminal can be connected to two image displays, and either image display is connected to a printer as an optional device.

In the fifth embodiment, the image display performs only control of transferring communication data from the terminal to the next image display via the driver circuit 150, and a detailed description of the hardware will be omitted.

Note that all the communication data output from the terminal 2000 are received by the modems of all the connected apparatuses. Thus, each apparatus employs an arrangement of determining whether data is directed to the apparatus on the receiving side.

The fifth embodiment, therefore, uses a packet having the structure shown in FIG. 35. The packet structure shown in FIG. 35 includes a destination address 531 and source address 532 in addition to the packet structure of the above embodiments shown in FIG. 10 or 11.

FIG. 36 shows the detailed structure of the address field shown in FIG. 35. As described in the above embodiments, video data is made up of 24 bits; and command data, 16 bits.

In the fifth embodiment, 16-bit command data is divided into upper 8 bits and lower 8 bits. The upper 8 bits represent address data which specifies devices (image display A 2200 and image display B 2100 in the example of FIG. 34) directly connected to the terminal 2000.

The lower 8 bits represent address data which specifies a device (optional device 1100 connected to the image display A 2200 in the example of FIG. 34) subsidiary to the device specified by the upper 8 bits.

Transmission control from the terminal to each connected device using this command communication packet will be explained with reference to the flow chart of FIG. 38. For descriptive convenience, the flow chart of FIG. 38 will be described by exemplifying the connection state shown in FIG. 37.

In FIG. 37, reference numeral 2500 denotes a terminal with two ports which has the same arrangement as the terminal 1600 shown in FIG. 31; 2600, a display A having the same arrangement as the image display A 2200 in FIG. 34; 2650, a printer as an optional device connected to the display A 2600 via, e.g., the external I/F 151; 2700, a display B connected to the driver circuit 150 of the display A 2600; and 2800, a display C connected to the terminal 2500. Note that a numerical value at the upper right portion of each unit is an address assigned to the unit.

Each display connected to the terminal 2500 monitors reception of command data (command packet) in step S101 of FIG. 38. Upon reception of command data, the display shifts to step S102 to check whether the upper address shown in FIG. 36 is an address assigned to the display. For example, the display A 2600 shown in FIG. 37 checks whether the upper address is "H(01)". If NO in step S102, the display returns to step S101 without performing any processing, and waits for reception of the next command. Packet information from the terminal 2500 is also automatically transmitted to the next image display via the driver circuit 150. So long as the driver 150 is kept driving, packet information is automatically transferred to another image display connected to this display. Thus, the display need not perform further control.

If YES in step S102, the display advances to step S103 to check the lower 8-bit address and whether the packet is directed to the display. For example, the display A 2600 in FIG. 37 determines that the packet is directed to it for lower 8 bits of "00", and otherwise the packet is directed to a subsidiary device, e.g., the printer 2650.

If NO in step S103, the display advances to step S104 to relay the reception packet to a connected optional device. For example, the display transmits the packet from the display modem to the connected optional device via the external I/F. Then, the display returns to step S101 to wait for reception of the next command.

If YES in step S103, the display advances to step S105 to check whether to be in an OFF state (power-off state of the display panel). If YES in step S105, the display advances to step S106. The display sets the terminal address to the destination address and the display address to the source address at command transmission timing from the display to the terminal. The display generates and transmits a response packet including command data representing the power-off state. Then, the display returns to step S101.

If NO in step S105, the display shifts to step S107 to analyze the reception packet. In step S108, the display checks whether the command is an invalid one the display cannot process. If NO in step S108, the display shifts to step S109 to execute processing corresponding to the analyzed command. Then, the display returns to step S101.

If YES in step S108, the display shifts to step S110. The display sets the terminal address to the destination address and the display address to the source address at the next command transmission timing from the display to the terminal. The display generates and transmits a response packet including command data "NAK". Then, the display returns to step S101.

If the display has a request to be transmitted to the terminal, the display sets the terminal address to the destination address and the display address to the source address at the next command transmission timing from the display device to the terminal. Then, the display generates and transmits a transmission packet including transmission command data.

When the display receives a transmission request from a connected optional device and does not have any transmission request, the display sets the terminal address to the destination address and the address of the connected device to the source address at the next command transmission timing from the display to the terminal. Then, the display generates and transmits a transmission packet including transmission command data.

According to the fifth embodiment, a necessary number of image displays can be connected to one terminal.

In the fifth embodiment, respective image displays receive common data. Display data can be transmitted to a necessary number of image displays without any change as far as they have common specifications.

If the image displays have different display specifications, a resolution conversion function is added to, e.g., the video signal processors of each image display and the terminal. This greatly reduces limitations on the specifications of a connected image display.

For example, the terminal converts input video data through the input I/F into high-resolution image information or image information with a resolution guaranteed for transmission quality, and transmits the image information to each image display. The image display converts the received image information with a predetermined resolution into an appropriate resolution, and then displays the resultant information.

Sixth Embodiment

In these embodiments, the terminal and image display have completely independent arrangements and control operations. However, the present invention is not limited to this. For example, a necessary processing sequence in processing display information output from the image display by the image display can be transferred from the terminal to the image display, as needed.

This arrangement realizes reliable feedback to the image display when information cannot be properly displayed only by the normal function of the image display or the apparatus has been improved. The sixth embodiment according to the present invention in which the terminal is adapted to transfer a predetermined control sequence to the image display will be described with reference to FIGS. 39 to 41. The sixth embodiment is the same as the above embodiments except for the following arrangement, and a detailed description thereof will be omitted.

Figure 39:
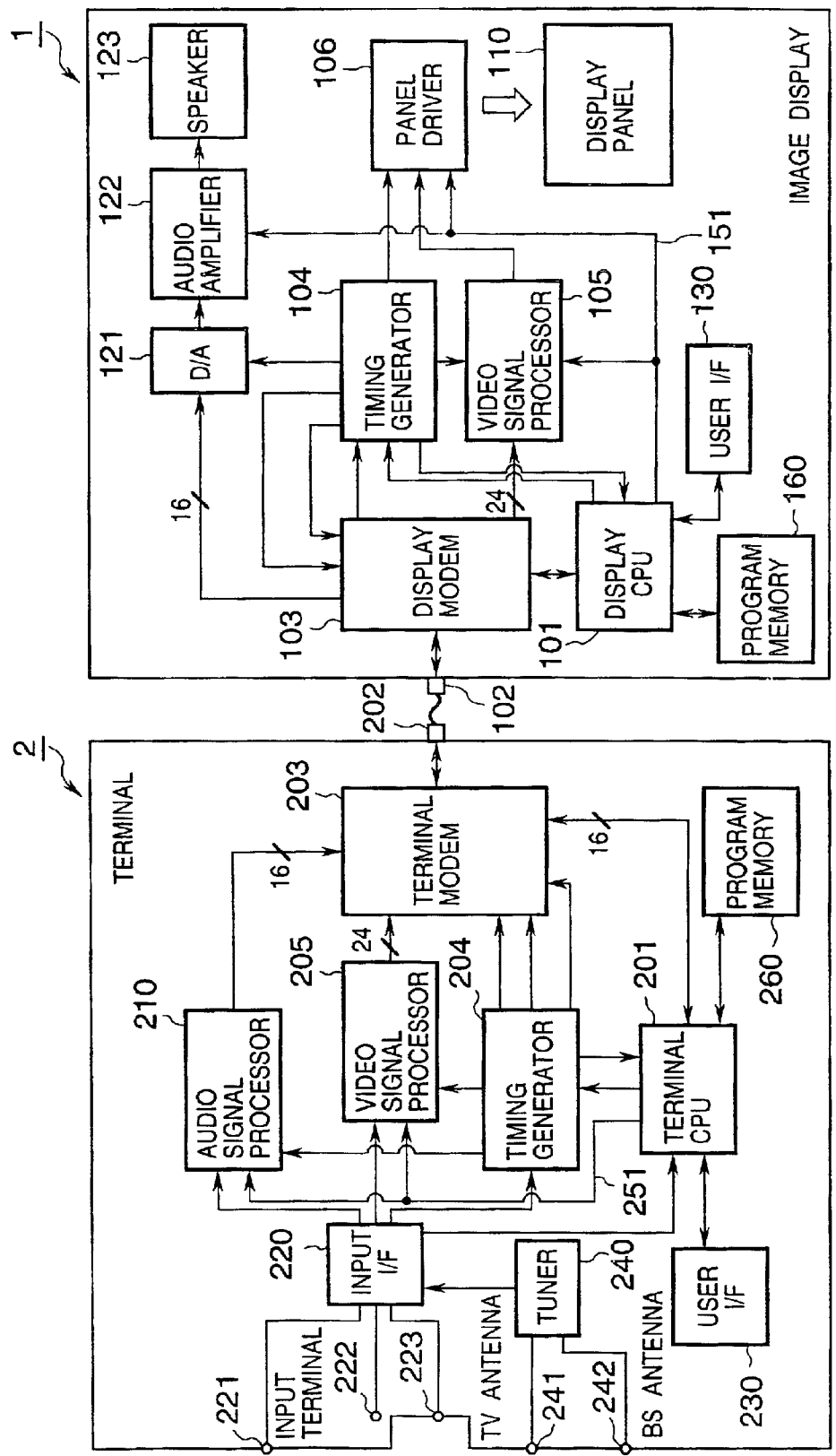
FIG. 39 is a block diagram showing the arrangement of the sixth embodiment according to the present invention.
Figure 40:
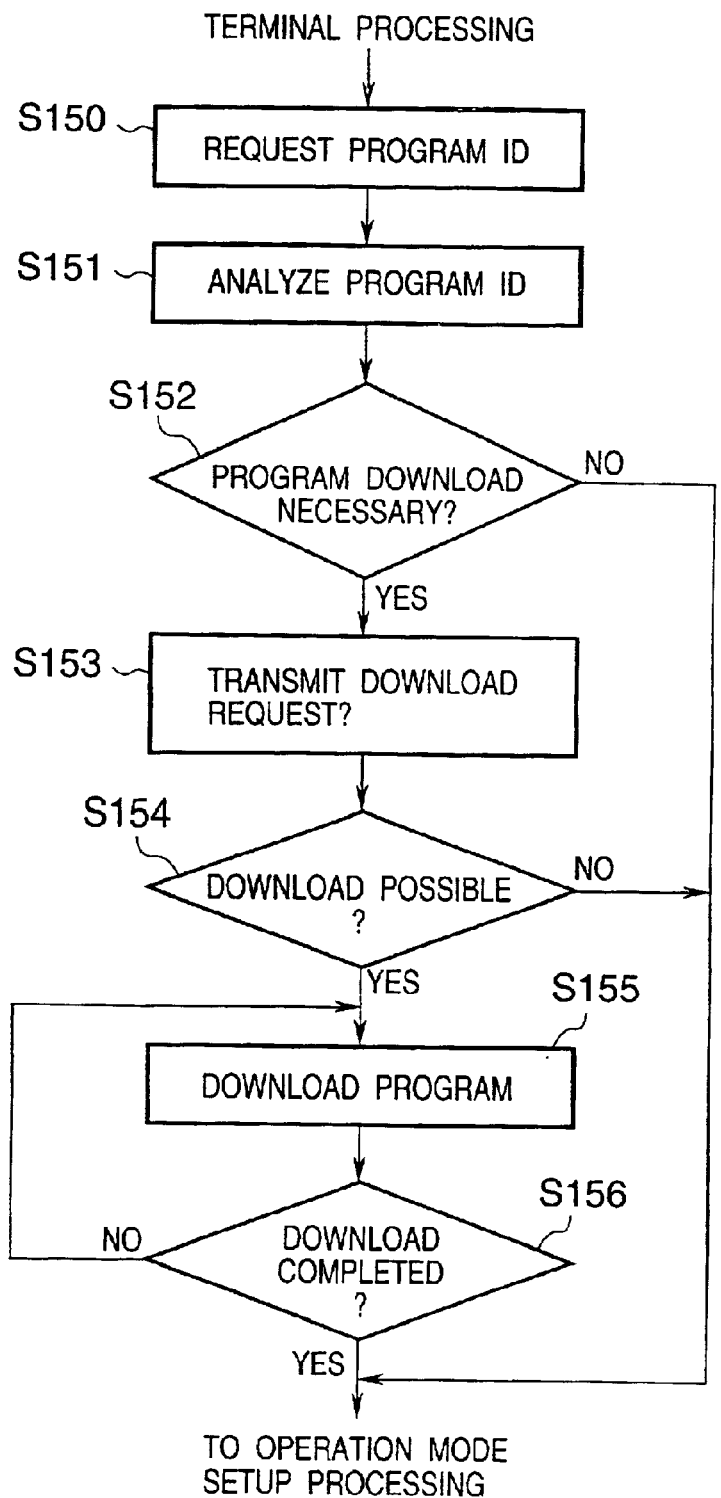
FIG. 40 is a flow chart showing download processing of the terminal in the sixth embodiment.
Figure 41:
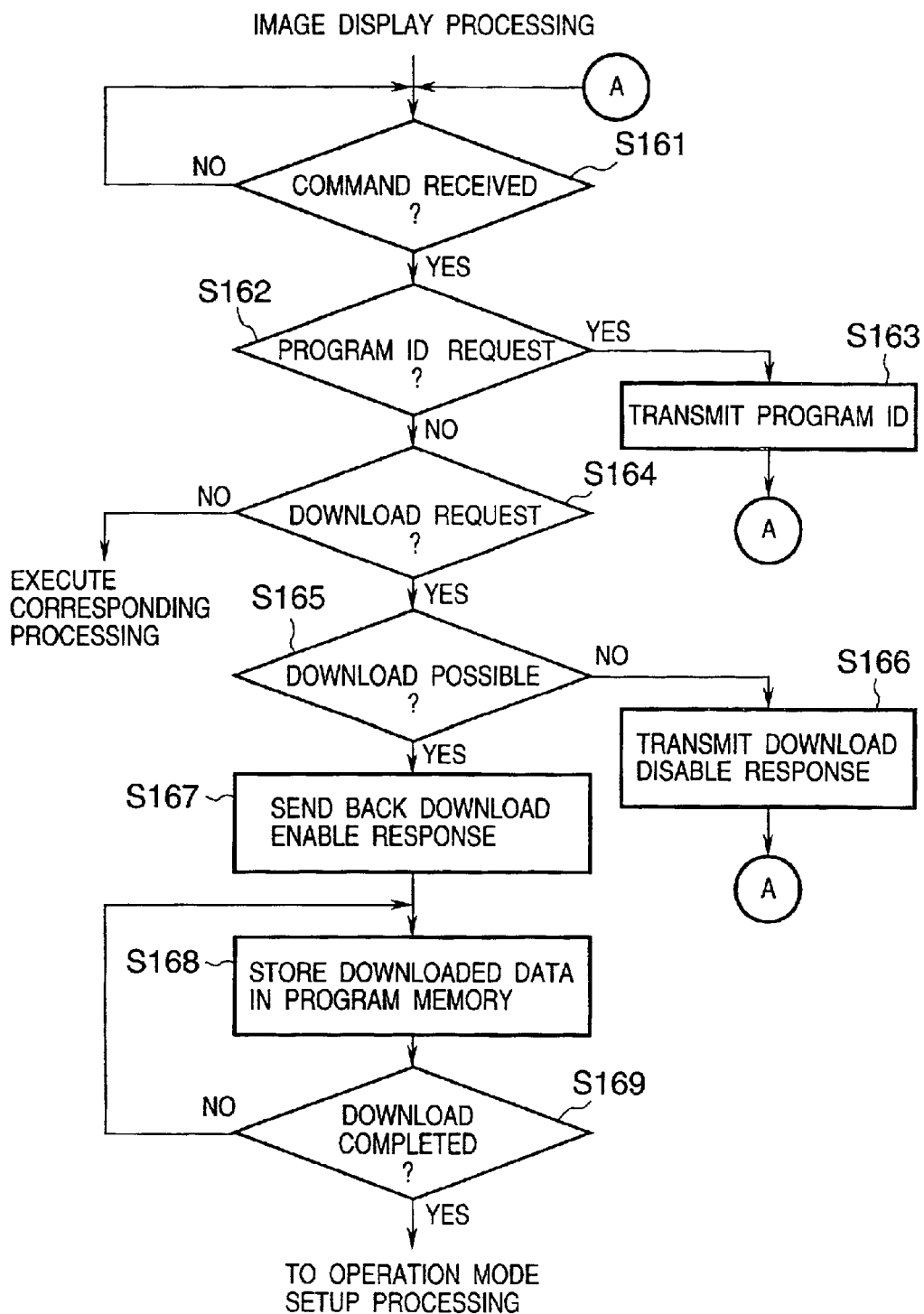
FIG. 41 is a flow chart showing download processing of the image display in the sixth embodiment.

FIG. 39 is a block diagram showing the arrangement of the sixth embodiment according to the present invention. FIG. 40 is a flow chart showing download processing of the terminal in the sixth embodiment. FIG. 41 is a flow chart showing download processing of the image display in the sixth embodiment.

In the sixth embodiment, in addition to the arrangement of the first embodiment shown in FIG. 2, a terminal 2 comprises a program memory 260, and an image display 1 comprises a program memory 160 for storing a control program downloaded to a display CPU 101. The program memory 160 is a nonvolatile memory, whereas the program memory 260 is a rewritable memory such as an EEPROM, flash memory, or SRAM backed up using a battery. The remaining arrangement is the same as in FIG. 2, and a detailed description thereof will be omitted.

The sixth embodiment having this arrangement executes processing in FIGS. 40 and 41 subsequent to, e.g., power-on processing shown in FIGS. 8 and 9.

In step S150 of FIG. 40, the terminal 2 requests the image display 1 to transmit a program ID command representing the program version. In step S151, the terminal 2 analyzes a sent-back program ID and compares it with a program ID stored in the program memory 260. If the program ID of the image display 1 has the same version as the program ID of the terminal 2, the terminal 2 determines in step S152 that the program need not be downloaded, and shifts to operation mode setup processing shown in FIG. 15.

If the program ID of the image display 1 is different from the program ID of the terminal 2, the terminal 2 determines in step S152 that the program must be downloaded. The terminal 2 shifts to step S153 to transmit a program download request to the image display 1. The terminal 2 checks a response from the image display 1 and whether the program can be downloaded. If the program cannot be downloaded due to any reason or the image display 1 does not comprise the program memory 160, the terminal 2 receives a download disable response. In this case, the terminal 2 shifts to operation mode setup processing shown in FIG. 15 without downloading the program, and receives hardware specifications and adjustment data. In this case, the terminal 2 may use a function-limited control program to display data with a minimum function.

If the terminal 2 receives a download enable response in step S154, the terminal 2 advances to step S155 to download a given amount of program which can be transmitted at the next transmission timing. Then, the terminal 2 checks in step S156 whether download is completed. If NO in step S156, the terminal 2 returns to step S155 to download a given amount of program which can be transmitted at the next transmission timing.

In this way, the terminal 2 sequentially downloads the program. After the entire program is downloaded, the terminal 2 shifts from step S156 to operation mode setup processing shown in FIG. 15.

On the other hand, the image display 1 monitors reception of a command from the terminal 2 in step S161 shown in FIG. 41. If the image display 1 detects command reception, it advances to step S162 to check whether the command is a transmission request command for the program ID command. If YES in step S162, the image display 1 advances to step S163 to send back to the terminal 2 a program ID representing the version of a program stored in the program memory 160.

If NO in step S162, the image display 1 advances to step S164 to check whether to have received a download request command. If NO in step S164, the image display 1 executes processing corresponding to the reception command.

If YES in step S164, the image display 1 advances to step S165 to check whether the program can be downloaded. If the program cannot be downloaded for any reason or the image display 1 does not comprise the program memory 160, the image display 1 determines that the program cannot be downloaded, and shifts to step S166 to send back a download disable response to the terminal 2. Then, the image display 1 returns to step S161.

If YES in step S165, the image display 1 advances to step S167 to send back a download enable response. Then, the image display 1 downloads the program transmitted from the terminal 2 in step S168. In step S169, the image display 1 checks whether download is completed. If NO in step S169, the image display 1 returns to step S168 to download a given amount of program which can be transmitted at the next transmission timing.

The image display 1 sequentially downloads the program. After the entire program is downloaded, the image display 1 shifts from step S169 to operation mode setup processing shown in FIG. 16.

The program downloaded in this manner is a group of program macro commands in display control performed by the image display 1. It is desirable that the control program is written in the C language, and the terminal 2 sequentially translates and executes the control program written in the C language.

In this case, the control program can be executed regardless of the machine language of the CPU of the terminal 2. Note that the control program is not limited to the C language.

As described above, according to the sixth embodiment, reliable feedback to the image display is realized when information cannot be properly displayed only by the normal function of the image display or the apparatus has been improved.

Further, the terminal 2 is adapted to execute a control program matching the characteristics of the image display 1. For example, for a small display, the menu display function is reduced, and control is done mainly by a remote controller. For a large display, a visual I/F such as an icon is adopted in addition to a character menu.

Seventh Embodiment

In the above embodiments, the terminal and image display are adjusted in accordance with a user instruction through the user I/F. However, the present invention is not limited to this. It is also possible to detect the environment by the image display and adjust the image display and terminal in accordance with the detection results. The seventh embodiment according to the present invention in which the environment can be detected will be described with reference to FIGS. 42 to 45. The seventh embodiment is the same as the above embodiments except for the following arrangement, and a detailed description thereof will be omitted.

Figure 42:
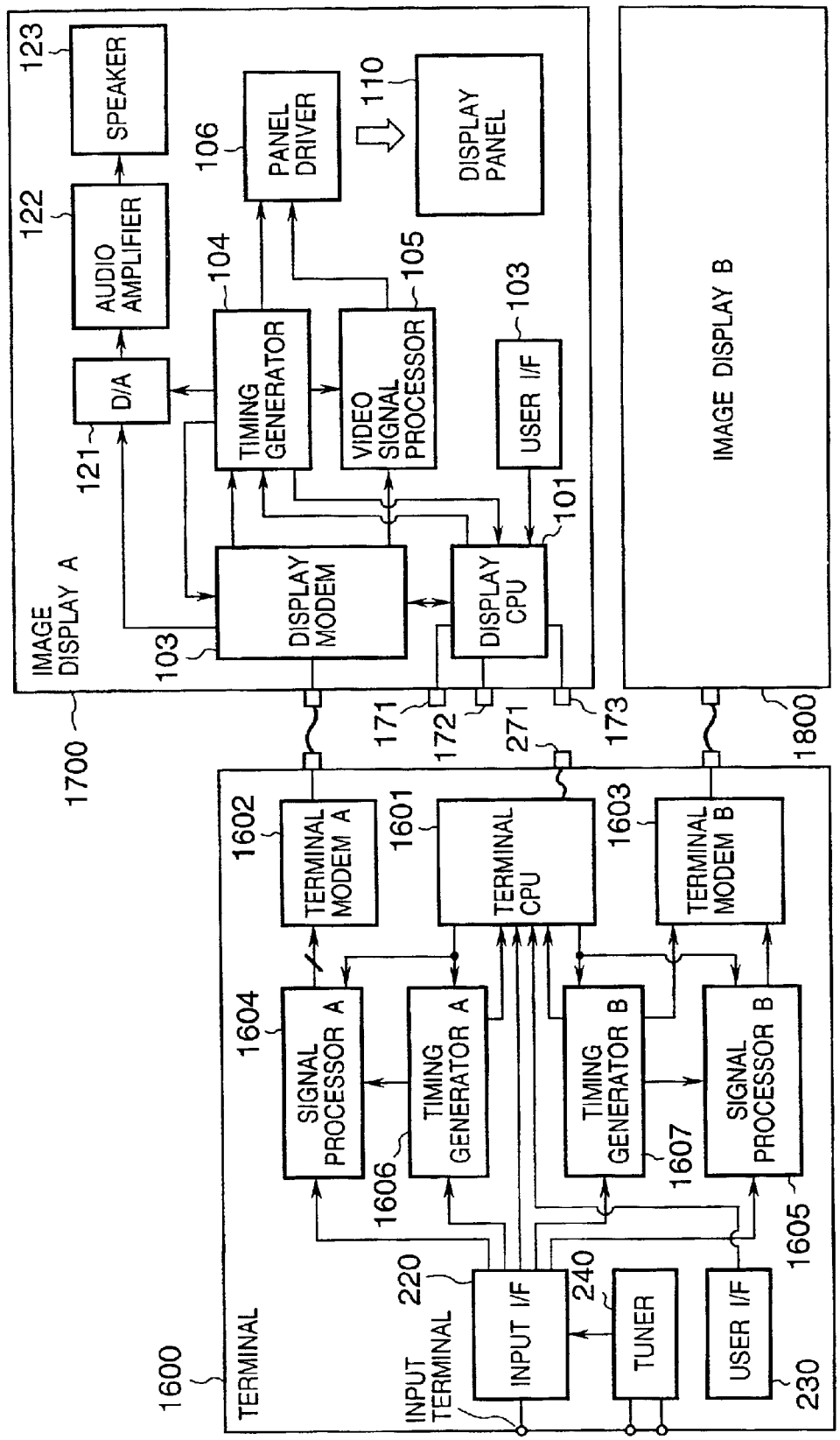
FIG. 42 is a block diagram showing the arrangement of the seventh embodiment according to the present invention.
Figure 43:
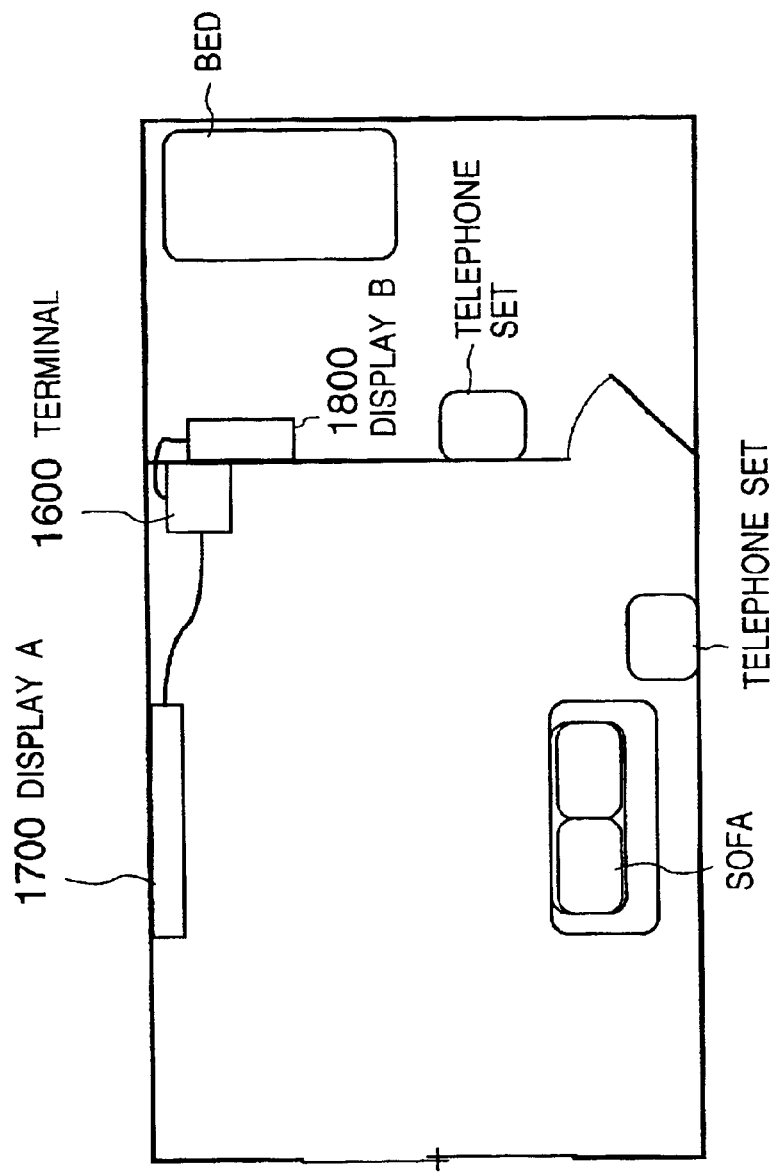
FIG. 43 is a view showing the layout of respective units in the seventh embodiment.
Figure 44:
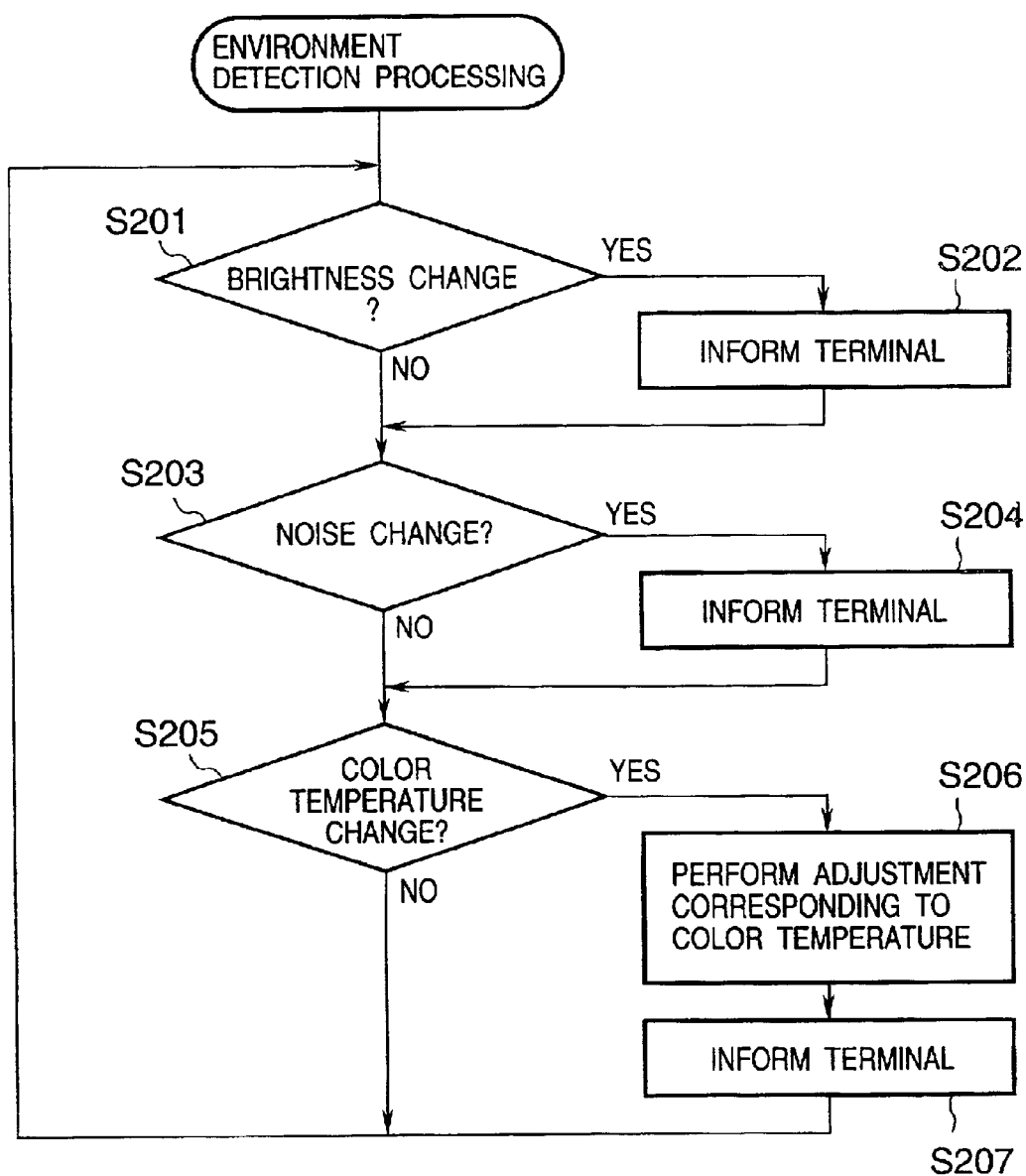
FIG. 44 is a flow chart showing control of the image display upon detecting an environmental change in the seventh embodiment.
Figure 45:
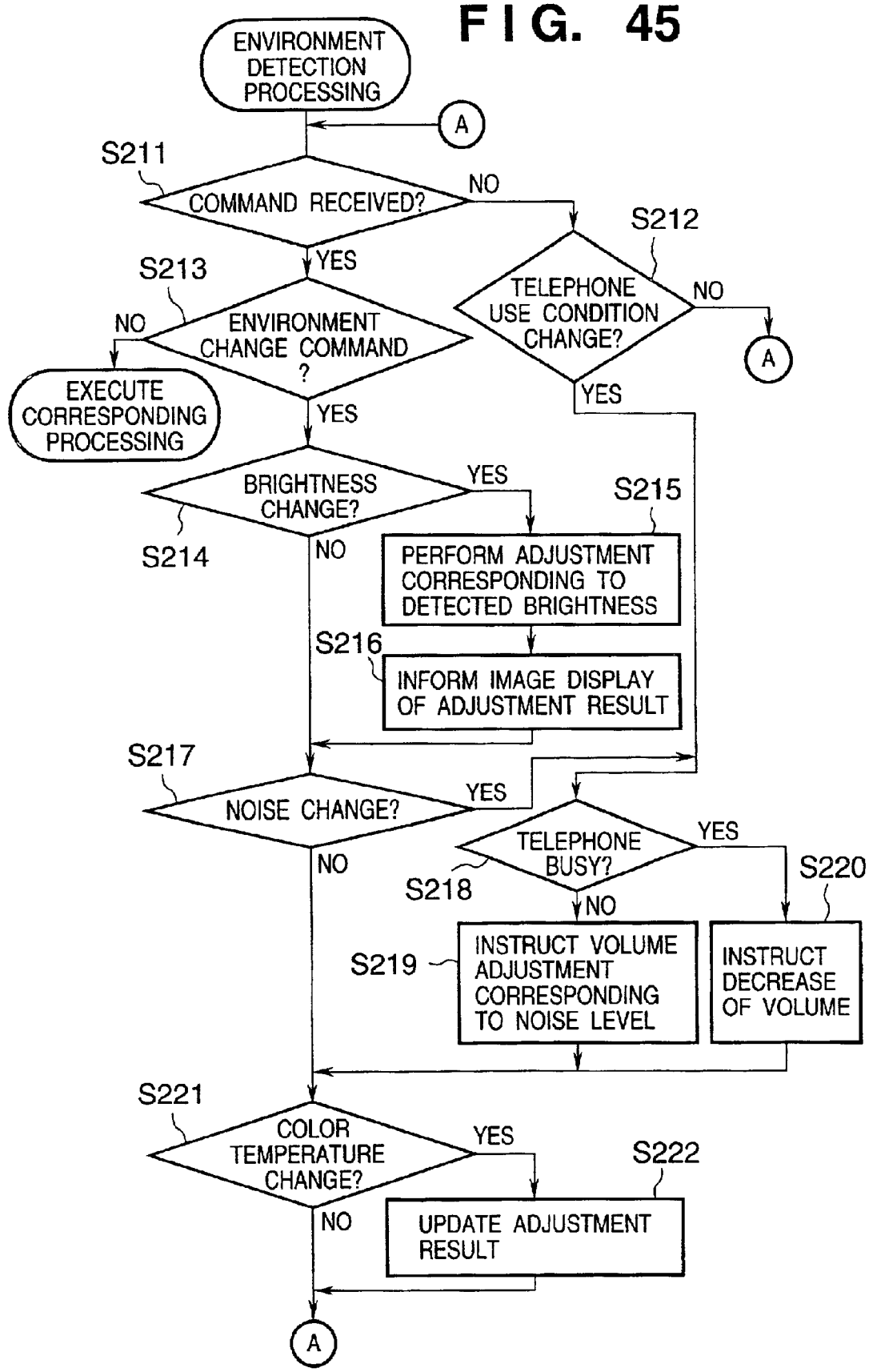
FIG. 45 is a flow chart showing control of the terminal upon detecting an environmental change in the seventh embodiment.

FIG. 42 is a block diagram showing the arrangement of the seventh embodiment according to the present invention. FIG. 43 is a view showing a layout of respective units in the seventh embodiment. FIG. 44 is a flow chart showing control of the image display upon detecting an environmental change in the seventh embodiment. FIG. 45 is a flow chart showing control of the terminal upon detecting an environmental change in the seventh embodiment.

In the seventh embodiment shown in FIG. 42, in addition to the arrangement of the fourth embodiment shown in FIG. 31, a terminal 1600 comprises a telephone use detector 271 for detecting use/non-use of a telephone set, and each of image displays 1700 and 1800 comprises a brightness detector 171 for detecting the ambient brightness of the image display, a noise detector 172 for detecting volume (noise intensity), and a color temperature detector 173 for detecting the ambient color temperature. The remaining arrangement is the same as in FIG. 31, and a detailed description thereof will be omitted. Note that the image display B 1800 comprises identical detectors to those of the image display A 1700.

The example of FIG. 42 will be described. These detectors can be applied to the above-described embodiments.

For example, as shown in FIG. 43, the terminal 1600 is installed at the corner of a living room, the display A 1700 as a large-size wall-mounted monitor is mounted on the wall of the living room, and the display B 1800 as a small-size monitor is installed in a bed room. In this situation, the installation environment may greatly change between the respective displays, so that it is improper to apply the same adjustment results to both the displays. Further, only user adjustment does not always provide the optimal image quality for appreciation. For this reason, the seventh embodiment employs display and terminal environment detectors to perform adjustment matching their environments.

Control of the image display will be explained with reference to FIG. 44. FIG. 44 is a flow chart showing control of the image display upon detecting an environmental change in the seventh embodiment.

The image display performs the following control. More specifically, a display CPU 101 performs processing coping with a predetermined change or more detected by each detector. In the following description, the adjustment authorizations of adjustment items are assigned as described in the first embodiment.

In step S201, the display CPU 101 checks whether the brightness detector 171 detects a predetermined change or more. If Y (YES) in step S201, the display CPU 101 advances to step S202 to inform the terminal 1600 of the detection result. This is because the terminal 1600 has an adjustment authorization such as contrast adjustment for coping with brightness changes, as described above. If N (NO) in step S201, the display CPU 101 shifts to step S203.

In step S203, the display CPU 101 checks whether the noise detector 172 detects a predetermined change or more. If Y in step S203, the display CPU 101 advances to step S204 to inform the terminal 1600 of the detection result. The image display has an adjustment authorization for volume adjustment. However, the volume must be controlled not to increase during the use of a telephone set owing to the following reason, so that the detection result is transmitted to cause the terminal to detect whether the telephone set is being used. After that, the volume is adjusted in accordance with a volume adjustment instruction from the terminal. This control is done by general command processing.

When the terminal requests transmission of a command representing whether the telephone set is being used, or the use of the telephone set is always informed, the display CPU 101 suffices to perform corresponding volume adjustment and transmit only the volume adjustment result.

The display CPU 101 joins a flow of N in step S203, and shifts to step S205.

In step S205, the display CPU 101 checks whether the color temperature detector 173 detects a predetermined change or more. If Y in step S205, the display CPU 101 advances to step S206 to adjust, e.g., the panel driver 106 of the image display, and increase the color temperature for a fluorescent lamp or decrease it for an incandescent lamp.

The display CPU 101 informs the terminal 1600 of the adjustment result in step S207 and returns to step S201.

Control of the terminal will be described with reference to FIG. 45. FIG. 45 is a flow chart showing control of the terminal upon detecting an environmental change in the seventh embodiment. The terminal performs the following control.

As shown in FIG. 45, the terminal 1600 monitors reception of command data from the image display in step S211. If N in step S211, the terminal 1600 advances to step S212, and monitors an output from the telephone use detector 271 of the terminal 1600 to determine whether the use condition of the telephone set changes. Although only one telephone use detector 271 is illustrated in FIG. 42, the use conditions of a plurality of telephone sets can be detected. This can be realized by a unit having a known telephone use detection function of detecting the DC loop formation state of a telephone set and determining whether the telephone set is being used. If N in step S212, the terminal 1600 returns to step S211.

If Y in step S211, the terminal 1600 advances to step S213 to check whether the command informs it of an environmental change. If N in step S213, the terminal 1600 executes corresponding processing.

If Y in step S213, the terminal 1600 advances to step S214 to check whether brightness is detected. If Y in step S214, the terminal 1600 advances to step S215 to perform adjustment coping with a brightness change, such as contrast control for which the terminal 1600 has an adjustment authorization.

In step S216, the terminal 1600 holds the adjustment results, and informs a corresponding image display of it. If N in step S214, the terminal 1600 shifts to step S217.

In step S217, the terminal 1600 checks whether the noise level is detected. If Y in step S217, or Y in step S212, the terminal 1600 shifts to step S218 to check whether a telephone set in the same room as the image display which informs the terminal 1600 of the environmental change is being used. If N in step S218, the terminal 1600 advances to step S219 to instruct the image display to perform volume adjustment corresponding to the detected noise level; if Y in step S218, the terminal 1600 instructs the image display to decrease the volume.

The terminal 1600 shifts to step S221, and if it receives a color temperature adjustment result, shifts to step S222. The terminal 1600 holds the adjustment result, and returns to step S211.

Eighth Embodiment

In the above embodiments, the terminal and image display are directly connected using an interface cable. However, the present invention is not limited to this, and also includes a case in which the terminal and image display communicate with each other using radio waves at part of the interface cable.

The eighth embodiment according to the present invention in which the terminal and image display communicate with each other using radio waves at part of the interface cable will be described with reference to FIG. 46. The eighth embodiment performs optical communication using light such as infrared rays at a radio section. However, optical communication is not limited to this, various means such as ultrasonic waves and radio waves may be used. The eighth embodiment is the same as the above embodiments except for the following arrangement, and a detailed description thereof will be omitted.

In the eighth embodiment, as shown in FIG. 46, the image display comprises an optical communication unit in place of an interface connector with the terminal. The optical communication unit is made up of a light-emitting portion for transmitting command information to the terminal, and a light-receiving portion for receiving information from the terminal. A change in received light quantity at the light-receiving portion is detected as an electrical signal. The electrical signal is amplified by an amplifier and output to a display modem. Emission of the light-emitting portion is controlled via a driver circuit in accordance with a modulated signal from the display modem.

In the terminal, an optical communication unit almost identical to that of the image display is attached to the distal end of the interface cable. The optical communication unit is made up of a light-emitting portion for transmitting information to the image display, and a light-receiving portion for receiving command information from the image display. A change in received light quantity at the light-receiving portion is detected as an electrical signal. The electrical signal is amplified by an amplifier and output to a terminal modem. Emission of the light-emitting portion is controlled via a driver circuit in accordance with a modulated signal from the terminal modem. These arrangements and control operations can be realized by a known method.

The optical communication unit of the image display is desirably disposed on the upper surface of the image display housing. However, the optical communication unit can be disposed at an arbitrary position as far as it faces the optical communication unit of the terminal (to be described below). For example, the communication unit may be disposed on the lower surface, back surface, or front surface of the image display housing.

When the image display is a thin, wall-mounted monitor, its optical communication unit is disposed on the upper surface of the housing, and the optical communication unit of the terminal is disposed at a position near the ceiling where the optical communication unit faces the optical communication unit of the image display, as shown in FIG. 46. Input/output lines to/from the image display are reduced to only a power cable and the like.

By disposing the optical communication unit of the terminal near the ceiling, a complicated cable layout can be simplified without impairing the appearance by the presence of the two optical communication units. Even a changed installation position can be dealt with by only changing the position of the optical communication unit near the ceiling.

If the optical communication unit of the terminal is disposed above a position where the image display is to be installed, a changed installation position of the image display can be easily dealt with. The terminal can detect light from the optical communication unit of the image display to determine that the image display at the detected position becomes movable. Only the optical communication unit at this position is biased, thereby preventing deterioration of the optical communication unit.

Ninth Embodiment

In the above embodiments, one image display displays an image on one screen. However, the present invention is not limited to this. It is also possible to dispose a plurality of image displays close to each other and display one image by these image displays as a whole. The ninth embodiment according to the present invention in which one image can be displayed by a plurality of image displays as a whole will be described with reference to FIG. 47. The ninth embodiment is the same as the above embodiments except for the following arrangement, and a detailed description thereof will be omitted.

Figure 47:
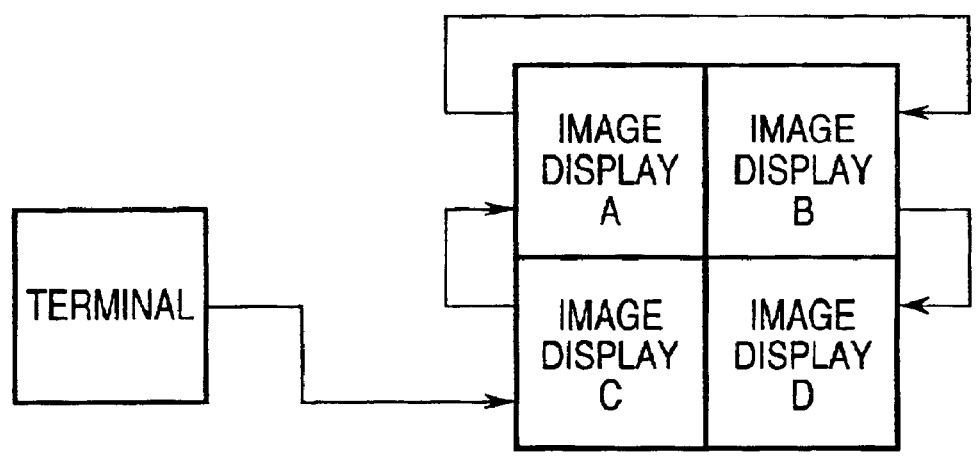
FIG. 47 is a block diagram for explaining an arrangement of the ninth embodiment according to the present invention.

As an example of controlling display of one image by a plurality of image displays as a whole, one display screen is constituted by four image displays in the example shown in FIG. 47. In this case, each image display may have the arrangement of the image display of the fourth embodiment shown in FIG. 34.

The terminal controls an address so as to receive only display data of each display screen part (1/4) of the display screen shown in FIG. 47 as video data for each image display.

This control enables large-screen display.

10th Embodiment

In the above embodiments, the communication timing is predetermined for each data in communicating information between the terminal and image display, and the type of communication information can be specified at the communication timing of the information. However, the present invention is not limited to this, and information may include information type identification data without limiting the communication timing of the information. The 10th embodiment according to the present invention using this arrangement will be described with reference to FIG. 48. The 10th embodiment is the same as the above embodiments except for the following arrangement, and a detailed description thereof will be omitted.

In the 10th embodiment, an information transmission source adds header data representing the type and amount of data to be communicated to the header of each communication information so as to allow determining the type of communication information by the communication timing.

Figure 48:
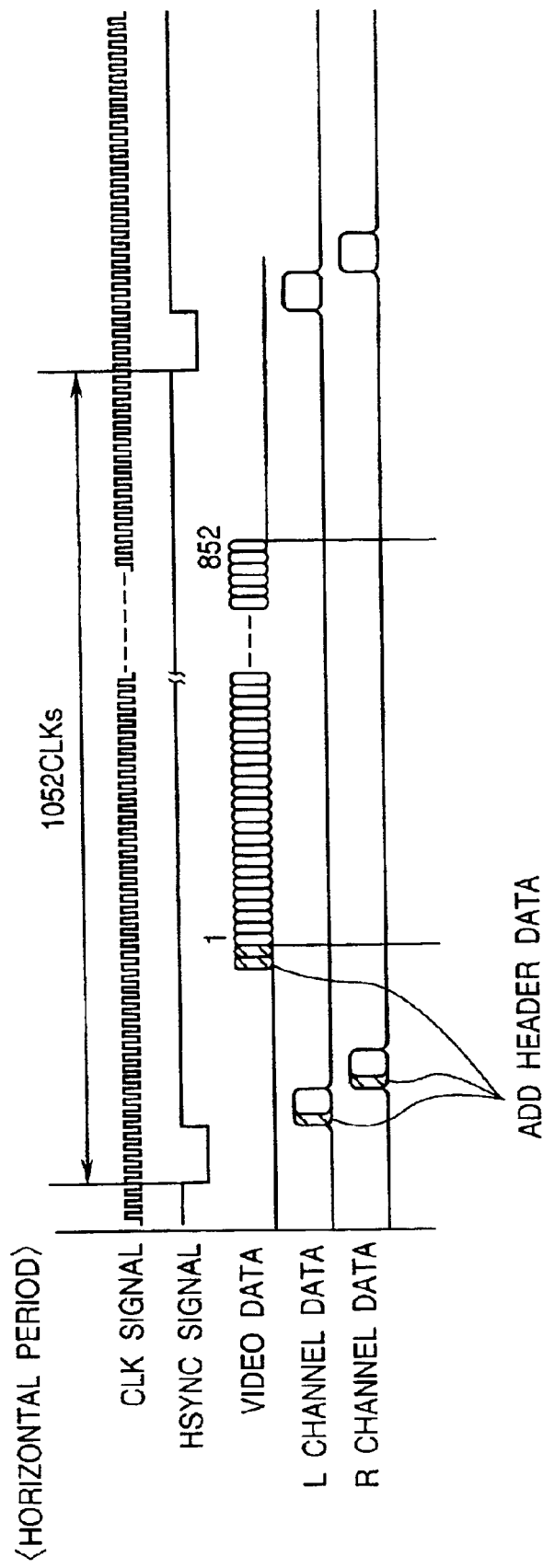
FIG. 48 is a timing chart for explaining communication control during the HSYNC period between the terminal and image display of the 10th embodiment of the present invention.
Figure 49:
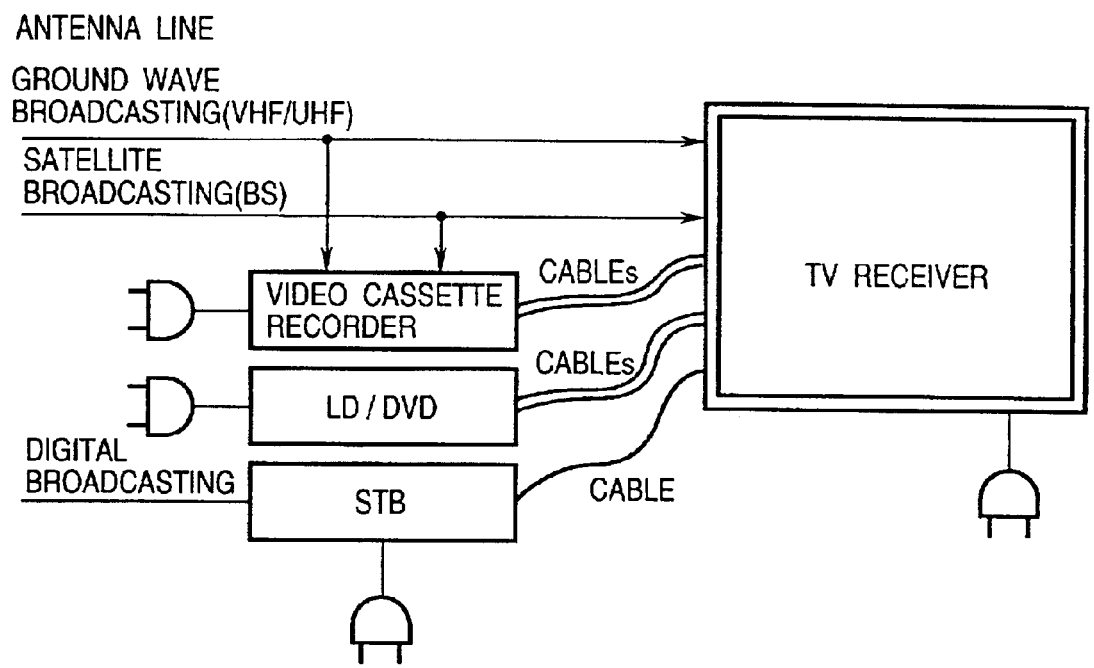
FIG. 49 is a block diagram showing an arrangement used to display various images on a television receiver for receiving and displaying a conventional television program.

In the example of FIG. 48, header data is added to the header of each information, as represented by hatching. The transmission source adds, to the header of video data, a header representing that data to be transmitted is video data and has a data amount of 852 dots (pixels). For audio data, the transmission source adds a header data representing that data to be transmitted are L- and R-channel audio data.

This control eliminates wasteful idle time and allows communication of a large amount of information. For example, necessary information can be efficiently transferred when the image display has a frame memory or the like, or is connected to an optional device and has a large amount of transfer data to the optional device.

Other Embodiments

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program. In this case, the program codes read from the storage medium realize the functions according to the embodiments, and the storage medium storing the program codes constitutes the invention. Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 3:
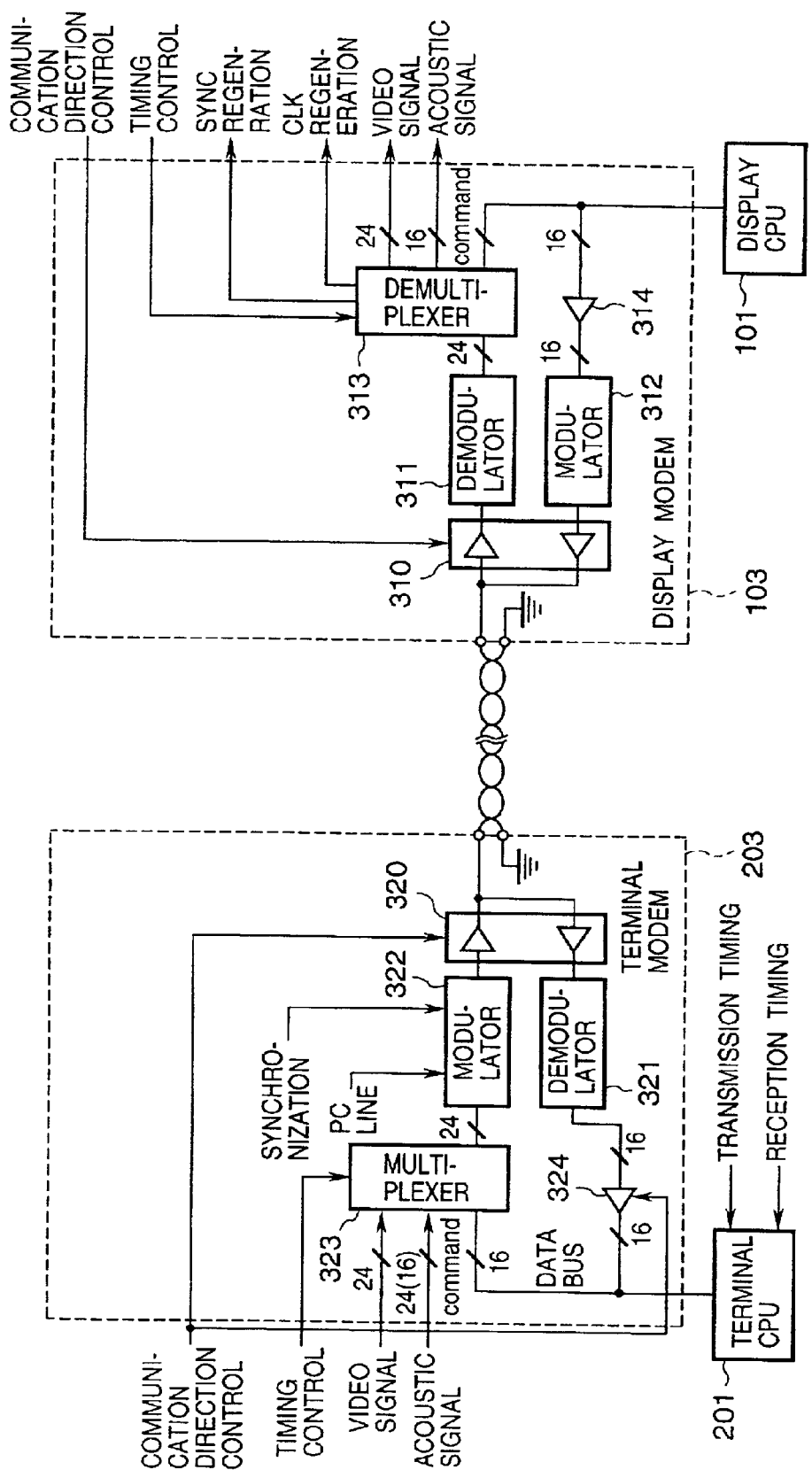
FIG. 3 is a block diagram showing the detailed arrangements of an interface circuit portion and modem input/output portion between the terminal and image display in the first embodiment.

When the present invention is applied to the storage medium, the storage medium stores program codes corresponding to the aforementioned flow chart (shown in FIGS. 2, 3 and/or FIG. 4).

As many apparently widely different embodiments of the present invention can be made without departing from the spirit and scope thereof, it is to be understood that the invention is not limited to the specific embodiments thereof except as defined in the appended claims.

What is claimed is:

1. An image display control system comprising a supply source for transmitting a signal including at least a video signal, and an image display for receiving the signal from said supply source and displaying a corresponding image,
    said supply source including:
    characteristic acquisition means for acquiring characteristic data of said image display when said supply source is powered on;
    determination means for determining a signal communication specification with said image display on the basis of the characteristic data acquired by said characteristic acquisition means; and
    communication means for communicating a signal including the video signal with the communication specification determined by said determination means, and
    said image display including:
    characteristic transmission means for transmitting characteristic data for specifying a characteristic of said image display to said supply source;
    display communication means for communicating the signal including the video signal determined by said determination means of said supply source; and
    connection request transmission means for transmitting a connection request to said supply source,
    wherein said characteristic acquisition means includes detection means for detecting the connection request from said image display.

2. The system according to claim 1, wherein said characteristic acquisition means comprises:
    characteristic request means for transmitting a characteristic data transmission request to said image display; and
    characteristic detection means for detecting the characteristic data sent back from said image display,
    wherein said characteristic transmission means transmits characteristic data of said image display in correspondence with a characteristic data transmission request from said supply source.

3. The system according to claim 2, wherein said characteristic request means stops transmitting the characteristic data transmission request when no characteristic data is sent back from said image display even upon transmitting the characteristic data transmission request a predetermined number of times after said supply source is powered on.

4. The system according to claim 2, wherein said connection request transmission means monitors detection of the characteristic data transmission request from said supply source when no characteristic data transmission request is sent back from said supply source even upon transmitting the connection request a predetermined number of times after said image display is powered on.

5. The system according to claim 2, wherein
    the characteristic data transmission request from said characteristic request means includes a specification information transmission request of said image display, and
    said image display sends back specification information of said image display in correspondence with the specification information transmission request.

6. The system according to claim 2, wherein
    the characteristic data transmission request from said characteristic request means includes an adjustment information transmission request of said image display, and
    said image display sends back adjustment information of said image display in correspondence with the adjustment information transmission request.

7. The system according to claim 1, wherein said determination means specifies a display screen size of said image display from the characteristic data, obtains a video signal transmission speed in correspondence with the specified display screen size, and determines a signal communication specification.

8. The system according to claim 1, wherein the signal communication specification determined by said determination means includes a vertical synchronization period, a horizontal synchronization period, and a video signal transmission clock period for transmitting a video signal.

9. The system according to claim 1, wherein the characteristic data of said image display includes at least any one of
    the number of pixels and pixel layout of a display device of said image display,
    an emission characteristic of said display device of said image display,
    a gray level characteristic of said image display (the number of gray levels and a gamma characteristic of said display device),
    the type of image display (a screen size, an aspect ratio, and the type of device),
    a specification of an audio playback system of said image display, and
    a displayable frame frequency of said image display.

10. An image display system control method in an image display control system having a supply source for transmitting a signal including at least a video signal, and an image display for receiving the signal from the supply source and displaying a corresponding image, comprising:
    a characteristic acquisition step of acquiring characteristic data of said the image display when the supply source is powered on;
    a determination step of determining a signal communication specification with the image display on the basis of the characteristic data acquired in said characteristic acquisition step;
    a communication step of communicating a signal including the video signal with the communication specification determined in said determination step, with said characteristic acquisition step, said determination step, and said communication step being executed in the supply source; and
    a characteristic transmission step of transmitting characteristic data for specifying a characteristic of the image display to the supply source;
    a display communication step of communicating the signal including the video signal determined in said determination step of the supply source, with said characteristic transmission step and said display communication step being executed in the image display;

a connection request transmission step of transmitting a connection request to the supply source, a detection step of detecting the connection request from the image display.

11. A computer program product which operates on an image display control system having a supply source for transmitting a signal including at least a video signal, and an image display for receiving the signal from the supply source and displaying a corresponding image, comprising codes of:

a characteristic acquisition step of acquiring characteristic data of the image display when the supply source is powered on;

a determination step of determining a signal communication specification with the image display on the basis of the characteristic data acquired in said characteristic acquisition step;

a communication step of communicating a signal including the video signal with the communication specification determined in said determination step, with said characteristic acquisition step, said determination step, and said communication step being executed in the supply source;

a characteristic transmission step of transmitting characteristic data for specifying a characteristic of the image display to the supply source;

a display communication step of communicating the signal including the video signal determined in said determination step of the supply source, with said characteristic transmission step and said display communication step being executed in the image display;

a connection request transmission step of transmitting a connection request to the supply source, a detection step of detecting the connection request from the image display.

* * * * *

UNITED STATES PATENT AND TRADEMARK OFFICE
CERTIFICATE OF CORRECTION

| | |
|---|---|
| PATENT NO. | : 7,057,667 B1 |
| APPLICATION NO. | : 09/512105 |
| DATED | : June 6, 2006 |
| INVENTOR(S) | : Makiko Mori et al. |

It is certified that error appears in the above-identified patent and that said Letters Patent is hereby corrected as shown below:

ON THE TITLE PAGE AT ITEM (56):
Other Publications, Line 2, "Formal" should read --Format--.

ON THE TITLE PAGE AT ITEM (56), page 2:
Other Publications, Line 9, "1 to 49" should read --i to 49--.

IN THE DRAWINGS, SHEET 3 OF 49 (Fig. 3):
"SYNC
REGEN-
RATION" should read
--SYNC
REGEN-
ERATION--.

COLUMN 8:
Line 64, "signal" should read --signals--.
Line 66, "signal" should read --signals--.

COLUMN 12:
Line 55, "on," should read --on, it--.

COLUMN 13:
Line 37, "step S1," should read --step S 11,--.
Line 39, "step S 1," should read --step S 11,--.

COLUMN 33:
Line 3, "bed room." should read --bedroom.--.

COLUMN 38:
Line 50, "said the" should read --the--.
Line 62, "source; and" should read --source;--.

COLUMN 39:
Line 5, "source," should read --source; and--.

UNITED STATES PATENT AND TRADEMARK OFFICE
CERTIFICATE OF CORRECTION

PATENT NO.       : 7,057,667 B1
APPLICATION NO.  : 09/512105
DATED            : June 6, 2006
INVENTOR(S)      : Makiko Mori et al.

It is certified that error appears in the above-identified patent and that said Letters Patent is hereby corrected as shown below:

COLUMN 40:
Line 16, "source," should read --source; and--.

Signed and Sealed this

Tenth Day of July, 2007

JON W. DUDAS
*Director of the United States Patent and Trademark Office*